United States Patent
Yu et al.

(10) Patent No.: US 10,474,574 B2
(45) Date of Patent: Nov. 12, 2019

(54) METHOD AND APPARATUS FOR SYSTEM RESOURCE MANAGEMENT

(71) Applicant: Samsung Electronics Co., Ltd., Suwon-si, Gyeonggi-do (KR)

(72) Inventors: Changhun Yu, Seongnam-si (KR); Wonjin Kim, Suwon-si (KR); Hyunsik Kim, Suwon-si (KR); Sunho Moon, Suwon-si (KR); Minwook Ahn, Seoul (KR); Rakie Kim, Suwon-si (KR); Kyoungsoo Cho, Seoul (KR); Nikunj Saunshi, Suwon-si (KR); Parichay Kapoor, Suwon-si (KR); Pankaj Agarwal, Suwon-si (KR); Won-Sub Kim, Anyang-si (KR); Jin-Hyo Kim, Suwon-si (KR); Hyunghoon Kim, Suwon-si (KR); Jisu Oh, Hwaseong-si (KR); Keongho Lee, Seoul (KR); Seung-Beom Lee, Uiwang-si (KR); Jinseok Lee, Seoul (KR); Dong-Gi Jang, Suwon-si (KR); Subin Jo, Seoul (KR); Apoorv Kansal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/781,316

(22) PCT Filed: Dec. 2, 2016

(86) PCT No.: PCT/KR2016/014132
§ 371 (c)(1),
(2) Date: Jun. 4, 2018

(87) PCT Pub. No.: WO2017/095195
PCT Pub. Date: Jun. 8, 2017

(65) Prior Publication Data
US 2018/0357166 A1    Dec. 13, 2018

(30) Foreign Application Priority Data

Dec. 2, 2015  (KR) .................. 10-2015-0170966

(51) Int. Cl.
*G06F 12/00* (2006.01)
*G06F 12/06* (2006.01)
(Continued)

(52) U.S. Cl.
CPC ............ *G06F 12/0646* (2013.01); *G06F 9/50* (2013.01); *G06F 12/02* (2013.01);
(Continued)

(58) Field of Classification Search
None
See application file for complete search history.

(56) References Cited

U.S. PATENT DOCUMENTS

| 9,299,124 B2 * | 3/2016 | Chen ........................ G06T 1/60 |
| 2005/0053290 A1 | 3/2005 | Wada et al. |

(Continued)

FOREIGN PATENT DOCUMENTS

| JP | 2005-065239 A | 3/2005 |
| KR | 10-2010-0044907 A | 4/2010 |

(Continued)

OTHER PUBLICATIONS

Arcangeli et al.; Increasing memory density by using KSM; 2009 Linux Symposium; Proceedings of the Linux Symposium; Jul. 13-17, 2009; Montreal, CA.

*Primary Examiner* — John A Lane
(74) *Attorney, Agent, or Firm* — Jefferson IP Law, LLP

(57) ABSTRACT

The present disclosure relates to system resource management in a variety of situations. The present disclosure provides a method and an apparatus for reducing memory requirements and improving processing speed when an
(Continued)

electronic device performs padding for a particular arithmetic operation on data. To achieve the above objective, a method for operating an electronic device according to the present disclosure comprises the steps of: reading a first portion of data from a first memory; determining a first padding address based on the address of a byte belonging to a boundary region of the data among a plurality of bytes included in the first portion; writing values of the plurality of bytes and a value corresponding to the first padding address to a second memory; and reading a second portion of the data from the first memory.

20 Claims, 55 Drawing Sheets

(51) Int. Cl.

| | | |
|---|---|---|
| *G06F 12/02* | (2006.01) | |
| *G06F 12/0882* | (2016.01) | |
| *G06F 9/50* | (2006.01) | |
| *G06F 12/0817* | (2016.01) | |
| *G06F 12/1009* | (2016.01) | |

(52) U.S. Cl.
CPC ...... *G06F 12/0822* (2013.01); *G06F 12/0882* (2013.01); *G06F 12/1009* (2013.01)

(56) References Cited

U.S. PATENT DOCUMENTS

| | | |
|---|---|---|
| 2006/0061582 A1 | 3/2006 | Kurupati et al. |
| 2006/0072669 A1 | 4/2006 | Lin et al. |
| 2008/0098254 A1 | 4/2008 | Altevogt et al. |
| 2009/0079746 A1 | 3/2009 | Howard et al. |
| 2010/0091025 A1 | 4/2010 | Nugent et al. |
| 2010/0185802 A1 | 7/2010 | Asnaashari et al. |
| 2011/0202695 A1 | 8/2011 | Nandan et al. |
| 2012/0115453 A1 | 5/2012 | Zheng |
| 2013/0033504 A1 | 2/2013 | Nugent et al. |
| 2014/0340411 A1 | 11/2014 | Costa et al. |

FOREIGN PATENT DOCUMENTS

| | | |
|---|---|---|
| KR | 10-2011-0073567 A | 6/2011 |
| KR | 10-2013-0101560 A | 9/2013 |
| KR | 10-2013-0114756 A | 10/2013 |
| KR | 10-2014-0016440 A | 2/2014 |
| KR | 10-2014-0025362 A | 3/2014 |
| WO | 2012/135157 A2 | 10/2012 |

* cited by examiner

INFORMATION FOR EXTRACTING DATA CHARACTERISTICS    2310

| TIME | GPS (AMOUNT IN CHANGE) | BRIGHTNESS (AVERAGE) | WEATHER (OUTSIDE) | APP |
|---|---|---|---|---|
| 10 sec | 10 | 20 | CLEAR | Kakaotalk |
| 20 sec | 1000 | 22 | CLEAR | Facebook |
| 30 sec | 5000 | 24 | CLEAR | Kakaotalk |
| 40 sec | 8000 | 18 | CLEAR | Twitter |
| Total | HIGH-SPEED MOVEMENT | INDOOR ENVIRONMENT | CLEAR | SNS |

$$\Sigma \left( \begin{array}{|c|c|c|} \hline a & b & c \\ \hline d & e & f \\ \hline g & h & i \\ \hline \end{array} \ast \begin{array}{|c|c|c|} \hline 1 & 1 & 1 \\ \hline 1 & 2 & 1 \\ \hline 1 & 1 & 1 \\ \hline \end{array} \right) = \boxed{e_r}$$

| 1 | 1 | 2 |
|---|---|---|
| 1 | 1 | 2 |
| 2 | 2 | 1 |

(a)

| 1 | 2 | 1 |
|---|---|---|
| 2 | 1 | 2 |
| 1 | 2 | 1 |

(b)

| 0 | 0 | 0 |
|---|---|---|
| 0 | 1 | 2 |
| 0 | 2 | 1 |

METHOD AND APPARATUS FOR SYSTEM RESOURCE MANAGEMENT

TECHNICAL FIELD

The present disclosure relates to system resource management in a variety of situations.

BACKGROUND ART

Recent electronic devices integrate various functions so that the functions can be performed by a single electronic device. For example, a smartphone performs all operations, such as camera functions, motion picture taking, image processing, phone calls, and short message service (SMS) transmission, in a single electronic device. In order to perform these operations, a system resource, such as a hardware resource or a software resource, is required. In addition, as electronic devices become more sophisticated, each individual operation performed by an electronic device may require a lot of system resources.

However, resources available in an electronic device are limited. Further, as an electronic device is miniaturized, its battery capacity is also reduced, and the capacity of a storage device becomes limited as well. This means that there may occur a situation where it is difficult to satisfy all the resource demands required by operations performed by one electronic device.

Therefore, it is required to efficiently distribute and manage system resources in an electronic device.

DETAILED DESCRIPTION OF THE INVENTION

Technical Problem

The present disclosure provides a method and an apparatus for system resource management in a variety of situations.

The present disclosure provides the method and the apparatus wherein, when overlapping pages are merged in a memory of an electronic device, the electronic device efficiently performs a page scan for merging the pages so as to reduce unnecessary calculation and use of a hardware resource.

The present disclosure provides the method and the apparatus wherein, when a KSM execution module merges pages, the KSM execution module excludes pages, which have a low probability of being merged, for a specific time period to reduce unnecessary calculations and resource use so as to efficiently perform scanning and improve a merging speed.

The present disclosure provides the method and the apparatus for improving a calculation speed for a page volatility check, by performing a dirty bit calculation instead of a checksum calculation by the KSM execution module in order to check whether a target page is volatile.

The present disclosure provides the method and the apparatus wherein the KSM execution module may reuse or disable a structure (rmap_item) that manages page merging so as to reduce an overhead used to manage pages.

The present disclosure provides the method and the apparatus wherein, as a method for reducing pages to be scanned when the KSM execution module merges pages, the KSM execution module eliminates a VMA having a low memory saving effect in advance, eliminates scanning an area having an extremely low memory saving effect, and then further eliminates scanning an area having a low memory saving effect for a specific period.

The present disclosure provides the method and the apparatus for managing power resources by efficiently distributing calculations, which are to be performed by a low-speed calculation device and a high-speed calculation device, by the electronic device in order to analyze a user's context-awareness.

The present disclosure provides the method and the apparatus for performing user context-awareness and analysis by using the high-speed calculation device, and processing an analyzed requirement at a high-speed and a low power in a mobile terminal environment, by the electronic device.

The present disclosure provides the method and the apparatus wherein the electronic device using a plurality of graphic processing units (GPUs) schedules GPUs in order to efficiently reduce power of the electronic device.

The present disclosure provides the method and the apparatus for efficiently scheduling GPUs of a device using multiple GPUs in consideration of a device state, application information, and sensor information.

The present disclosure provides the method and the apparatus for enabling power consumption of a mobile device to be reduced without affecting a performance perceived by a user, by properly distributing resources according to an application operated in the mobile device.

The present disclosure provides the method and the apparatus for allocating a resource by reflecting a state and a characteristic of a process in the mobile device.

The present disclosure provides the method and the apparatus wherein the mobile device allocates an upper level resource to a process that affects a perceived performance, and allocates a lower level resource to a process that does not affect a perceived performance, based on a weight value reflecting the state and characteristic of the process.

The present disclosure provides the method and the apparatus wherein the electronic device displays electrical energy converted from mechanical energy corresponding to a user's activity on a screen unit of the electronic device.

The present disclosure provides the method and the apparatus for mapping energy harvested in the electronic device to the use of the electronic device, such as a short message service (SMS), a social network service (SNS), phone calls, etc.

The present disclosure provides the method and the apparatus for showing benefits of energy harvested in the electronic device to a user.

The present disclosure provides the method and the apparatus for displaying a carbon footprint generated by the electronic device in order to reduce the carbon footprint generated by the electronic device.

The present disclosure provides the method and the apparatus for reducing memory requirements and improving a processing speed when the electronic device performs padding for a specific calculation on data.

Technical Solution

In order to achieve the above objective, an operation method of an electronic device according to an embodiment of the present disclosure includes: reading a first part of data from a first memory; determining a first padding address based on an address of a byte belonging to a border area of the data among a plurality of bytes included in the first part; writing, in a second memory, values of the plurality of bytes and a value corresponding to the first padding address; and reading a second part of the data from the first memory.

An electronic device according to another embodiment of the present disclosure includes a first memory, a second memory, and a processor, wherein the processor: reads a first part of data from the first memory; determines a first padding address based on an address of a byte belonging to a border area of the data among a plurality of bytes included in the first part; writes, in a second memory, values of the plurality of bytes and a value corresponding to the first padding address; and reads a second part of the data from the first memory.

Advantageous Effects

According to embodiments of the present disclosure, when a KSM execution module of an electronic device merges pages, the KSM execution module excludes pages having a low probability of being merged from scanning for a specific time period, and reduces unnecessary calculations and resource use so as to efficiently perform scanning and improve a merging speed.

Further, the KSM execution module of the present disclosure can improve a calculation speed for a page volatility check, by performing a dirty bit calculation instead of a checksum calculation in order to check whether a target page is volatile.

Further, the KSM execution module of the present disclosure may reuse or disable a structure (rmap_item) that manages page merging so as to reduce an overhead used to manage pages.

Further, the KSM execution module of the present disclosure can gradually eliminate scanning of a virtual address area having a low memory saving effect for paging merging so as to improve a memory saving performance, through multilevel filtering, that is, through first level filtering to third level filtering.

Further, a mobile device of the present disclosure can reduce the possibility of leakage of personal information and perform quick context-awareness analysis, by performing user context-awareness analysis using a high-speed calculation device.

Further, the electronic device of the present disclosure, which uses multiple GPUs, can efficiently reduce power used in the electronic device, by efficiently scheduling the GPUs in consideration of a device state, application information, and sensor information.

Further, the mobile device of the present disclosure can achieve low power consumption thereof without affecting a performance perceived by a user, by controlling resources while reflecting a characteristic and an operation state of a running application.

Further, the electronic device of the present disclosure can display, thereon, the current use of electrical energy converted from mechanical energy corresponding to a user's activity and information on a carbon footprint generated by the use of the electronic device, so as to encourage the user to use the electronic device in a way that can reduce the carbon footprint.

Further, the electronic device of the present disclosure can effectively reduce the amount of memory use and a stand-by time when performing padding for a specific calculation, by performing direct memory access (DMA) and padding at the same time.

BRIEF DESCRIPTION OF THE DRAWINGS

FIG. 44 illustrates an example of applying a Gaussian filter to an image border and to the inside of an image according to the present disclosure;

FIG. 45 illustrates examples of various methods for pixel padding according to the present disclosure;

MODE FOR CARRYING OUT THE INVENTION

Figure 1:
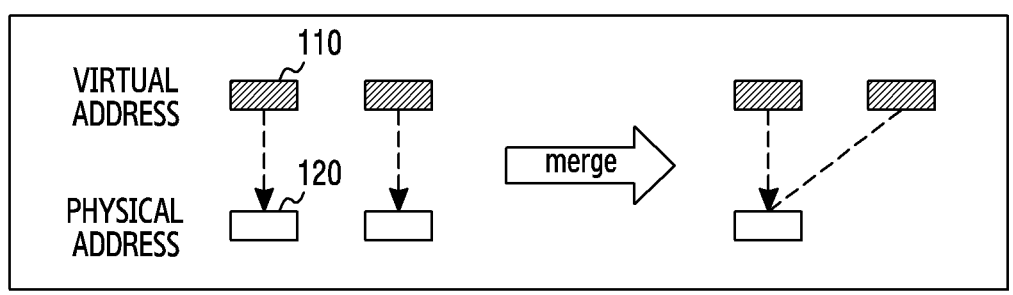
FIG. 1 schematically illustrates page merging according to an embodiment of the present disclosure.

Hereinafter, the present disclosure describes various techniques for managing system resources in an electronic device. The system resources, herein, may include an energy resource such as a battery, a memory device, a calculation time, a system overhead, a power, other hardware resources or software resources, and the like.

Accordingly, the techniques for managing system resources may include methods for reducing consumption of an energy resource such as a battery, autonomously generating energy by the electronic device without an external energy source, deleting an unnecessary element from a memory device, reducing a calculation time, reducing a system overhead, or reducing power. In addition, the techniques for managing system resources may include displaying a system resource management situation and a system resource management effect to a user, in which the system resource management situation is notified, to the user, as information on energy autonomously generated by the electronic device without an external energy source, and the system resource management effect corresponds to a reduced carbon footprint which the electronic device has achieved by autonomously generating energy.

Hereinafter, the operational principle of the present disclosure will be described in detail with reference to the accompanying drawings. In describing various embodiments below, a detailed description of related known configurations or functions incorporated herein will be omitted when it is determined that the detailed description thereof may unnecessarily obscure the subject matter of the present disclosure. Terms described below are defined in consideration of functions in various embodiments, but may vary according to the intention or convention of a user or operator. Therefore, the definitions of the terms should be made based on the contents throughout the specification.

A term referring to control information, a term referring to a timer, a term referring to a state change (e.g., an event), a term referring to network entities, a term referring to messages, a term referring to an element of a device, etc. used in the following description are illustrated for convenience of explanation. Accordingly, the present disclosure is not limited to the following terms and other terms having the same technical meaning may be used.

According to various embodiments, an electronic device may be a portable electronic device, or may be one of a smartphone, a portable terminal, a mobile phone, a mobile pad, a media player, a tablet computer, a handheld computer, and a Personal Digital Assistant (PDA). Further, the electronic device may be a device having a function, which is generated by combining two or more functions of the above described devices.

The term "~unit" or "~er" used hereinafter may refer to the unit for processing at least one function or operation and may be implemented in hardware, software, or a combination of hardware and software.

As an embodiment for managing a system resource, the present disclosure provides a method and an apparatus wherein, when overlapping pages are merged in a memory of an electronic device, the electronic device efficiently performs a page scan for merging the pages so as to reduce unnecessary calculation and use of a hardware resource.

Kernel same-page merging (KSM) means to aggregate pages having the same content, which exist in a kernel, to increase an available memory. In other words, KSM is to increase the available memory by merging the pages having the same content, which may exist with a high probability, into one when a virtual device operates a number of operating systems (Oss) in a server. For example, pages may be merged as shown in FIG. 1.

FIG. 1 schematically illustrates page merging according to an embodiment of the present disclosure. In FIG. 1, virtual addresses 110 are mapped to respective physical addresses 120 different from each other. A memory may be assigned to each of the physical addresses 120. When pages corresponding to the physical addresses 120 different from each other are determined to be identical pages through a KSM scanning procedure, each of the virtual addresses 110 may be mapped to one of the physical addresses 120 different from each other in the same manner. In this case, since it is not required to assign a memory to a physical address 120 that is not used, the amount of memory resource use may be decreased. Therefore, a central processing unit (CPU) may be efficiently used, and a performance thereof may be improved. In recent years, there has been an attempt to apply KSM to a device, such as a mobile device or a TV. However, there is a problem that the degree of consumption of a battery or CPU resources due to excessive calculation cannot be ignored.

Figure 2:
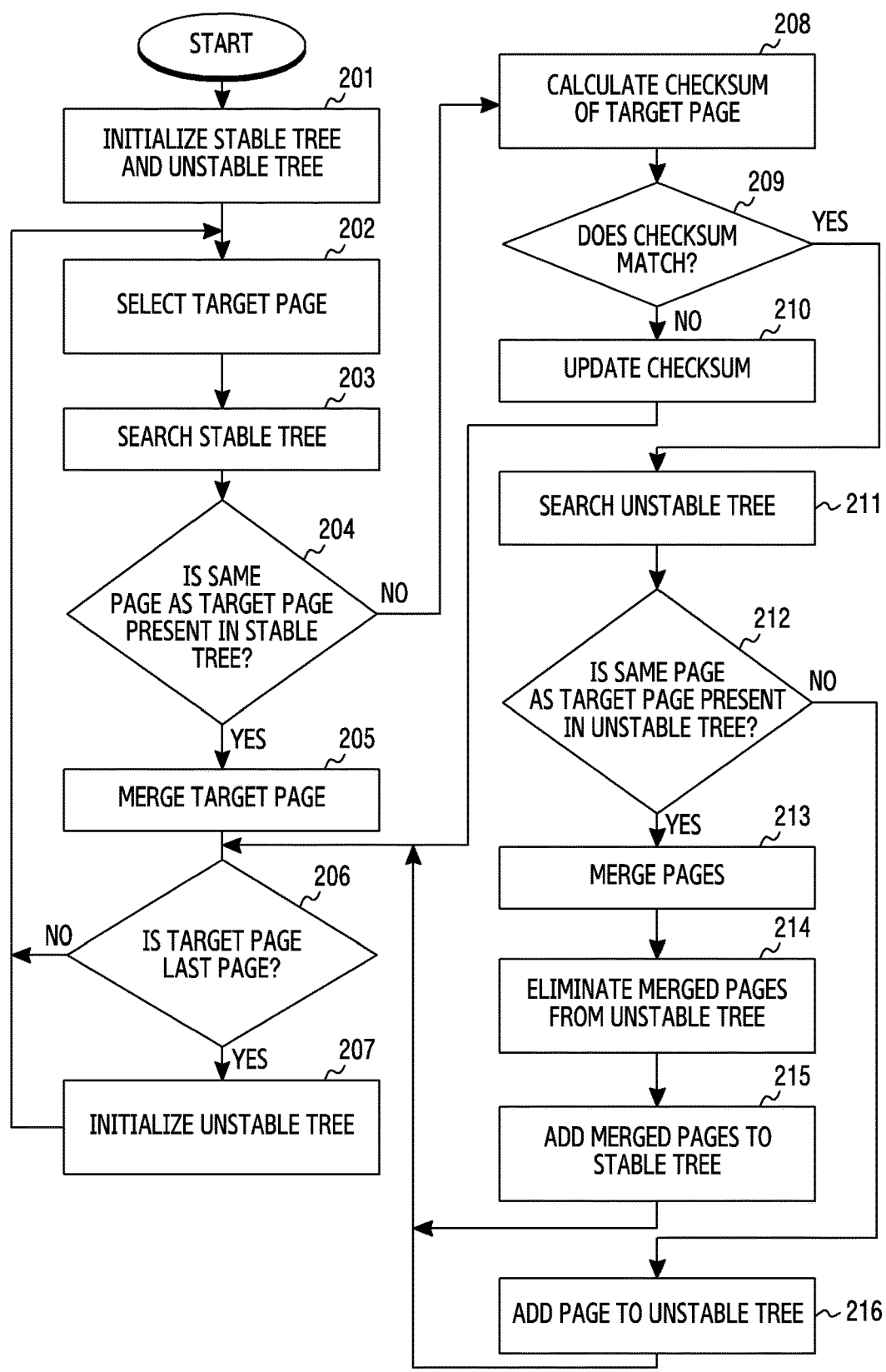
FIG. 2 is a flowchart illustrating a procedure of merging pages by kernel same-page merging (KSM) according to the present disclosure.

FIG. 2 is a flowchart illustrating a procedure of merging pages by KSM according to the present disclosure. Hereinafter, a subject of a merging operation is referred to as a "KSM execution module".

In step 201, the KSM execution module generates a stable tree and an unstable tree at an initialization time. The stable tree may be a structure that manages pages having been already merged. The unstable tree may be a structure that manages pages already having attempted to search for a merge target but have failed to find the merge target. The KSM execution module sequentially selects each of pages in a memory space, which have been already registered as merge targets, and determines for each page whether or not to merge. In the present document, a page, for which determination is made on whether or not to merge, is defined as a target page, and a term "scan" is defined as determining whether a target page is identical to all pages in a memory space. The KSM execution module selects a target page in step 202, and determines whether a page having the same content as that of the target page exists in the stable tree in step 203 and step 204. If a page having the same content as that of the target page exists in the stable tree, the KSM execution module moves to step 205 and merges the target page to the page having the same content, which exists in the stable tree. If a page having the same content as that of the target page does not exist in the stable tree, the KSM execution module moves to step 208 and calculates a checksum of the target page. The checksum may be used to determine how often the target page changes because a frequently changing target page does not need to be merged. In step 209, the KSM execution module determines whether the checksum is the same as a previously calculated checksum. If the checksum is different from the previously calculated checksum, in other words, when it is determined that the target page frequently changes, the KSM execution module moves to step 210 and updates the checksum to a storage. If the checksum is the same as the previously calculated checksum, the KSM execution module determines that the target page is a page that does not frequently change, and considers the target page as a merge target, in step 211. When the target page is considered to be a merge target, the KSM execution module searches the unstable tree to find out whether the page having the same content as that of the target page exists therein, in step 211 and step 212. If the page having the same content as that of the target page exists in the unstable tree, the KSM execution module merges the target page to the page having the same content in step 213, removes the merged page from the unstable tree in step 214, and adds the removed page to the stable tree in step 215. If the page having the same content as that of the target page does not exist in the unstable tree, the KSM execution module moves to step 216 and adds the target page to the unstable tree. When all procedures described above are performed, the KSM execution module moves to step 206 and checks whether the target page is a last page. When it is determined that the target page is not the last page, the KSM execution module selects a next target page and repeats the same procedures. When determination on whether or not to merge is made for all pages in the memory space, which are registered as merge targets, the KSM execution module initializes the unstable tree in step 207.

The merged pages may be managed by a copy-on-write (COW) scheme. In other words, when the merged pages have different values from each other, the merged pages may be divided into independent pages.

Figure 3:
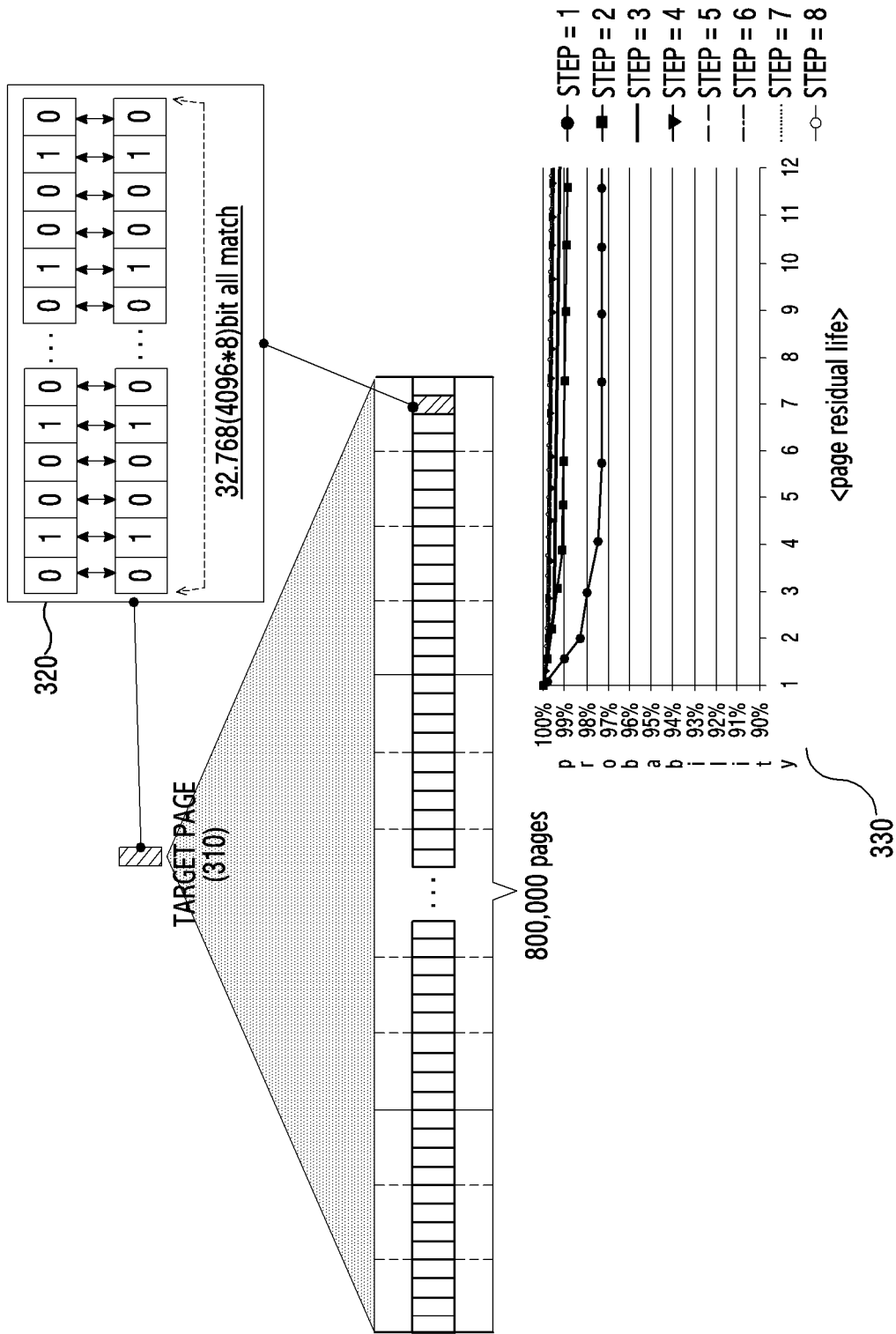
FIG. 3 illustrates scanning of pages to be merged, by a KSM execution module, and a graph showing the probability that the pages to be merged are not merged based on a scan cycle according to the present disclosure.

FIG. 3 illustrates scanning of pages to be merged, by a KSM execution module, and a graph showing the probability that the pages to be merged are not merged based on a scan cycle according to the present disclosure.

In an embodiment of FIG. 3, it is assumed that the number of pages to be scanned in one cycle in order for the KSM execution module to determine whether a page having the same content as that of a target page 310 exists is about 800,000 pages. To determine that a particular page is identical to the target page 310, all bits constituting page information have to be identical to all bits constituting information of the target page 310, as shown in reference numeral 320. However, the probability that all bits constituting information of each of two pages are the same may be very low. A graph 330 indicates the probability that the target page 310 is not merged as a scan cycle increases. The numbers corresponding to the steps in the right side of the graph 330 respectively indicate the number of times of scanning, the horizontal axis of the graph 330 indicates the number of times of additional scans, and the vertical axis of the graph 330 indicates the probability of not being merged. For an identical step, the graph 330 indicates that as more additional scans are performed, the probability that the target page is not merged decreases. However, although additional scans are performed, the probability of not being merged is maintained to be 97 percent or more. In the case of different steps, it can be known that the probability of not being merged in the subsequent scan cycle decreases as the number of times of scanning decreases. In other words, it can be known that the probability of being merged in the subsequent scan cycle increases as the number of times of scanning decreases. However, it can be known that even in the case of step 1 having the least number of times of scanning, the probability that the target page is not merged through an additional scan is 97 percent or more.

According to description in FIG. 3, it may be inefficient to scan all pages existing in the memory space in order to merge the target page. Therefore, for scanning pages to merge the target page, it is required to select and learn pages having a low merging possibility, and exclude the pages having a low merging possibility from a scan target for a predetermined period, so as to increase scan efficiency and a merging speed.

Figure 4:
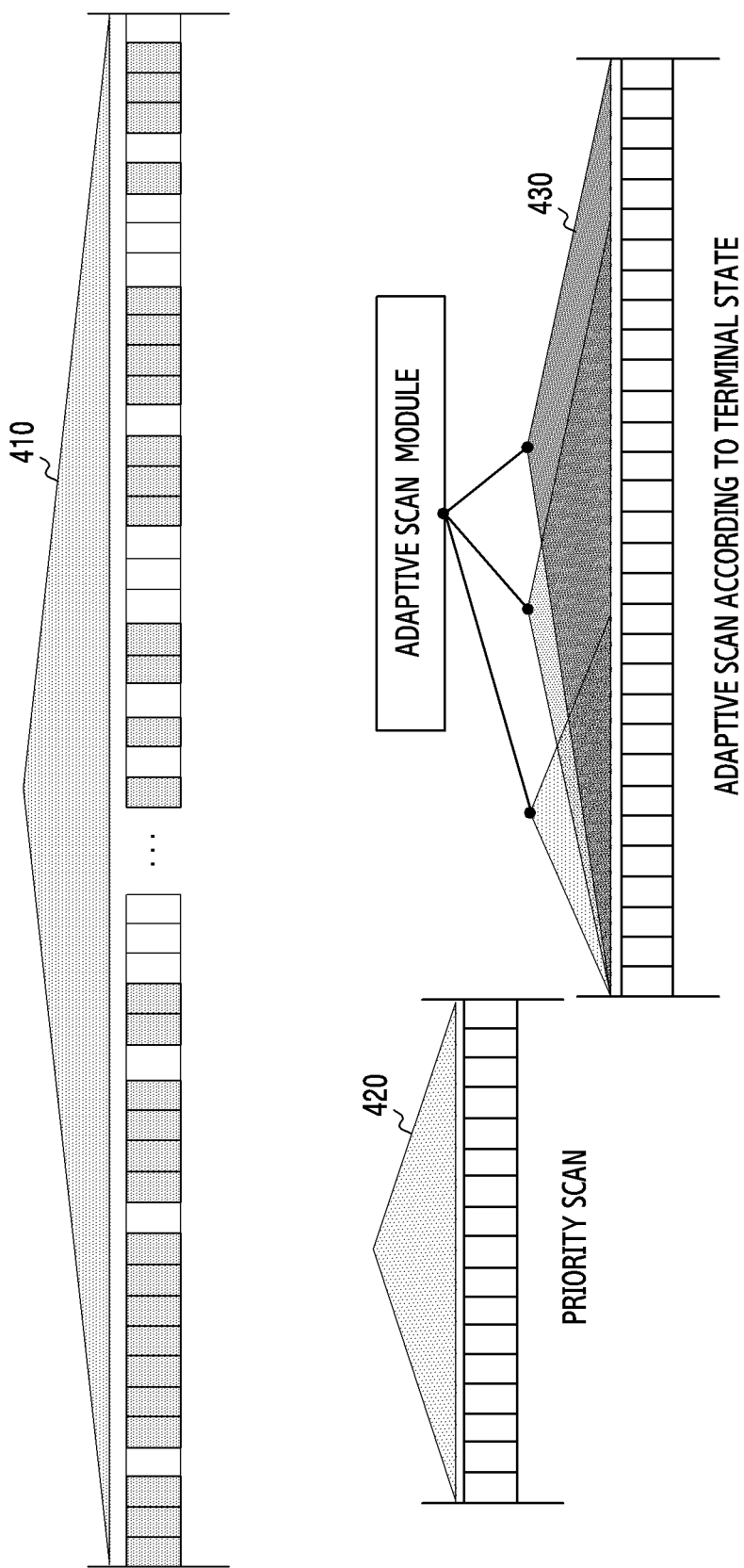
FIG. 4 illustrates adaptive scanning of pages on a memory space in order to merge pages according to the present disclosure.

FIG. 4 illustrates adaptive scanning of pages on a memory space in order to merge pages according to the present disclosure.

Reference numeral 410 schematically shows scanning of all pages in the memory space. Since the number of pages to be scanned by the KSM execution module in one cycle is very large, for example, 800,000 pages as shown in FIG. 3, and a process priority of the KSM execution module is lower than other processes, it may take a lot of time to scan one cycle. In other words, it may take a lot of time until a merging effect appears. Further, scanning many pages may result in a heavy use of CPU or power resources. Therefore, it is required to perform scanning in consideration of a situation of a device that performs KSM, for example, a CPU or power resources of a terminal.

Reference numeral 420 illustrates that pages in the memory space are classified according to priorities, and only pages having high priorities are selectively scanned. Referring to the description of FIG. 3, based on a particular scan cycle, pages that have not been merged in the immediately preceding scan cycle are very likely not to be merged even in a subsequent scan. Therefore, it may be efficient not to scan the pages that have not been merged in the immediately preceding scan cycle, in other words, old pages, and to scan only pages newly added to a current scan cycle, in other words, new pages. That is, it may be efficient to assign priorities to new pages in the current scan cycle and then perform scanning.

Reference numeral 430 illustrates adaptive scanning according to a state of a device using KSM, for example, a terminal. The adaptive scanning may include scanning by priorities described in reference numeral 420. For example, scanning and merging may be performed only for a new page when a CPU utilization is high, and scanning and merging may be performed for an old page as well as a new page when the CPU utilization is low. Further, a new page may be slowly scanned while an old page may not be scanned when there is an enough space in the memory, and only a new page may be scanned when there is not enough space in the memory.

At the time of a page scan in the memory space, the power consumption may be reduced and an overhead may be minimized, through adaptive scanning. Further, a merging speed may be increased and responsiveness may be improved, through adaptive scanning. It has been described that adaptive scanning is performed based on a CPU or a memory resource. However, a situation of performing adaptive scanning is not limited to situations of a CPU and a memory resource.

Figure 5:
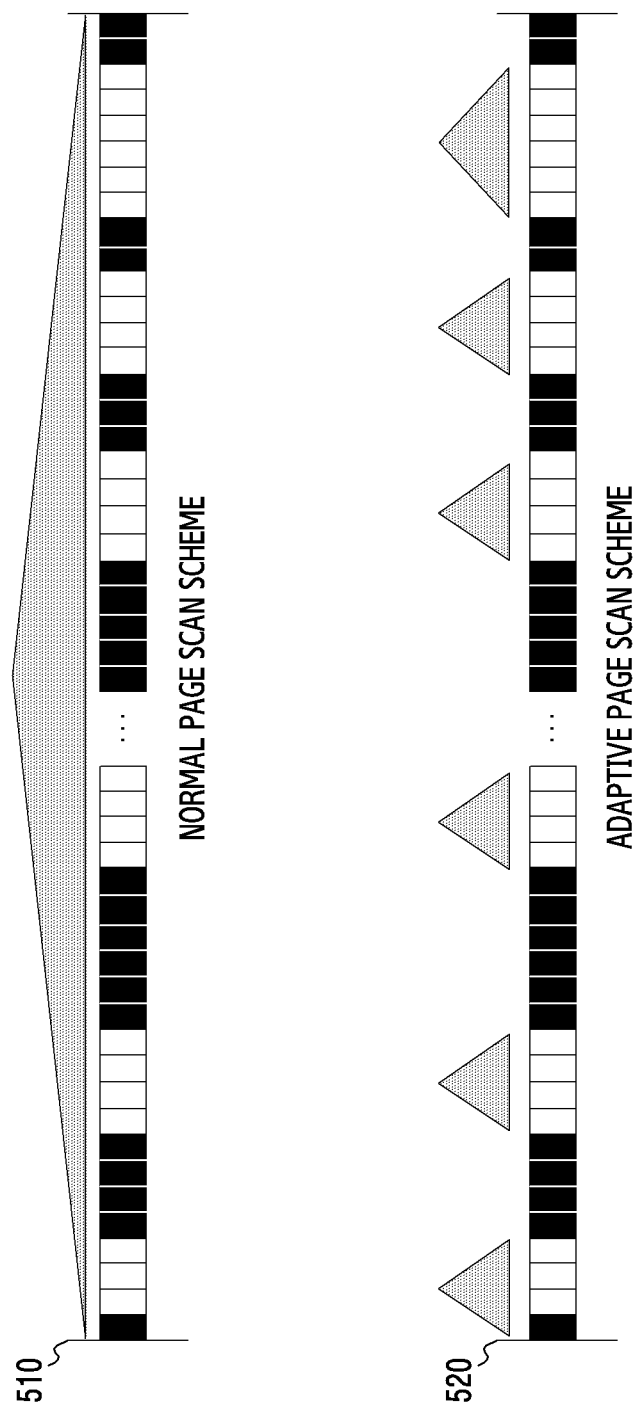
FIG. 5 schematically illustrates selective performing of a page scan according to an embodiment of the present disclosure.

FIG. 5 schematically illustrates selective performing of a page scan according to an embodiment of the present disclosure.

Reference numeral 510 shows scanning of all pages in the memory space in order to merge a target page. However, scanning all pages in the memory space takes a lot of time, and may intensively use a CPU or a power resource.

Reference numeral 520 shows selective scanning of only some pages instead of scanning all pages in the memory space in order to merge the target page. For example, scanning may be performed only for newly added pages in the current scan cycle, excluding pages that have not been merged until the immediately preceding scan cycle. Selective scanning may be adaptively performed according to a situation of a device using KSM, for example, a terminal.

Figure 6:
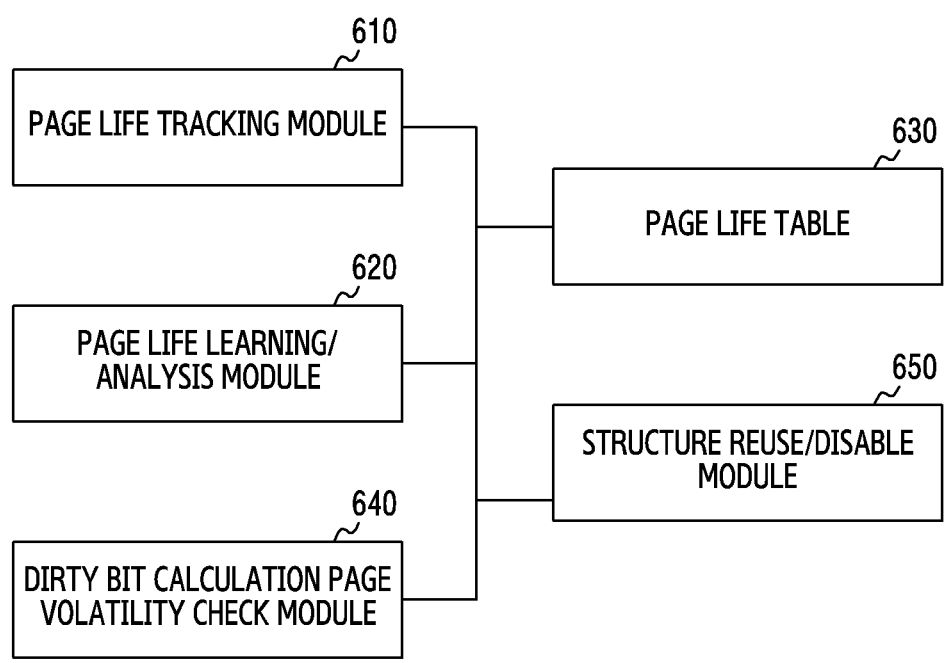
FIG. 6 illustrates a configuration of a device for selectively performing a page scan according to an embodiment of the present disclosure.

FIG. 6 illustrates a configuration of a device for selectively performing a page scan according to an embodiment of the present disclosure.

In a page life table 630, information of remaining pages that have not been merged at each scan cycle of KSM is recorded. The page life tracking module 610 may track a page life at each scan cycle of KSM and may records the tracked page life in the page life table 630. A page life/learning analysis module 620 may learn and analyze information obtained from the page life tracking module 610, and may select pages to be excluded from a current scan. Further, the page life/learning analysis module 620 may determine a time point at which scanning is resumed for the pages having been excluded from scanning.

A dirty bit calculation page volatility check module 640 may determine through dirty bit calculation whether a page is volatile. A dirty bit refers to a value configured to a page table entry (PTE), which corresponds to a page when the page is recorded, and may be used to check whether the page has changed, instead of a checksum. A structure reuse/disable module 650 determines whether KSM reuses or newly generates a structure that performs management for each page.

Figure 7:
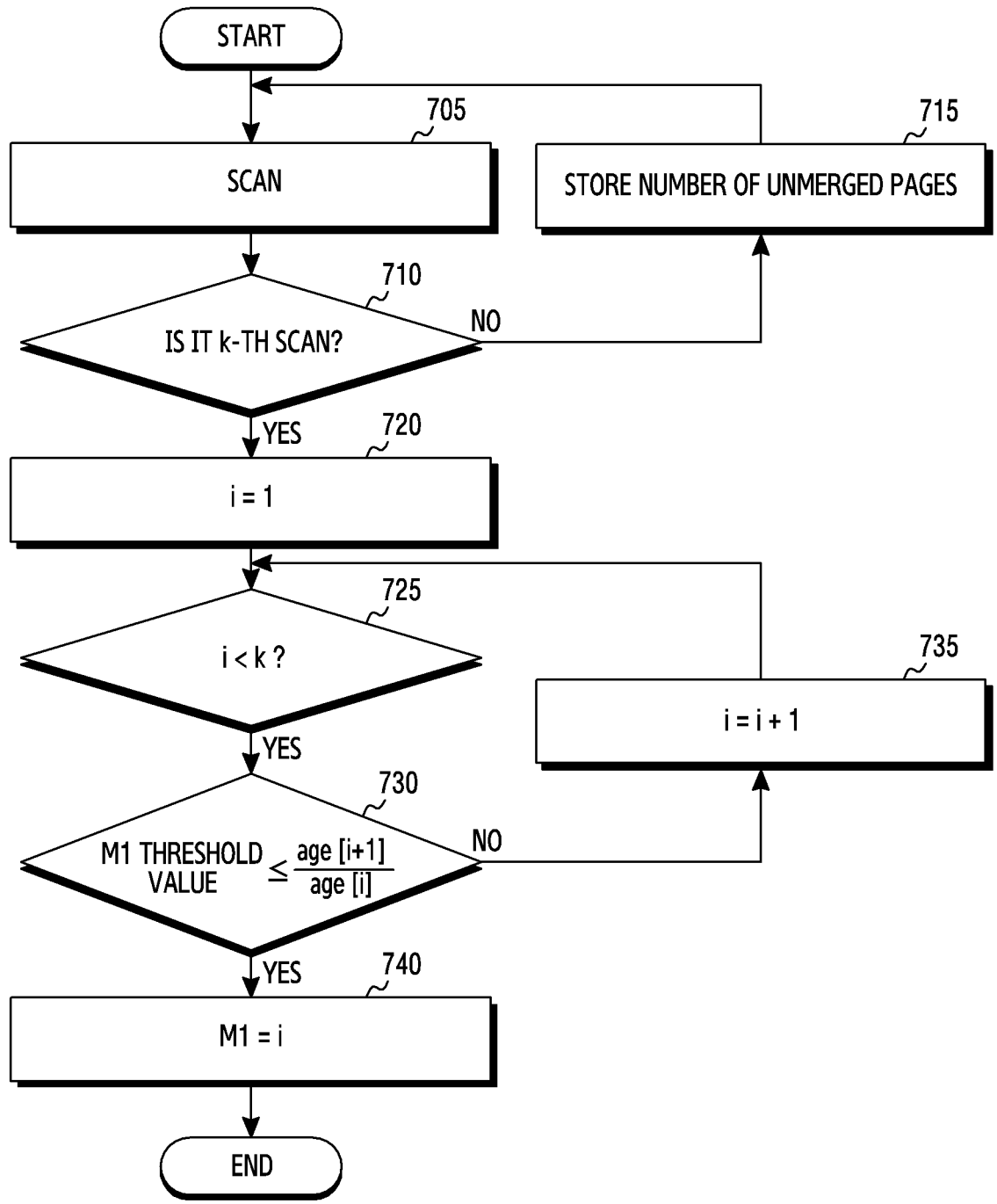
FIG. 7 is a flowchart illustrating a procedure of selecting pages to be excluded from scanning according to an embodiment of the present disclosure.

FIG. 7 is a flowchart illustrating a procedure of selecting pages to be excluded from scanning according to an embodiment of the present disclosure.

In step 705, a scan is performed for initially generated pages. The page life tracking module 610 may perform the scan. The scan determines in step 710 whether the scan is a k-th scan, and when the scan is not the k-th scan, the number of pages that have not been merged until the scan is stored in the page life table in step 715. In other words, while the scan is being performed k times, how many initially generated pages are left at each scan without being merged is recorded in the page life table.

A probability that a page of a particular scan cycle is not merged in the immediately subsequent scan cycle is obtained based on the page life table. For example, the probability may be expressed as a ratio of the number of pages that have not been merged in particular scan cycle i and the number of pages that have not been merged in subsequent scan cycle i+1. In step 730, a probability that initially satisfies a first threshold probability condition specified by a user is retrieved while changing scan cycle i. In step 740, i may be selected as a time point (M1) at which a pages is to be excluded from a scan target. In other words, when pages are not merged until the i-th cycle in which the pages are to be excluded from a scan target, the pages may be excluded from the scan target.

Figure 8:
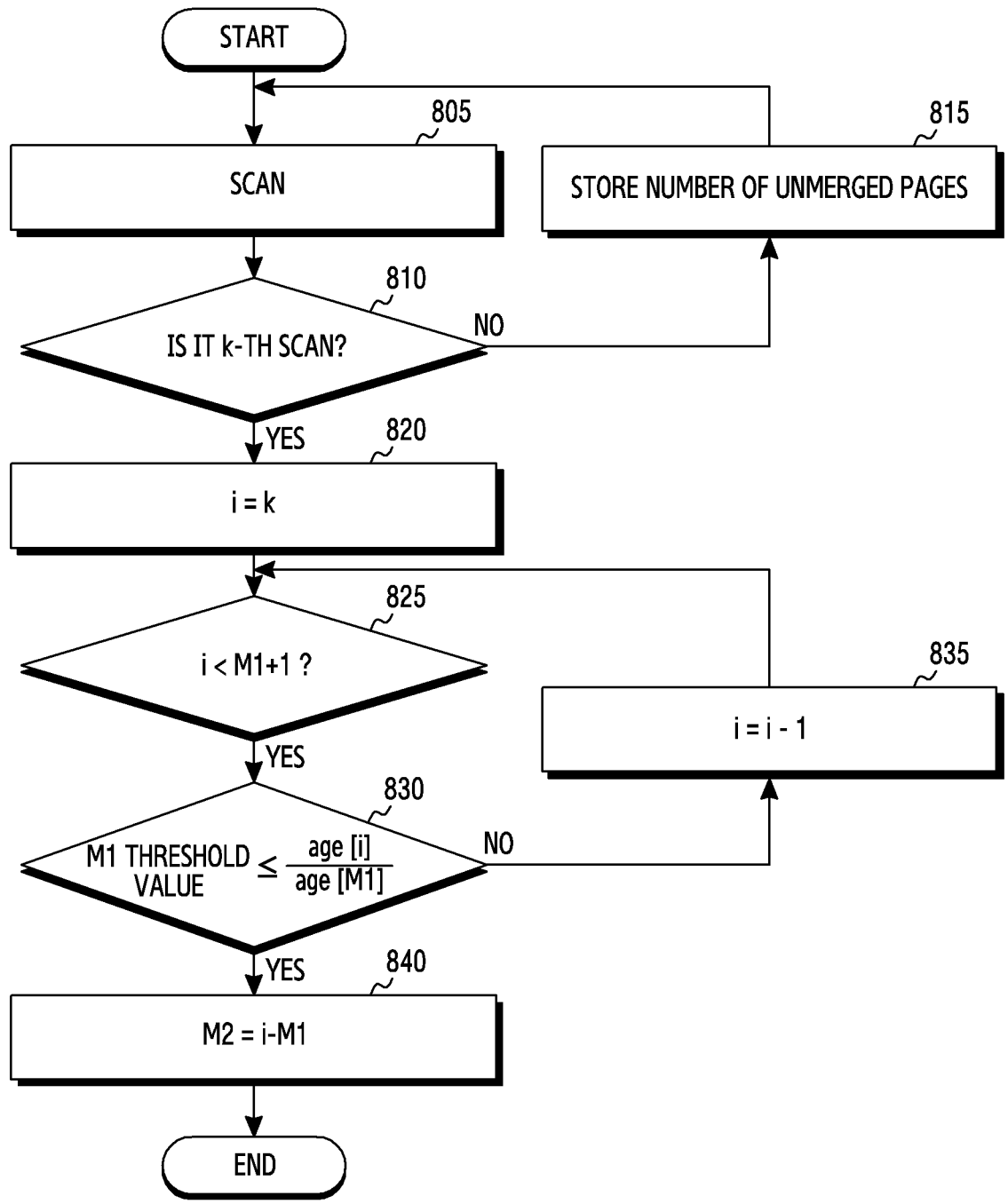
FIG. 8 is a flowchart illustrating a procedure of returning, to a scan target, pages that have been excluded from the scan target.

FIG. 8 is a flowchart illustrating a procedure of returning, to a scan target, pages that have been excluded from the scan target.

When pages in the memory space are scanned to merge a target page, KSM may exclude pages having a lowest merging possibility according to a situation, such as a CPU or a power resource. Further, the excluded pages may be added back to a scan target and scanned based on a CPU, a power resource, or the like. For example, when a CPU utilization is low, the excluded pages may be added back to the scan target and scanned.

In order to determine a time point at which the pages excluded from the scan target return to the scan target, a second threshold probability condition may be set. Specifically, a time point, at which unmerged pages at a point of time when they are excluded from the scan target are not to be merged, may be obtained to the extent that the time point has a value equal to or greater than the second threshold probability condition. Further, a time point M2 at which the excluded pages are returned to the scan target may be obtained by subtraction of the obtained time point and the point of time when the unmerged pages are excluded from the scan target.

In an embodiment of the present disclosure, more reliable M1 and M2 values may be selected by updating the page life table at each specific time point. Further, an area having a high probability that pages are remaining unmerged is classified for each process or on the process based on the M1 and M2 values, the area may be scanned at a lower priority, or may not be scanned.

Figure 9:
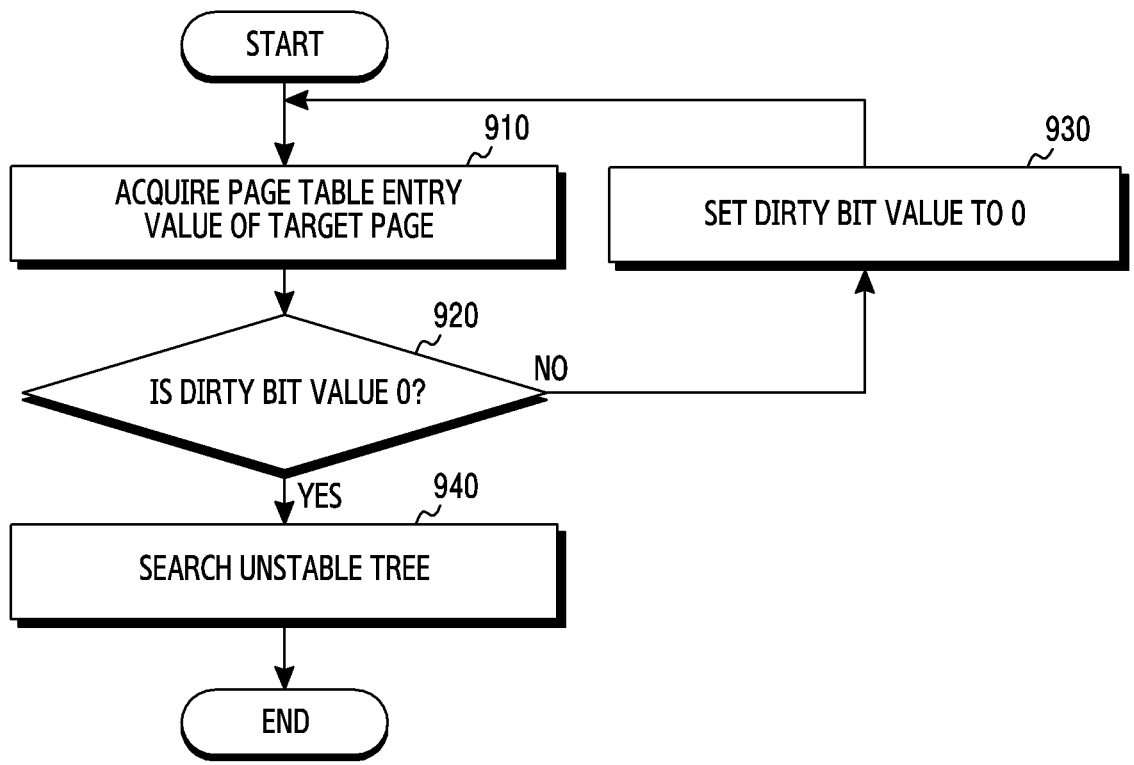
FIG. 9 is a flowchart of determining whether a page is volatile, by using a dirty bit according to the present disclosure.

FIG. 9 is a flowchart of determining whether a page is volatile, by using a dirty bit according to the present disclosure.

When a target page frequently changes, in other words, when the target page is highly volatile, the target page does not need to be merged. Therefore, in order to determine whether the target page needs to be merged, it is required to check the volatility of the target page.

In order to check the volatility of the target page, a dirty bit may be used. In step 910, the page volatility check module does not calculate a checksum, and obtains a page table entry value of the target page. In step 920, the page volatility check module checks a dirty bit value in the entry, and when the dirty bit value is 1, it is considered that the target page has changed, and a procedure moves to step 930 to set the dirty bit value to 0 and then proceed the next scan. This is to check whether the target page changes again in the next scan. If the dirty bit value is 0, the procedure moves to step 940, where it is considered that the target page has unchanged, and an unstable tree search is started.

Figure 10:
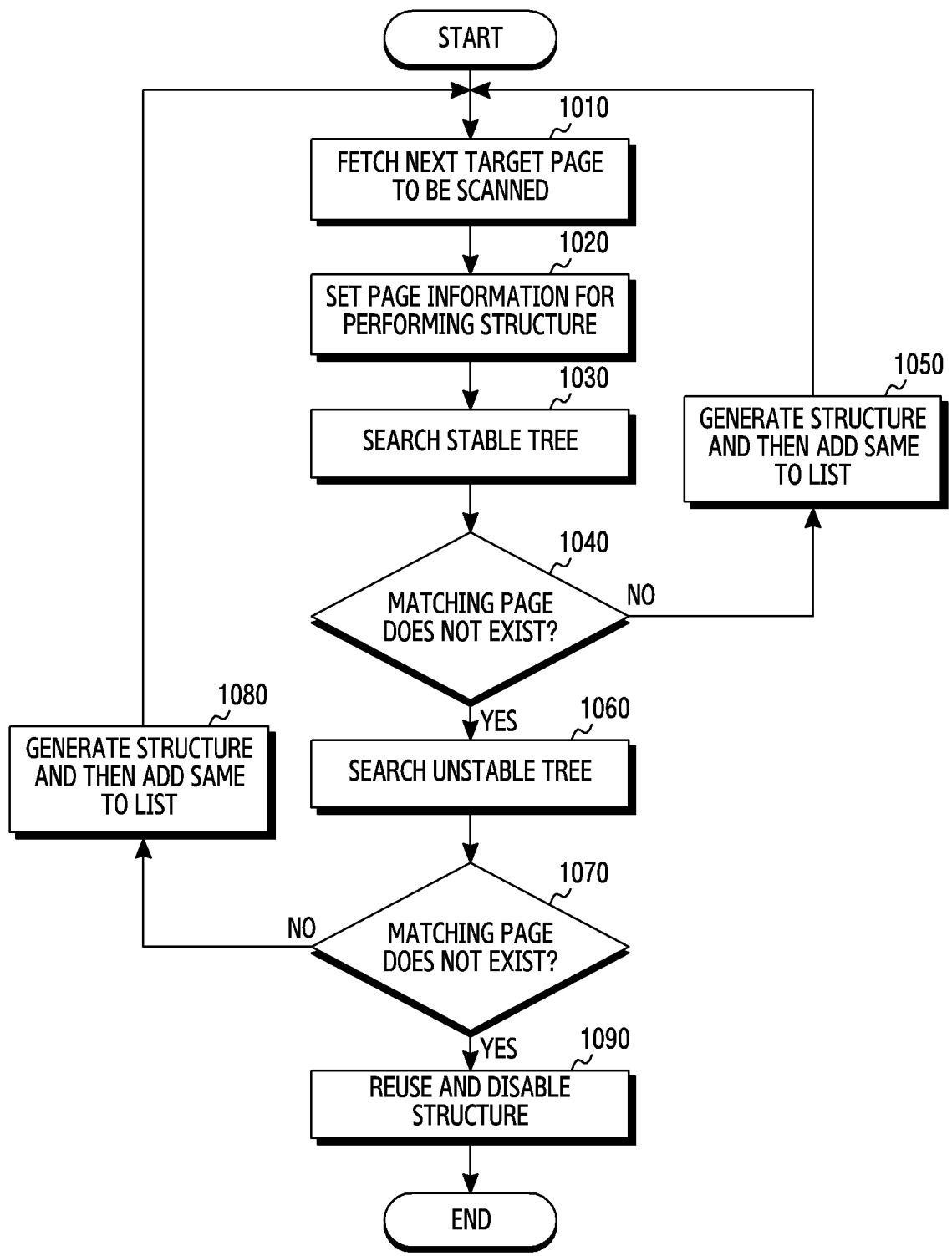
FIG. 10 is a flowchart illustrating a method of reusing or disabling a structure according to the present disclosure.

FIG. 10 is a flowchart illustrating a method of reusing or disabling a structure according to the present disclosure.

When KSM performs page merging, the KSM may manage a structure referred to as rmap_item for each page. However, the structure occupies, for example, 208 bytes per page, and as the number of structures managed by the KSM on a page-by-page basis increases, the more memory is occupied accordingly. Therefore, it is required to reuse or release the structure.

The structure may be used to manage a target page when the target page is in the stable tree or in the unstable tree. Further, when a checksum scheme is used to check whether the target page is volatile, the structure may be present in each page in order to store a checksum.

In the present disclosure, via stable tree scanning or unstable tree scanning of the target page (step 1010, step 1020, step 1030, and step 1060), only when a page having the same content as that of the target page is present (step 1040 and step 1070), a structure for the target page is generated and maintained (step 1050 and step 1080), and when a page having the same content as that of the target page is not present, a previously generated existing structure is reused (step 1090). In other words, with regard to determining whether a page is volatile, in the case of using a dirty bit instead of a checksum, since a structure is not required to be in each page to store the checksum, the structure may be generated and maintained only when a page having the same content is present.

Figure 11:
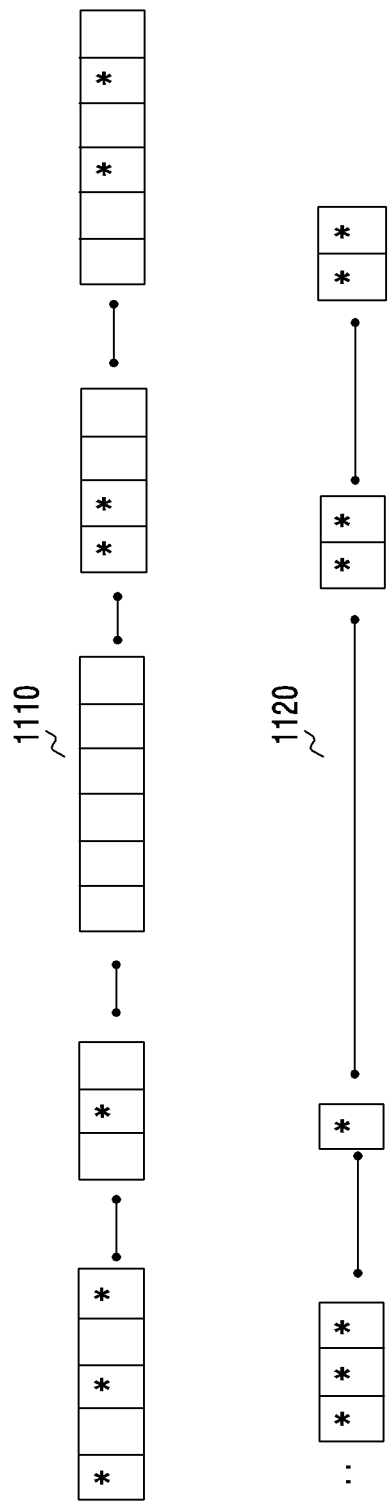
FIG. 11 illustrates an example of a method of generating and maintaining only a necessary structure according to the present disclosure.

FIG. 11 illustrates an example of a method of generating and maintaining only a necessary structure according to the present disclosure.

Reference numeral 1110 shows that all pages in the memory space include respective structures in order to store a checksum. In reference numeral 1110, each rectangle indicates pages including a structure, and pages with an asterisk in each rectangle indicate pages having the same content as that of a target page.

Reference numeral 1120 shows that not all pages of the memory space need to include a structure. In other words, with regard to determining whether a page is volatile, in the case of using a dirty bit instead of a checksum, a structure is not required to be in each page to store the checksum. In this case, via stable tree scanning or unstable tree scanning of the target page, a structure for the target page may be generated and maintained only when a page having the same content as that of the target page is present, and a previously generated existing structure may be reused when a page having the same content as that of the target page is not present.

The present disclosure provides a method and an apparatus wherein, when a KSM execution module merges pages, the KSM execution module excludes pages, which have a low probability of being merged, for a specific time period to reduce unnecessary calculations and resource use so as to efficiently perform scanning and improve a merging speed.

Further, the present disclosure provides the method and the apparatus for improving a calculation speed for a page volatility check, by performing a dirty bit calculation instead of a checksum calculation by the KSM execution module in order to check whether a target page is volatile.

Further, the present disclosure provides the method and the apparatus wherein the KSM execution module may reuse or disable a structure (rmap_item) that manages page merging so as to reduce an overhead used to manage pages.

In order to exclude pages having a low merging possibility, another embodiment of the present disclosure provides the method and the apparatus for improving scan efficiency and a merging speed by using a number of filters when KSM scans a page.

Figure 12:
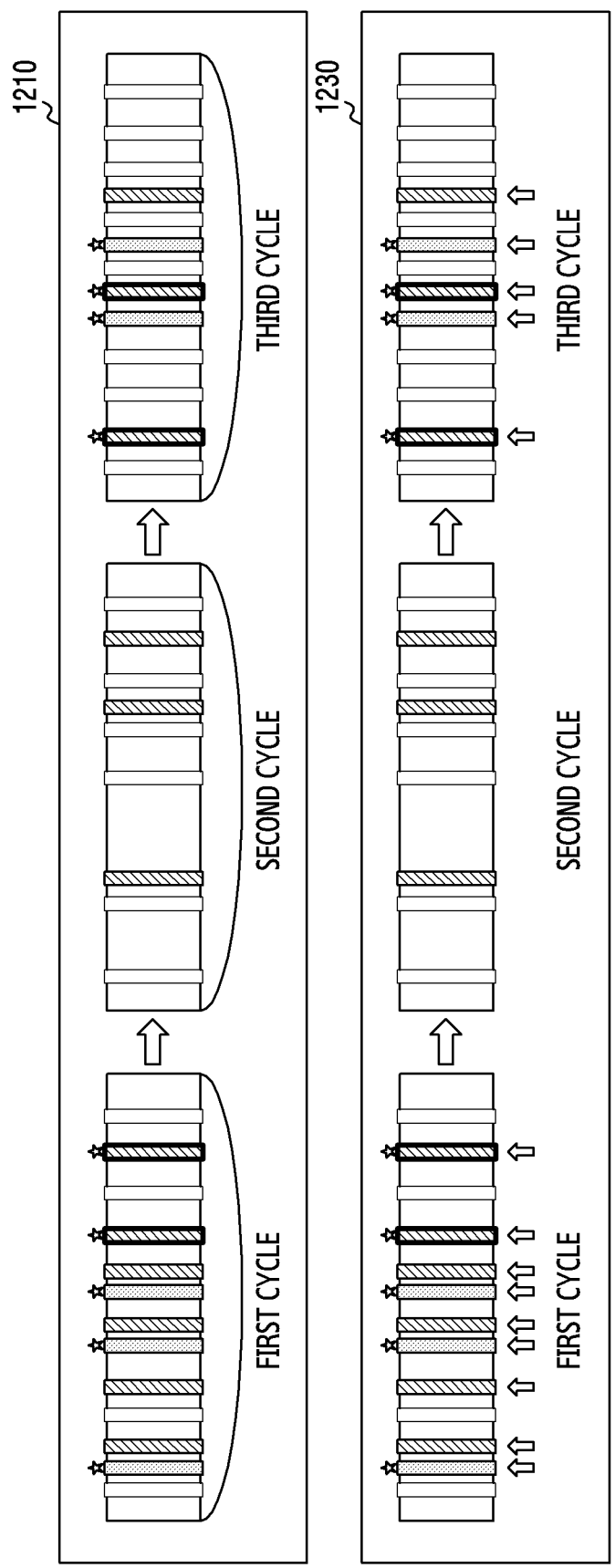
FIG. 12 schematically illustrates excluding of pages having a low possibility of scan-merging from a scan target by using a number of filters according to an embodiment of the present disclosure.

FIG. 12 schematically illustrates excluding of pages having a low possibility of scan-merging from a scan target by using a number of filters according to an embodiment of the present disclosure. Reference numeral 1210 and reference numeral 1230 are illustrated such that cycles thereof correspond to each other.

In order for KSM to merge pages including the same content, all pages existing in the memory space may be scanned as shown in reference numeral 1210. The asterisks in reference numeral 1210 and reference numeral 1230 indicate pages having the same content. According to reference numeral 1210, five merging pages exist in a first scan cycle, no merging page exists in a second scan cycle, and four merging pages exist in a third scan cycle. Although pages required to be merged may be found by scanning all pages in the memory space as shown in reference numeral 1210, this may consume a lot of time as well a resource such as CPU or power.

In order to merge pages including the same content by KSM, as shown in reference numeral 1230, only some pages in the memory space may be scanned in each scan cycle, or scanning may not be performed in a particular scan cycle. For example, a first scan cycle of reference numeral 120 illustrates scanning of only nine pages. The first scan cycle of reference numeral 1230 shows that five merging pages may be found, as the case of scanning all pages, by scanning only nine pages. A second cycle of reference numeral 1230 shows that no scanning is performed. Sine there is no mergeable pages in the second cycle, performance may not be affected even if no scanning is performed. In a third cycle in reference numeral 1230, only five pages are scanned and, in this case, four merging pages may be found as the case of scanning all pages.

Therefore, a method for reducing the number of pages to be scanned is required so that although the number of pages to be scanned decreases, the number of pages to be merged is the same in each scan cycle. The present disclosure provides, as a method for reducing the number of pages to be scanned when the KSM execution module merges pages, a method for eliminating a VMA having a low memory saving effect in advance, and then eliminating scanning of an area having an extremely low memory saving effect, thereby further eliminating scanning of an area having a low memory saving effect for a specific period.

Figure 13:
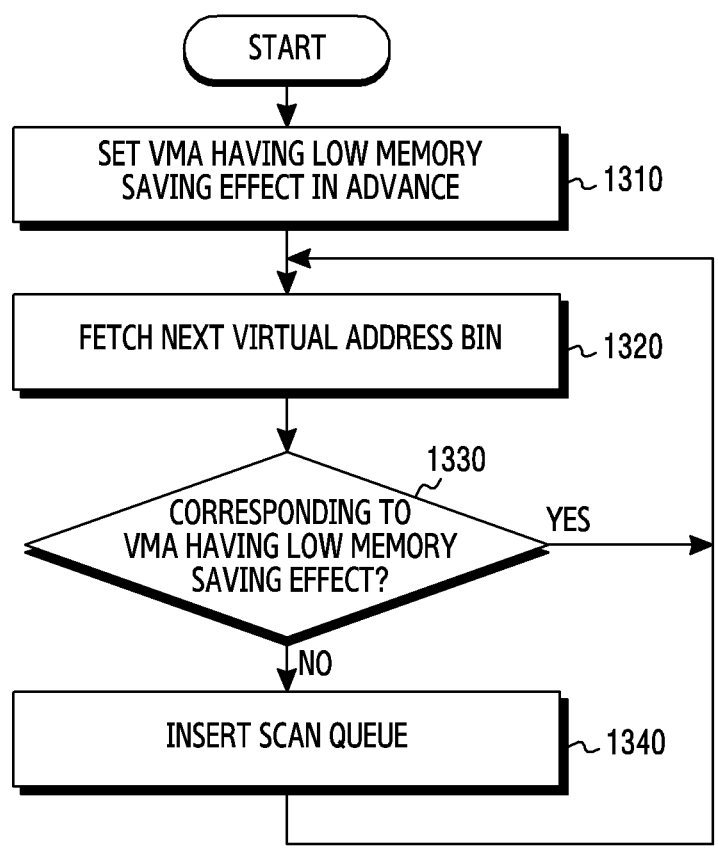
FIG. 13 is a flowchart illustrating a procedure of eliminating a virtual memory area (VMA) having a low memory saving effect in advance according to the present disclosure.

FIG. 13 is a flowchart illustrating a procedure of eliminating a virtual memory area (VMA) having a low memory saving effect in advance according to the present disclosure. The procedure may be performed by the KSM execution module or another device.

In step 1310, the KSM execution module sets a VMA having a low memory saving effect in advance. The VMA having a low memory saving effect may include, for example, a non-moving space, a zygote space, and the like. In step 1320 and step 1330, the KSM execution module determines whether any one VMA is a VMA having a low memory saving effect. When the VMA is determined to have a low memory saving effect, the KSM execution module excludes the VMA from a scan target, and the procedure moves to step 1320 to fetch another VMA. When it is determined that the VMA is not a VMA having a low memory saving effect, the procedure moves to step 1340 and the KSM execution module adds the VMA in a scan queue, in other words, a queue of VMA which may be a scan target.

As described above, a procedure of eliminating a virtual memory area (VMA) having a low memory saving effect in advance may be defined as first level filtering.

Figure 14:
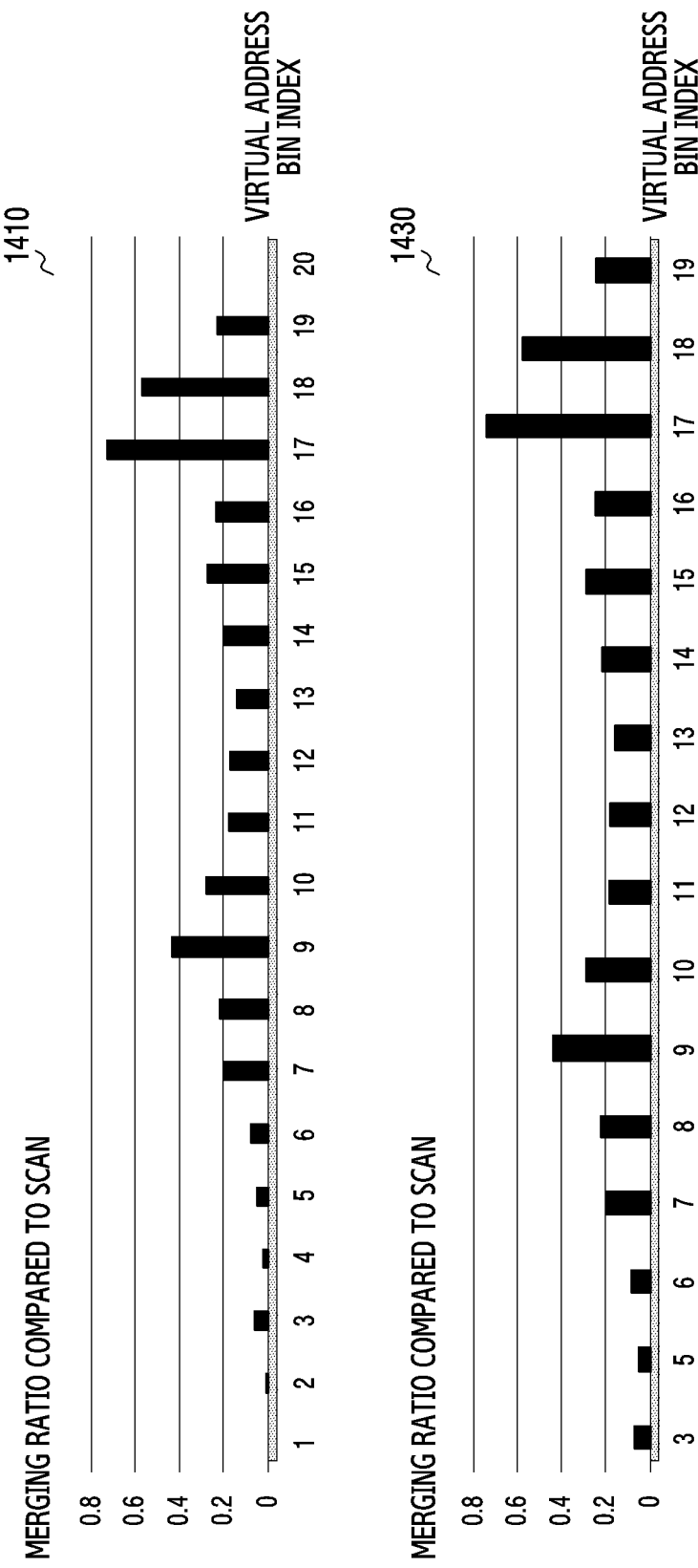
FIG. 14 is a graph used to eliminate scanning of an area having an extremely low memory saving effect according to the present disclosure.

FIG. 14 is a graph used to eliminate scanning of an area having an extremely low memory saving effect according to the present disclosure.

In the present embodiment, after first level filtering is performed, a virtual address area indicating pages in the memory space is divided into areas having a specific size, for example, one megabyte, and the number of times of occurrence of page merging compared with the number of times of scanning is monitored for each area. Each of the divided virtual address areas may be defined as bin. The KSM execution module may improve a memory saving effect by monitoring each virtual address bin and eliminating, in real time, an area having an extremely low memory saving effect, for example, an area where the number of occurrences of page merging is equal to or less than 0.1 percent of the number of times of scanning.

In FIG. 14, in graphs of reference numeral 1410 and reference numeral 1430, the numbers in horizontal axes indicate an index of virtual address bins, and vertical axes indicate a ratio of pages having been merged to the number of times of scanning. The graph of reference numeral 1410 indicates a page merging ratio to the number of times of scanning in each of the virtual address bins. Via the graphs, an area having an extremely low memory saving effect, for example, an area where the number of occurrences of page merging is equal to or less than 0.1 percent of the number of times of scanning may be eliminated. In the present embodiment, virtual address bin indices 1, 2, 4, and 20 have the number of occurrences of page merging equal to or less than 0.1 percent of the number of times of scanning. Reference numeral 1430 shows a graph from which the virtual address bins of the bin indices have been eliminated. In other words, the graph of reference numeral 1430 shows indices excluding virtual address bin indices 1, 2, 4, and 20.

Figure 15:
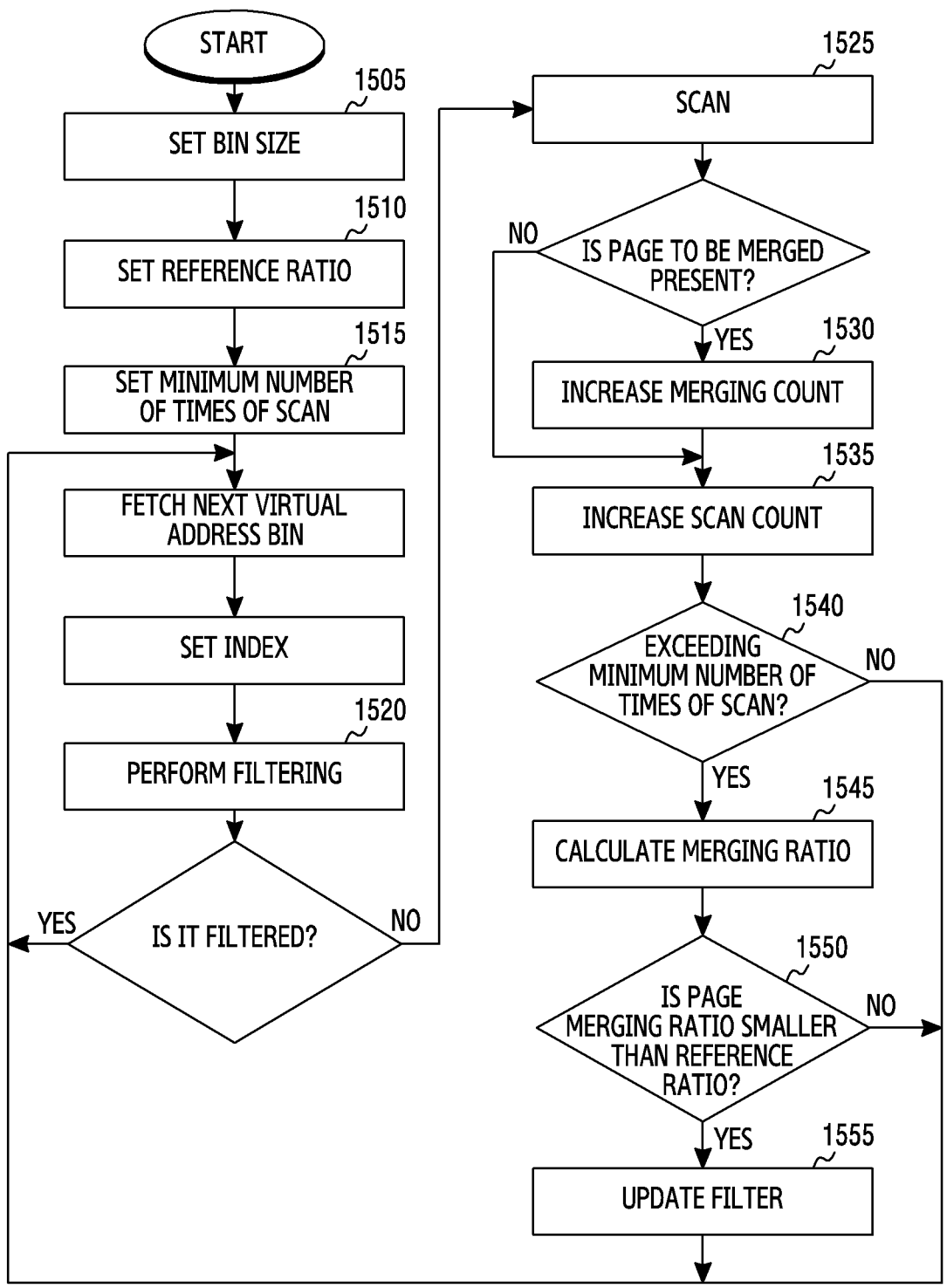
FIG. 15 is a flowchart for eliminating scanning of an area having an extremely low memory saving effect according to the present disclosure.

FIG. 15 is a flowchart for eliminating scanning of an area having an extremely low memory saving effect according to the present disclosure.

In step 1505, a virtual address area indicating pages in the memory space is divided into areas having a specific size, for example, one megabyte. Each of the divided virtual address area may be defined as a bin. In step 1510, a ratio of merged pages to the number of times of scanning, which is to be used to determine an area having an extremely low memory saving effect, in other words, a reference ratio is set. For example, the ratio may be set to 0.001. In step 1515, a minimum number of times of scanning, which is to be used to determine an area having an extremely low memory saving effect, is set. For example, the number of time of scanning may be set to 3000. And then, a virtual address bin to be used to evaluate a memory saving effect is set, and the memory saving effect of the corresponding virtual address bin is evaluated in step 1520. If the virtual address bin is determined to be an area having an extremely low memory saving effect, in other words, when a page merging ratio to the number of times of scanning the virtual address bin is smaller than the ratio determined in step 1510, the virtual address bin is filtered and excluded from a scan target, and a memory saving effect of a subsequent virtual address bin is evaluated. If the virtual address bin is not determined to be an area having an extremely low memory saving effect, a procedure moves to step 1525 and the virtual address bin is scanned. When pages having the same content are present based on a result of the scanning in step 1525, the pages having the same content are merged, a merging count is increased, and then the procedure moves to step 1535 to increase a scan count. When pages having the same content are not present based on a result of the scanning in step 1525, the procedure moves to step 1535 to increase the scan count. In step 1540, it is determined whether the number of times of scanning exceeds the minimum number of times of scanning that has been set in step 1515. When the number of times of scanning does not exceed the minimum number of times of scanning that has been set in step 1515, it is determined that scanning has not been sufficiently performed to eliminate an area having an extremely low memory saving effect, and a subsequent virtual address bin is scanned. When the number of times of scanning exceeds the minimum number of times of scanning that has been set in step 1515, the procedure moves to step 1545 to calculate a ratio of the number of merged pages to the number of times of scanning. In step 1550, it is determined whether the ratio of the number of merged pages to the number of times of scanning, which has been calculated in step 1545, is smaller than the ratio that has been set in step 1510. When the ratio of the number of merged pages to the number of times of scanning, which has been calculated in step 1545, is smaller than the ratio that has been set in step 1510, the corresponding virtual address bin is determined to have an extremely low memory saving effect, and the procedure moves to step 1555 to exclude the virtual address bin from scanning. When the ratio of the number of merged pages to the number of times of scanning, which has been calculated in step 1545, is not smaller than the ratio that has been set in step 1510, it is determined that scanning of the virtual address bin is efficient in memory saving, and a subsequent virtual address bin is scanned.

As described above, eliminating scanning of an area having an extremely low memory saving effect may be defined as second level filtering.

Figure 16:
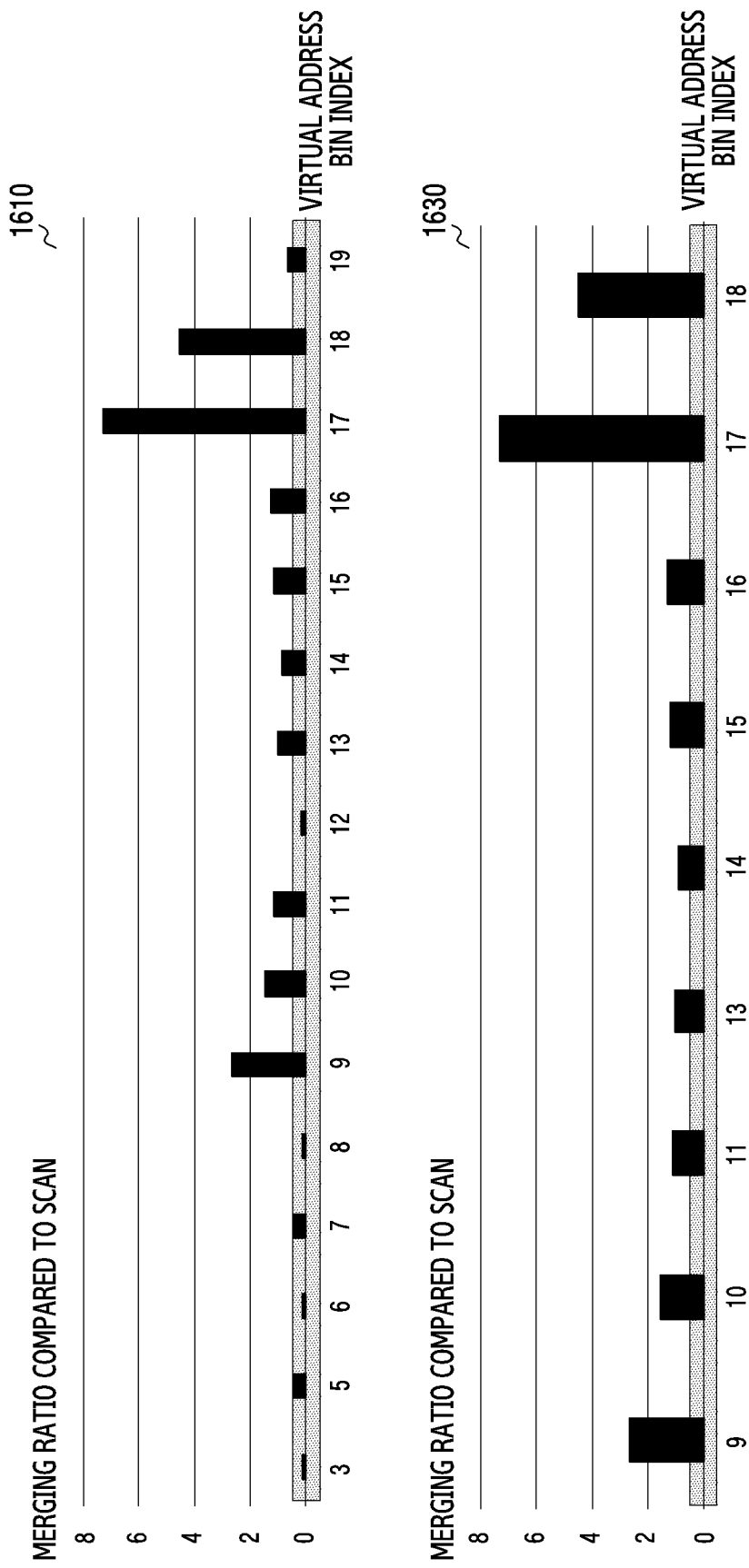
FIG. 16 is a graph used to eliminate an area having a low memory saving effect from scanning for a specific period according to the present disclosure.

FIG. 16 is a graph used to eliminate an area having a low memory saving effect from scanning for a specific period according to the present disclosure.

In the present embodiment, the KSM execution module performs second level filtering, and then analyzes a memory saving effect for a specific period based on information monitored in a procedure of the second level filtering. A virtual address bin determined to have a low memory saving effect for the specific period based on an analysis result is excluded from scanning, and a memory saving effect may be improved. Reference numeral 1610 is a graph showing a ratio of the number of merged pages to the number of times of scanning each of virtual address bins which become a scan target after the second level filtering is performed. Reference numeral 1630 is a graph showing a ratio of the number of merged pages to the number of times of scanning virtual address bins excluding virtual address bins determined to have a low memory saving effect for the specific period.

Figure 17:
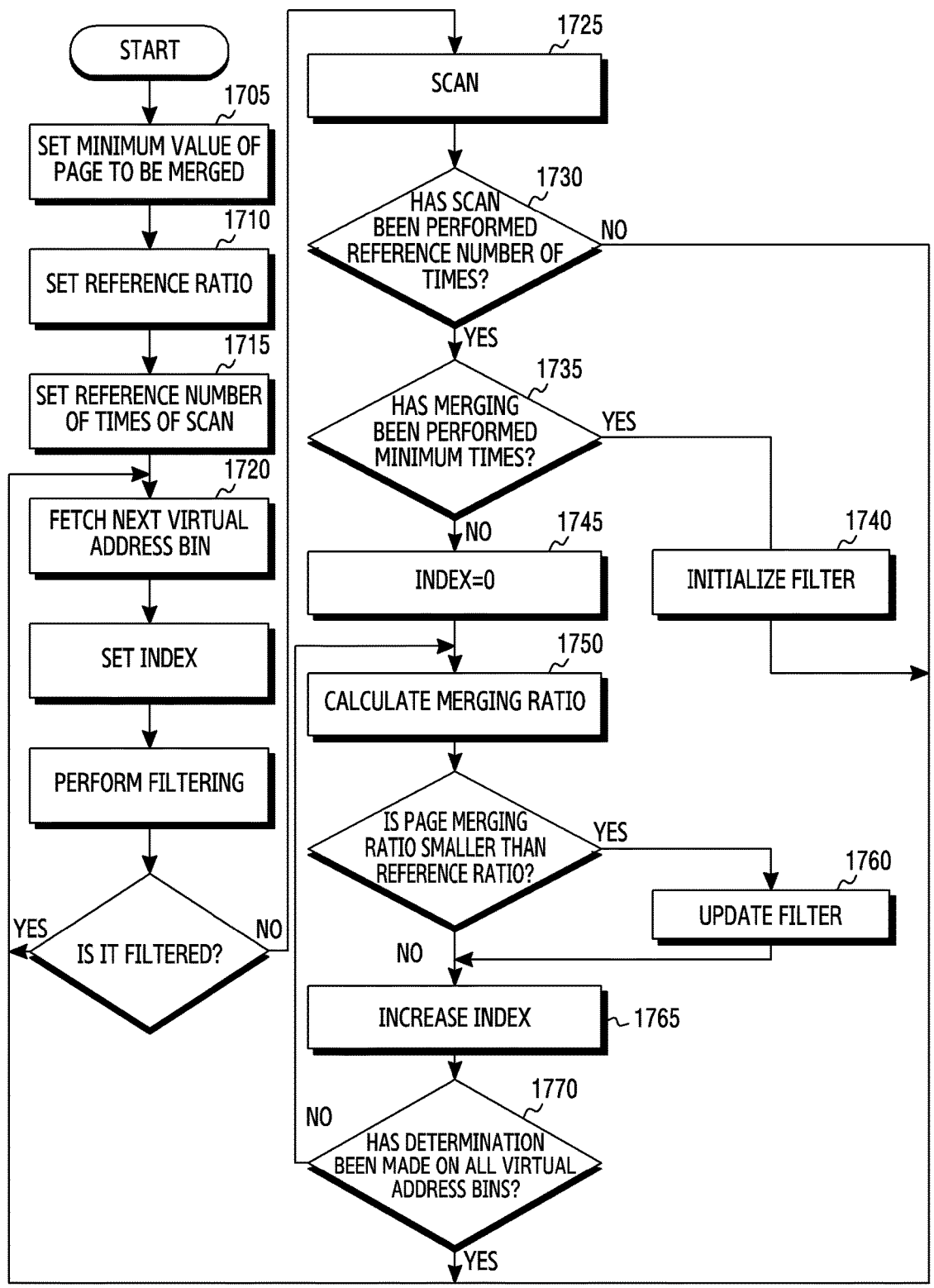
FIG. 17 is a flowchart for eliminating an area having a low memory saving effect from scanning for a specific period according to the present disclosure.

FIG. 17 is a flowchart for eliminating an area having a low memory saving effect from scanning for a specific period according to the present disclosure.

In step 1705, a minimum value of the number of pages to be merged is set. For example, the minimum value may be set to 30000. In step 1710, a ratio of the number of merged pages to the number of times of scanning, which is to be used for determination on a low memory saving effect, in other words, a reference ratio is set. The ratio may be set to 0.05. In step 1715, the number of times of scanning all pages for evaluating a memory saving effect, in other words, a reference number of times of scanning is set. The number of times of scanning all pages may be set to 5. Subsequently, a memory saving effect of a target virtual address bin is evaluated in step 1520. In step 1520, when the virtual address bin is determined to have a low memory saving effect for a specific period, the virtual address bin is filtered and excluded from a scan target, and a memory saving effect of a subsequent virtual address bin is evaluated. If it is determined that the memory saving effect of the virtual address bin for the specific period is not low, a procedure moves to step 1725 to scan the virtual address bin. Subsequently, in step 1730, it is determined whether all pages to be scanned have been scanned exceeding the number of times of scanning, which has been set in step 1715. If all pages to be scanned have not been scanned exceeding the number of times of scanning, which has been set in step 1715, a subsequent virtual address bin is scanned. If all pages to be scanned have been scanned exceeding the number of times of scanning, which has been set in step 1715, the procedure moves to step 1735 to determine whether the number of total merged pages is smaller than the value that has been set in step 1705. When the number of total merged pages is smaller than the value that has been set in step 1705, the procedure moves to step 1740, where the amount of memory saving is determined to be excessively low, to repeatedly perform memory saving effect analysis for a subsequent virtual address bin. In other words, when the amount of memory saving is excessively low, the memory saving effect analysis may be repeatedly performed in order to generate a memory saving effect over a predetermined level. When the number of total merged pages is not smaller than the value that has been set in step 1705, a ratio of the number of merged pages to the number of times of scanning is calculated with respect to a first virtual address bin in step 1745 and step 1750. Subsequently, in step 1755, it is determined whether a ratio of the number of merged pages to the number of times of scanning the first virtual address bin is smaller than the ratio that has been set in step 1710. If the ratio of the number of merged pages to the number of times of scanning the first virtual address bin is smaller than the ratio that has been set in step 1710, the procedure moves to step 1760 to exclude the first virtual address bin from scanning, and then moves to step 1765 to repeat the procedures corresponding to step 1745 and step 1750 for a subsequent virtual address bin. If the ratio of the number of merged pages to the number of times of scanning the first virtual address bin is not smaller than the ratio that has been set in step 1710, the procedure moves to step 1765 to repeat the procedures corresponding to step 1750 to step 1755 with respect to a subsequent virtual address bin. The procedures are repeated until ratios of the number of merged pages to the number of times of scanning for all virtual address bins are determined in step 1770.

As described above, eliminating scanning of an area having a low memory saving effect for a specific period may be defined as third level filtering.

After the third level filtering is performed to merge pages, the KSM execution module may further perform a procedure of eliminating a page to be scanned according to another embodiment of the present disclosure. In other words, with respect to pages to be scanned even after the third level filtering is performed, the KSM execution module records unmerged pages at each scan cycle, and via a ratio between pages that have not been merged in the immediately preceding scan cycle and unmerged pages in a current scan cycle, the KSM execution module may additionally exclude, from the scan target, pages that have not been merged until a scan cycle in which the ratio satisfies a first threshold ratio for the first time. Further, the KSM execution module may return the pages having been excluded from the scan target via the third level filtering to the scan target according to another embodiment of the present disclosure. For example, the KSM execution module may obtain a time point (or a cycle) farthest from a point of time when pages in the memory space are excluded from the scan target, from among scan cycles in which a ratio is equal to or greater than a second threshold ratio, the ratio between pages that have not been merged at the point of time when the pages in the memory space are excluded from the scan target and the pages that have not been merged in a scan cycle after the point of time when the pages in the memory space are excluded from the scan target, and the KSM execution module may return the pages having been excluded from the scan target to the scan target at a time point obtained by subtraction of the farthest time point and the point of time when the pages in the memory space are excluded from the scan target.

In the present disclosure, the KSM execution module may gradually eliminate scanning of a virtual address area having a low memory saving effect for paging merging so as to improve a memory saving performance, through multilevel filtering, that is, through the first level filtering to the third level filtering.

As another embodiment for managing a system resource, the present disclosure provides a method and an apparatus for managing power resources by efficiently distributing calculations, which are to be performed by a low-speed calculation device and a high-speed calculation device, by an electronic device in order to analyze a user's context-awareness. The high-speed calculation device and the low-speed calculation device herein may be defined according to the relative relationship between a plurality of calculation devices included in a single apparatus. For example, the high-speed calculation device may be defined as a calculation device having a greater number of instructions that can be processed per unit time or using a higher clock frequency.

A method for analyzing a user's context-awareness and an analyzed requirement may be processed in an external environment that is not a mobile terminal environment by using a low-speed calculation device or using a technology including a cloud, etc. However, when user context-awareness analysis and analyzed requirement processing are performed in the low-speed calculation device, a quick response result may not be obtained, and when a device such as an external server is used for performance improvement, a problem of leaking personal information to the outside may occur.

Therefore, the present disclosure provides a method and an apparatus for performing user context-awareness and analysis by using a high-speed calculation device, and processing an analyzed requirement at a high speed and a low power in a mobile terminal environment, by an electronic device.

Figure 18:
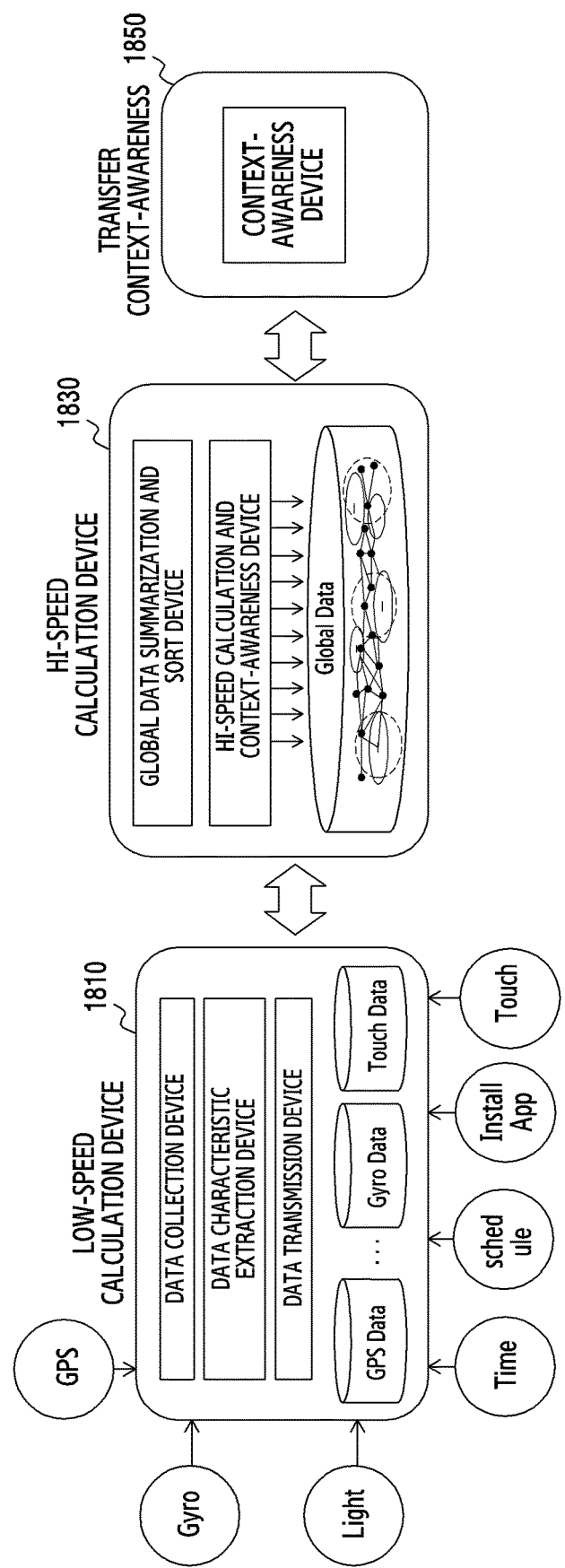
FIG. 18 illustrates an example of performing context-awareness by using a low-speed calculation device and a high-speed calculation device according to the present disclosure.

FIG. 18 illustrates an example of performing context-awareness by using a low-speed calculation device and a high-speed calculation device according to the present disclosure.

A low-speed calculation device 1810 collects data for user context-awareness and extracts a characteristic of the collected data. The data for the user context-awareness may include, for example, user input information, time information, sensor information, multimedia information, location information, gyro information, light information, information on an installed application, and the like. A high-speed calculation device 1830 summarizes and reprocesses the data based on the characteristic of the data, which is extracted by the low-speed calculation device 1810. The high-speed calculation device 1830 may perform context-awareness at a high speed and a low power based on the summarized and reprocessed data. Context-awareness transfer 1850 may correspond to transmitting or transferring information on the performed context-awareness to a user.

Figure 19:
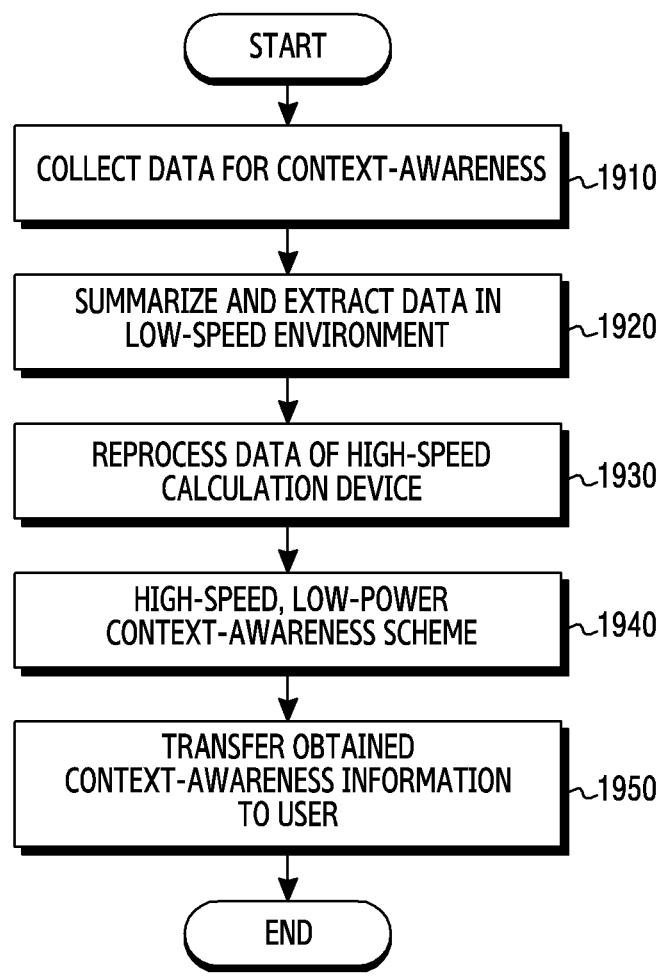
FIG. 19 is a flowchart for performing context-awareness by using the low-speed calculation device and the high-speed calculation device according to the present disclosure.

FIG. 19 is a flowchart for performing context-awareness by using the low-speed calculation device and the high-speed calculation device according to the present disclosure.

In step 1910, the low-speed calculation device collects data for user context-awareness. The collected context-awareness data may be stored in a separate storage existing within the low-speed calculation device. The data stored in the storage may be simple information for which summarization and selection are not performed. The data stored in the storage may include, for example, time, a system content such as a network state, location information, movement (acceleration, gyro information, etc.), a surrounding environment (brightness, temperature, humidity, ultraviolet, etc.), a sensor content such as user situation information (a proximity sensor, a heart rate sensor, etc.), a user schedule, a user content such as interests (an application, a keyword, etc.), picture information, and multimedia information such as sounds in a surrounding environment.

In step 1920, the low-speed calculation device summarizes the context-awareness data collected in step 1910, or extracts a characteristic of the data. In other words, in order to transmit the context-awareness data collected by the high-speed calculation device having a data storage of a small size, the low-speed calculation device summarizes the data or extracts a characteristic of the data. Summarizing the data or extracting the characteristic of the data may minimize calculation and data transmission overheads. Extracting the characteristic of the data and summarizing the data may be performed based on a separate information summarization scheme according to each of the collected characteristic of the data. For example, the low-speed calculation device may extract the characteristic of the data and may summarize the data, based on information on the amount of changes per time unit. The low-speed calculation device may extract a user's moving state (e.g., on foot or by car) or destination information by using information related to the user's movement, such as a global positioning system (GPS) or acceleration. Alternatively, the low-speed calculation device may distinguish whether the user is sleeping, exercising, or resting, based on a user state obtained by a heart rate sensor, etc. As another example, the low-speed calculation device may extract the characteristic of the data and may summarize the data based on time unit average information. For example, the low-speed calculation device may extract the characteristic of the data and may summarize the data based on environmental elements, such as brightness, temperature, and the like. For still another example, the low-speed calculation device may extract the characteristic of the data and may summarize the data based on an external network input, such as weather information. For still another example, the low-speed calculation device may extract the characteristic of the data and may summarize the data based on a user input. For example, the low-speed calculation device may extract a user's interests by using an application installed in a terminal or a picture taken by a camera, may extract the characteristic of the data, and may summarize the data.

In step 1930, the high-speed calculation device reprocesses the data based on the characteristic of the data, which is extracted by the low-speed calculation device. Since a storage of the high-speed calculation device, for example, an SRAM, has a smaller capacity compared with a storage of the low-speed calculation device, for example, a DRAM, it is required to establish the data in the form of a virtual database within the storage of the high-speed calculation device. A scheme for reprocessing and minimizing the data to improve access performance, by the high-speed calculation device, may include content-based addressing, data de-duplication, data rearrangement for vector calculation, and the like. The content-based addressing includes converting, into the form of a key value, the characteristic of the data to be stored so as to use the same as an address. For example, a hashing data scheme based on an address size may be used. In the data de-duplication, when addresses indicating the characteristic of the data are the same based on the content-based addressing, data corresponding to the same address is eliminated. The data rearrangement for vector calculation corresponds to a change into a data form enabling quick access via vector calculation. For example, when information such as character strings is redefined according to a byte unit, quick access may be possible. In other words, concurrent access to 64 bytes may be possible via 512-bit vector calculation.

In step 1940, the high-speed calculation device may perform context-awareness at a high speed and a low power based on the data reprocessed in step 1930. Concurrent access via vector calculation is possible by establishing the data in the form of a virtual database within the storage of the high-speed calculation device. For example, normal database calculations, such as find, select, join, etc. may be processed at a high speed. Further, calculations, such as find, compare, etc., may be optimized by providing an instruction set specialized for data processing.

In step 1950, context-awareness information obtained via steps 1910 to 1940 is transferred to a user. The present algorithm is then terminated.

Figure 20:
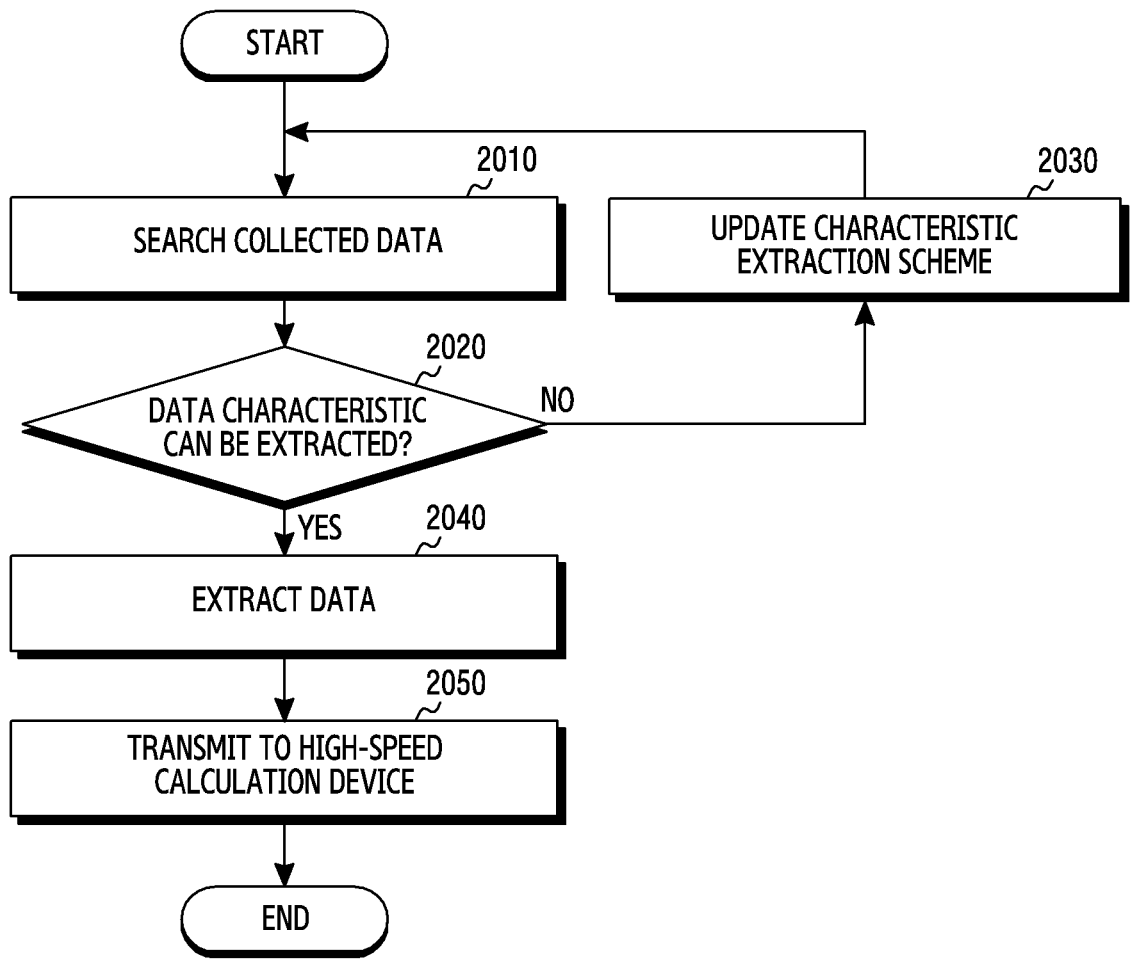
FIG. 20 is a detailed flowchart of summarizing and extracting data in a low-speed environment according to the present disclosure.

FIG. 20 is a detailed flowchart illustrating a procedure of summarizing and extracting data in a low-speed environment according to the present disclosure.

In step 2010, the low-speed calculation device searches for collected data for user context-awareness. The search is for determining whether it is possible to extract the characteristic of the collected data for context-awareness.

In step 2020, it is determined whether extraction of the characteristic of the retrieved data is possible. Whether or not extraction of the characteristic of the data is possible may be determined by a predetermined scheme. For example, the low-speed calculation device may extract the characteristic of the data based on information on the amount of changes per time unit. When extraction of the characteristic of the data is determined to be impossible, a procedure moves to step 2030 to update a data characteristic extraction scheme. For example, instead of extracting the characteristic of the data based on information on the amount of changes per time unit, the low-speed calculation device may extract the characteristic of the data based on an external network input, such as weather information.

When extraction of the characteristic of the data is determined to be possible in step 2020, the characteristic of the data is extracted in step 2040, and the low-speed calculation device transmits the extracted information to the high-speed calculation device.

Figure 21:
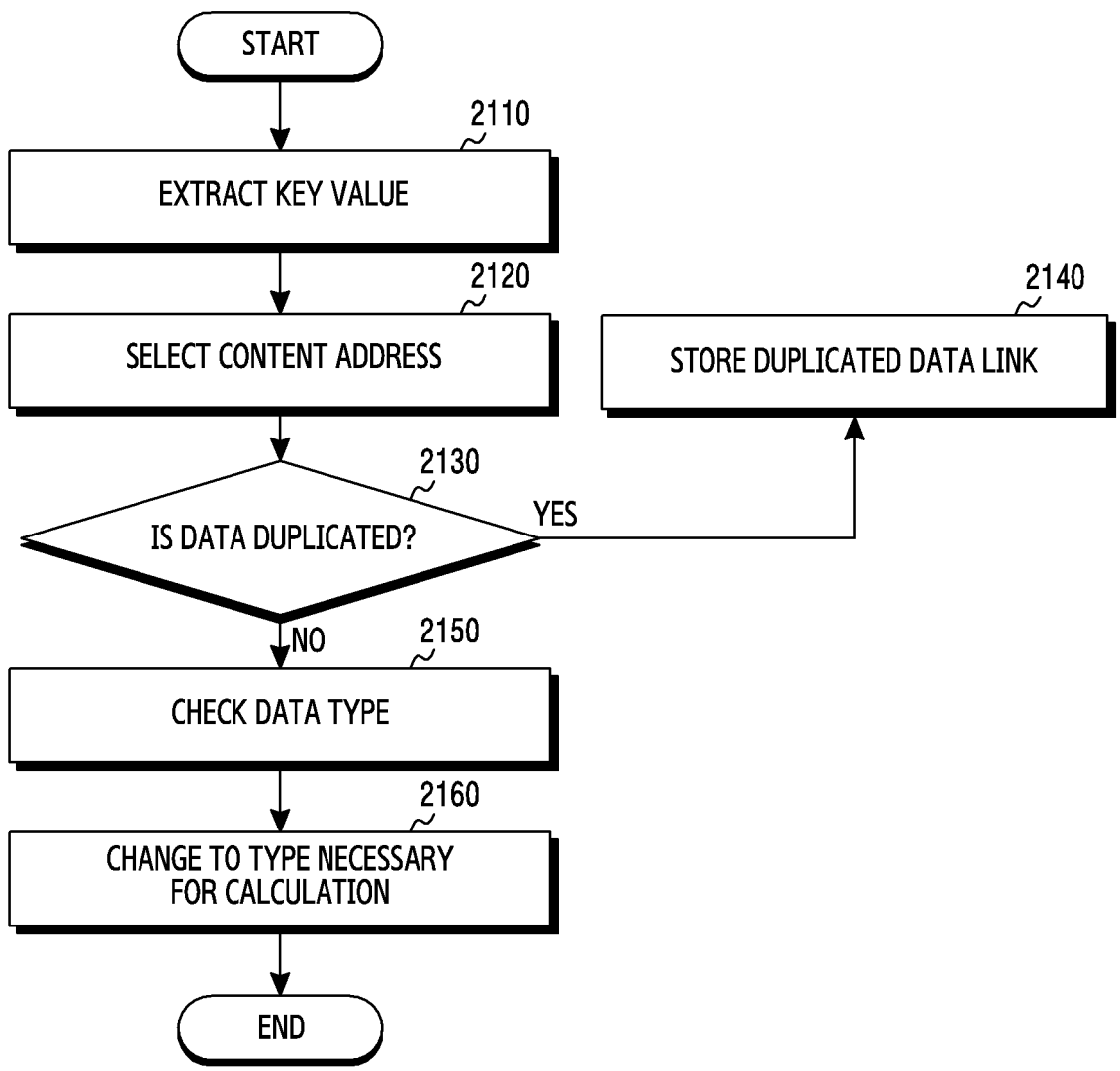
FIG. 21 is a detailed flowchart illustrating a procedure of reprocessing data by the high-speed calculation device according to the present disclosure.

FIG. 21 is a detailed flowchart illustrating a procedure of reprocessing data by the high-speed calculation device according to the present disclosure.

In step 2110, the high-speed calculation device extracts a key value reflecting the characteristic of the data to be stored.

In step 2120, the high-speed calculation device selects a content address according to the extracted key value.

In step 2130, the high-speed calculation device determines whether or not data is duplicated. Determination on duplication of the data is made based on whether an address indicating each data characteristic is the same. When the data is determined to be duplicated, a procedure moves to step 2140 and the high-speed calculation device stores a link of the duplicated data. When it is determined that the data is not duplicated, a procedure moves to step 2150 in which the high-speed calculation device checks a type of the data, and the high-speed calculation device changes the type of the data to a type necessary for calculation, in step 2160. For example, the high-speed calculation device may redefine information, such as character strings, according to a byte unit in order to make a change into a data form enabling quick access via vector calculation.

Figure 22:
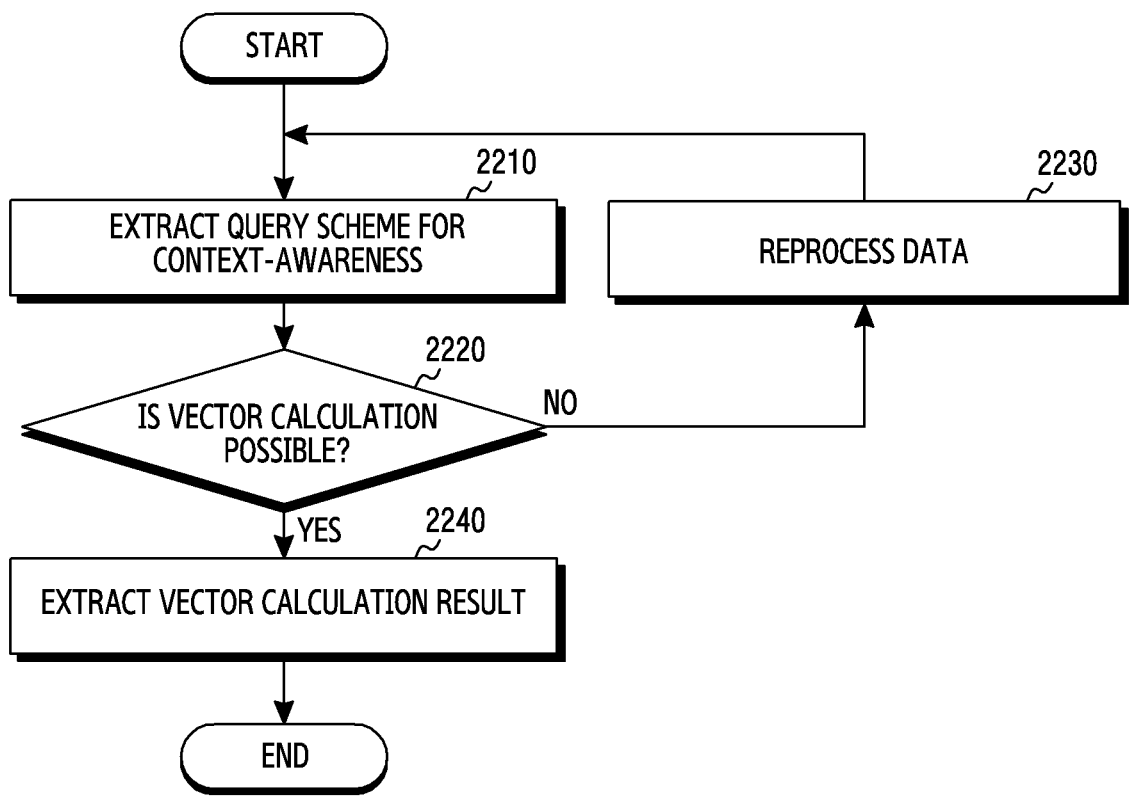
FIG. 22 is a detailed flowchart illustrating a procedure of performing context-awareness at a high-speed and a low power by the high-speed calculation device according to the present disclosure.

FIG. 22 is a detailed flowchart illustrating a procedure of performing context-awareness at a high speed and a low power by the high-speed calculation device according to the present disclosure.

In step 2210, the high-speed calculation device extracts a query scheme for context-awareness.

In step 2220, the high-speed calculation device determines whether it is possible to perform vector calculation for reprocessed data, based on the scheme extracted in step 2210. For example, determination is made on whether quick access via vector calculation is possible by redefining information, such as character strings, according to a byte unit.

When it is determined that vector calculation is possible, a procedure moves to step 2230 to extract a vector calculation result, and then the present algorithm is terminated.

When it is determined that vector calculation is not possible, the procedure moves to step 2240 to reprocess the data so that vector calculation is possible, and then moves back to step 2210 to repeat the procedures described above.

Figure 23:
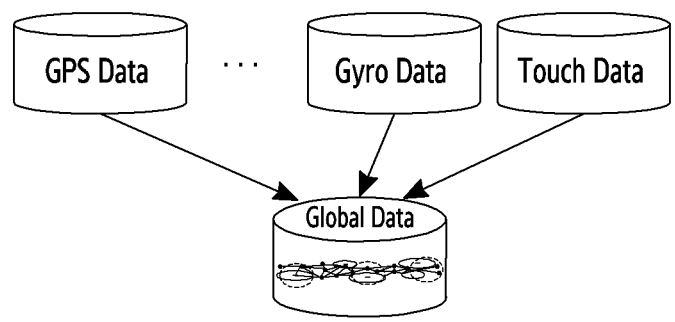
FIG. 23 schematically illustrates extracting and summarizing of characteristics of data by the low-speed calculation device according to an embodiment of the present disclosure.

FIG. 23 schematically illustrates extracting and summarizing of characteristics of data by the low-speed calculation device according to an embodiment of the present disclosure.

A table 2310 shows extraction of data characteristics by using time, changes in GPS, average brightness, outside weather, and information on a user's state of using an application. For example, information indicating that a user is moving at a high speed may be extracted using information of changes in GPS, and information indicating that the user is in an indoor environment may be extracted using brightness information. Further, information indicating that the weather is clear may be extracted using weather information, and information indicating that the user is using SNS may be indicated via information of an application used by the user. Although the table 2310 provides a lot of information, the information may be eventually summarized, by extracting data characteristics, as information indicating that the user is moving at a high speed in an indoor environment while using SNS and the weather outside is clear. In other words, the low-speed calculation device may collect user input information, time information, sensor information, multimedia information, location information, gyro information, light information, information on an installed application, and the like, so as to extract and summarize data characteristics based on the collected data.

Figure 24:
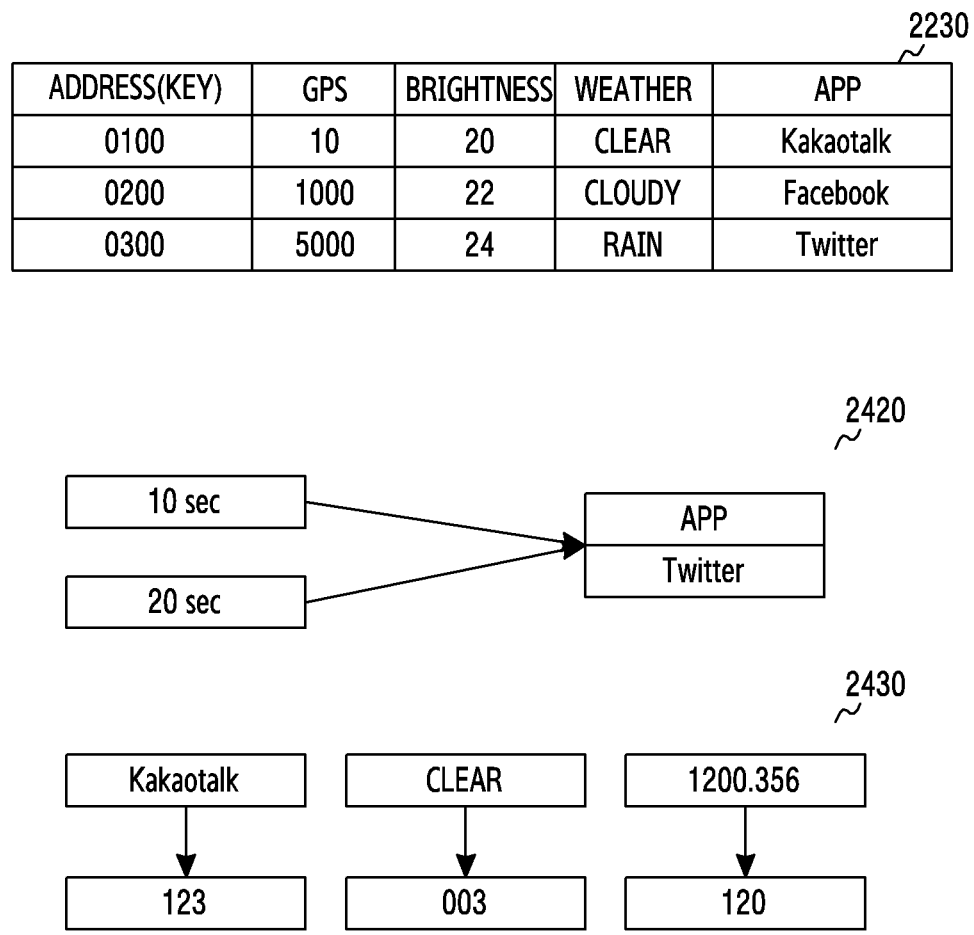
FIG. 24 schematically illustrates reprocessing of data by the high-speed calculation device according to an embodiment of the present disclosure.

FIG. 24 schematically illustrates reprocessing of data by the high-speed calculation device according to an embodiment of the present disclosure.

A table 2230 shows the outcome of performing content-based addressing based on the extracted data characteristics by the high-speed calculation device in order to reprocess data. For example, a combination of GPS information, brightness information, weather information, and information of an application used by a user may be associated with a single address.

Reference numeral 2420 indicates data de-duplication. For example, when the same application is used by a user at different time points, duplicated time information may be eliminated.

Reference numeral 2430 shows that the high-speed calculation device rearranges data for vector calculation. For example, when information, such as character strings, etc., is redefined according to a byte unit, quick access for vector calculation is possible. As shown in reference numeral 2430, when a character string "KakaoTalk" is redefined as the number 123, information "clear" is redefined as the number 003, and a floating point "1200.356" that is a real number is redefined as the number 120 that is an integer, quick access via vector calculation may be possible.

Figure 25:
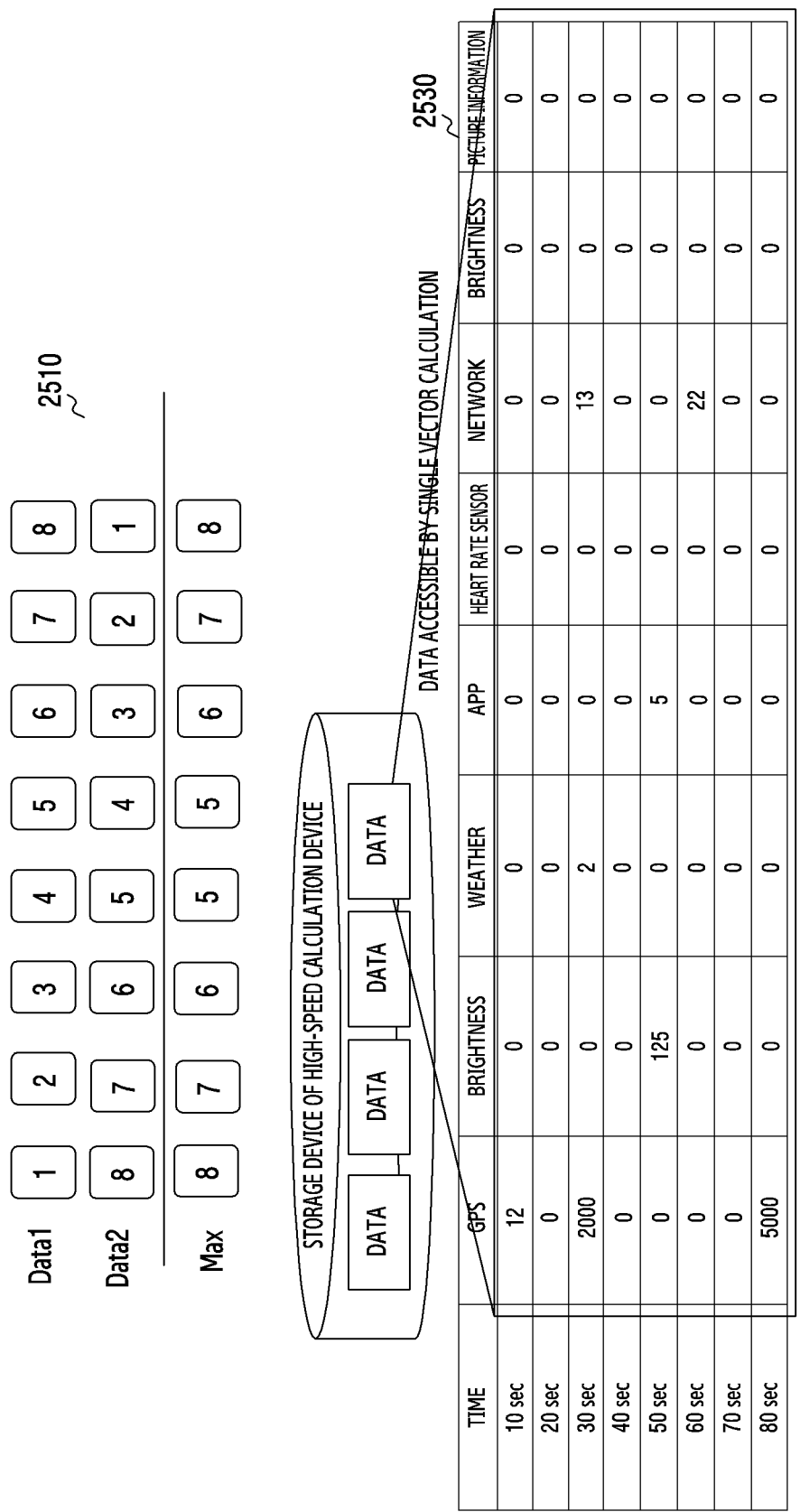
FIG. 25 illustrates construction of data in a virtual database form inside a storage of the high-speed calculation device according to an embodiment of the present disclosure.

FIG. 25 illustrates construction of data in a virtual database form inside a storage of the high-speed calculation device according to an embodiment of the present disclosure.

Reference numeral 2510 shows that the high-speed calculation device retrieves a maximum value via table reference calculation. An instruction set specialized for data processing is provided to the high-speed calculation device, and therefore calculations, such as find, compare, etc., may be optimized. For example, when an instruction to find a maximum value via table reference calculation is given to the high-speed calculation device, the high-speed calculation device may find the maximum value at a rate 10 times faster than the average.

A table 2530 shows data accessible by the high-speed calculation device via single-vector calculation when the data is established in the form of a virtual database within a storage of the high-speed calculation device. Since concurrent access to a plurality of data is possible via vector calculation, the high-speed calculation device may process normal database calculations, such as find, select, join, etc., at a high speed.

As another embodiment for managing a system resource, the present disclosure provides a method and an apparatus for scheduling a graphic processing unit (GPU) in order to efficiently reduce power of an electronic device using a plurality of GPUs.

Various devices use a full display or a partial display depending on a situation for display. For example, when a terminal uses a front cover, the front cover may display a small screen area. For another example, when the user uses the front cover on the terminal, only the side surface display of the terminal may be used. For still another example, a display may be provided on the rear surface of the terminal. In the rear display, for example, a monochrome display may be used to reduce power consumption.

Depending on a particular circumstance, when a display of a device is used differently or, for example, when a monochrome display is used, power use of the device may be reduced. In order to effectively reduce power of the device, the device needs to use a low-power GPU instead of using an existing GPU.

However, under a particular circumstance, for example, when the user uses 3D games and Virtual Reality (VR) or high definition video services on the device, a high-performance GPU with improved performance may be required.

The device may use multiple displays, or a partial display and an application according to a variety of user environments. In addition, the device may use dual and multi GPUs, such as a low-power GPU or a high-performance GPU suitable for each display and application.

The present disclosure provides a method and an apparatus for performing efficient GPU scheduling for an electronic device using multiple GPUs in consideration of a state of the electronic device, application information, and sensor information.

Figure 26:
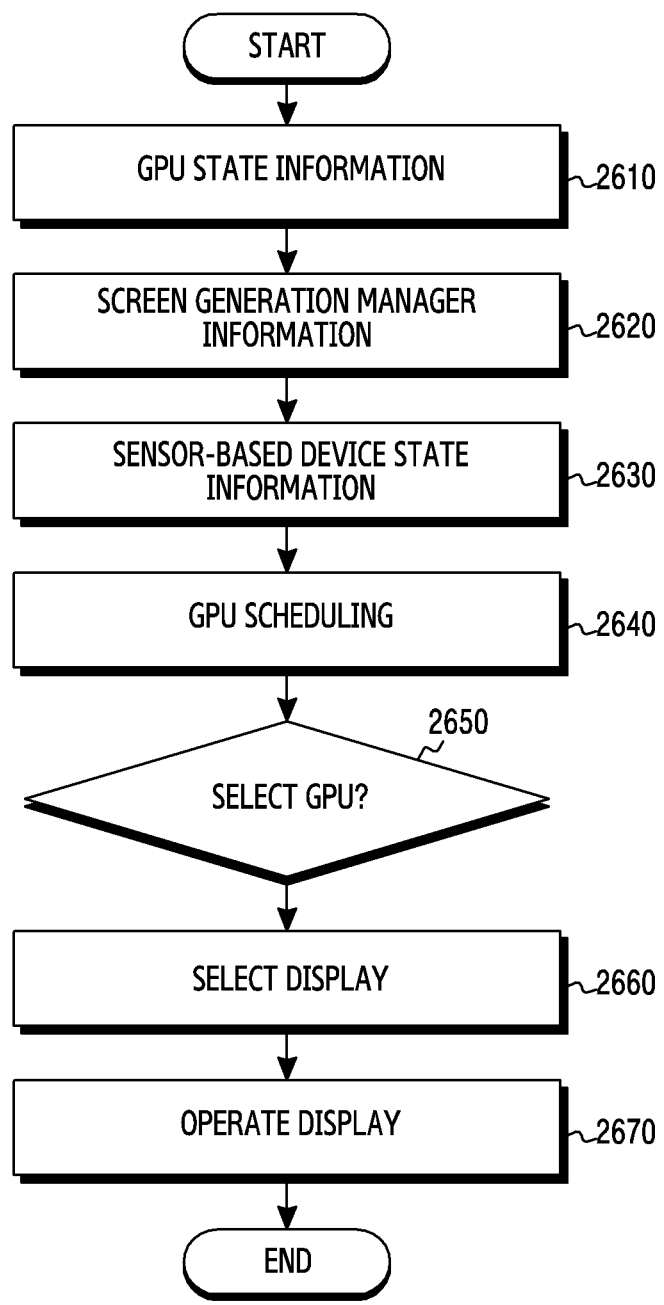
FIG. 26 is a flowchart illustrating a method of selecting a GPU in a device using multiple displays according to an embodiment of the present disclosure.

FIG. 26 is a flowchart illustrating a method of selecting a GPU in a device using multiple displays according to an embodiment of the present disclosure.

In an embodiment of the present disclosure, when a target application operates, a screen corresponding to the application is generated via an operating system, and a GPU processes the screen. A GPU for screen processing may include, for example, a low-power GPU and a high-performance GPU.

In step 2610, the device uses GPU state information. In the GPU state information, the device uses return time information and a request time for processing a corresponding screen in a GPU. Further, the device determines whether a time during which the screen is processed in the GPU satisfies a threshold time that is set by the device.

In order to use the GPU state information, a weight value may be calculated. For example, a $W_{GPU\text{-}TIME\text{-}x}$ value calculated by the following equation may be used.

$$W_{GPU-TIME-X} = \sum\nolimits_{ALL} W_{GPU-TIME-X} = \sum\nolimits_{All} \frac{T_{GPU-TIME-X}}{T_{GPU-TIME-ALL}} \quad \text{EQUATION 1}$$

$W_{GPU\text{-}TIME\text{-}x}$ represents a GPU processing time of an x application compared with a total GPU time, wherein $T_{GFU\text{-}TIME\text{-}ALL}$ represents the total GPU time, and $T_{GFU\text{-}TIME\text{-}x}$ represents the GPU processing time of the x application.

A $W_{GFU\text{-}DEADLIN\text{-}x}$ value may be used together with $W_{GFU\text{-}TIME\text{-}x}$. The $W_{GFU\text{-}DEADLIN\text{-}x}$ value is a weight value for determining whether a time during which a corresponding screen is processed in a GPU satisfies a threshold value that is set by a device.

In step 2620, the electronic device uses screen generation manager information. The screen generation manager information may include, for example, graphic buffer size information, requested screen size information, and screen format information when an application and an operating system request a corresponding screen from each GPU or generate the screen. A weight value $W_{G\text{-}BUFFER\text{-}SEE}$ may be used for the graphic buffer size information, and a weight value $W_{G\text{-}FORMAT}$ may be used for screen format information.

In step 2630, the device may use sensor-based device state information. The sensor-based device state information may include, for example, a degree of folding of a device display, a degree of opening and closing of a front cover, whether a camera is used, and power button and screen touch information. A weight value $S_{DISPLAY}$ may be used for information on the degree of folding of a display, a weight value $S_{CAMERA}$ may be used for information on whether a camera is used, and a weight value $S_{COVER}$ may be used for information on the degree of opening and closing of a front cover.

FIG. 26 shows that step 2610 to step 2630 are sequentially performed. However, step 2610 to step 2630 may be performed in different orders, and each step may be performed at the same time. Further, in order for the device to select and control the GPU, information other than GPU state information, screen generation information at the time of application operation, and sensor information of the device may be used. For example, information on the amount of battery use and GPU temperature information according to the use of the GPU may be used. A weight value $W_{EATHERY}$ may be used for the information on the amount of battery use, and a weight value $W_{GPU-TEMP}$ may be used for the GPU temperature information.

In step 2640 and step 2650, the device selects a GPU by GPU scheduling. In other words, the device may select a GPU by using GPU state information, screen generation information at the time of application operation, and sensor information of the device, and may select a method to control the GPU. Depending on a running application, the device may select one of a low-power GPU and a high-performance GPU or may select both the low-power GPU and the high-performance GPU, in order to process an application.

The device may use the following [TABLE 1] and the described weight values in order to select a GPU.

TABLE 1

|  | APP (X) | APP (Y) | APP (Z) |
|---|---|---|---|
| CPU State Information | $W_{GPU-TIME-X} * W_{GPU-DEADLIN-X}$ | $W_{GPU-TIME-Y} * W_{GPU-DEADLIN-Y}$ | $W_{GPU-TIME-Z} * W_{GPU-DEADLIN-Z}$ |
| Screen Generation Information | $W_{G-BUFFER-SIZE-X} * W_{G-FORMAT-X}$ | $W_{G-BUFFER-SIZE-Y} * W_{G-FORMAT-Y}$ | $W_{G-BUFFER-SIZE-Z} * W_{G-FORMAT-Z}$ |
| HW Information | $W_{BATTERY-X} * W_{GPU-TEMP-X}$ | $W_{BATTERY-Y} * W_{GPU-TEMP-Y}$ | $W_{BATTERY-Z} * W_{GPU-TEMP-Z}$ |
| Weight Value | $(W_{GPU-TIME-X} W_{GPU-DEADLIN-X}) +$ $(W_{G-BUFFER-SIZE-X} W_{G-FORMAT-X}) +$ $(W_{BATTERY-X} W_{GPU-TEMP-X})$ | $(W_{GPU-TIME-Y} W_{GPU-DEADLIN-Y}) +$ $(W_{G-BUFFER-SIZE-Y} W_{G-FORMAT-Y}) +$ $(W_{BATTERY-Y} W_{GPU-TEMP-Y})$ | $(W_{GPU-TIME-Z} W_{GPU-DEADLIN-Z}) +$ $(W_{G-BUFFER-SIZE-Z} W_{G-FORMAT-Z}) +$ $(W_{BATTERY-Z} W_{GPU-TEMP-Z})$ |
| Sensor Information | $(S_{COVER-X} * S_{CAMERA-X} * S_{DISPLAY-X})$ | $(S_{COVER-Y} * S_{CAMERA-Y} * S_{DISPLAY-Y})$ | $(S_{COVER-Z} * S_{CAMERA-Z} * S_{DISPLAY-Z})$ |
| Result | Using Low-power GPU | Using High-performance GPU | Using Multiple GPUs |

First, weight values are summed according to the following equation.

$$(W_{GPU-TIME-c}*W_{GPU-DEADLIN-x})+ \\ (W_{G-BUFFER-SIZE}*W_{G-FORMAT})+ \\ (W_{EATTERY}*W_{GFU-TEMP}) \quad \text{EQUATION 2}$$

In the equation, $W_{GPU-TIME-x}$ represents a GPU processing time of an x application compared with a total GPU time, $W_{GPU-DEADLIN-x}$ is a weight value for determining whether a time during which a corresponding screen is processed in a GPU satisfies a threshold value that is set by a device, $W_{G-BUFFER-SIZE}$ represents a size of a screen generation manager buffer, $W_{G-FORMAT}$ represents a value according to a screen format in a screen generation manager, $W_{EATTRY}$ represents the amount of battery use according to the use of the GPU, and $W_{GPU-TEMP}$ represents a change in a GPU temperature according to the use of the GPU.

Next, weight values reflecting sensor information are summed according to the following equation.

$$(S_{COVER}*S_{CAMERA}*S_{DISPLAY}) \quad \text{Equation 3}$$

In the equation, $S_{COVER}$ represents a weight value for information on the degree of opening and closing of a front cover, $S_{CAMERA}$ represents a weight value for information on whether a camera is used, and $S_{DISPLAY}$ represents a weight value for information on the degree of folding of a display.

By using a summed weight value and weight values reflecting sensor information, the device may select a GPU according to the following equation.

$$\{(W_{GPU-TIME-x}*W_{GFU-DEADLIN-x})+ \\ (W_{G-BUFFER-SIZE}*W_{G-FORMAT})+ \\ (W_{EATTERY}*W_{GPU-TEMP})\}*\{ \\ (S_{COVER}*S_{CAMERA}*S_{DISPLAY})\} \quad \text{EQUATION 4}$$

In other words, depending on a weight value calculated according to [EQUATION 4], the device may select a low-power GPU or a high-performance GPU, or may use both the low-power GPU and the high-performance GPU.

The device may schedule or select a GPU by calculating a weight value for each of GPU state information, screen generation manager information, and sensor-based device state information.

In step 2660, the device selects a display that displays an executed application via the selected GPU. For example, when the device is a smartphone, the display may be a front screen, a side screen, or a screen displayed as a front cover of the smartphone, or a rear screen of the smartphone.

In step 2670, an executed target application is displayed via the selected GPU in the display selected in step 2660.

Figure 27:
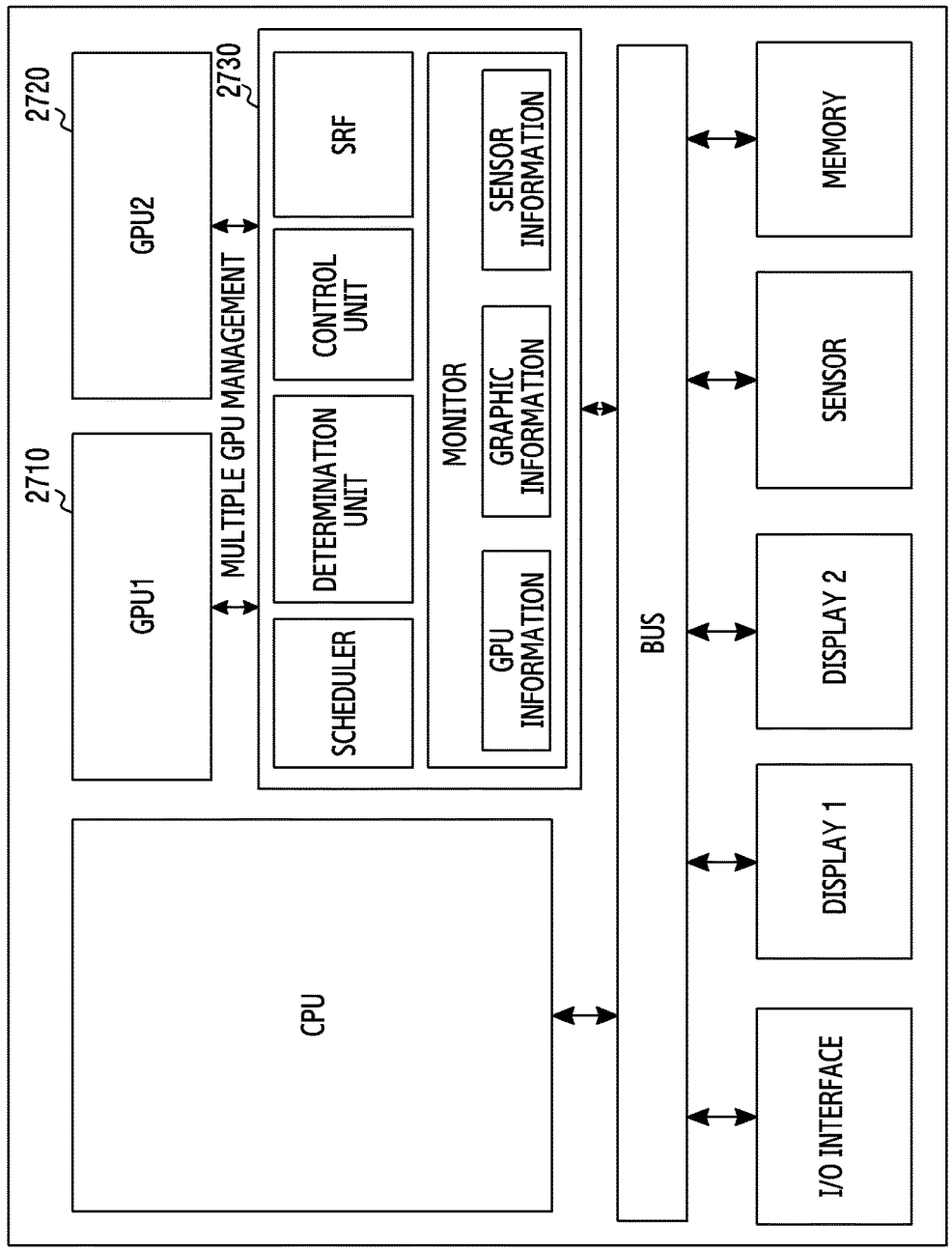
FIG. 27 illustrates a configuration of a multi-display device that manages multiple GPUs according to the present disclosure.

FIG. 27 illustrates a configuration of a multi-display device that manages multiple GPUs according to the present disclosure.

GPU1 2710 and GPU2 2720 are processing units for displaying a screen in a display of a device. GPU1 2710 and GPU2 2720 may be a low-power GPU and a high-performance GPU, respectively.

A multi-GPU management unit 2730 includes a scheduler, a decision unit, a control unit, a service requesting flag (SRF), and a monitoring unit (monitor). The monitoring unit may monitor and store GPU state information, screen manager information, and sensor information. The decision unit may select a GPU by using a weight value based on each of GPU state information, screen manager information, and sensor information. The scheduler may select a GPU according to priorities. The control unit may set and manage a selected GPU. Display 1 and display 2 may output a screen by using selected GPUs, respectively.

Figure 28:
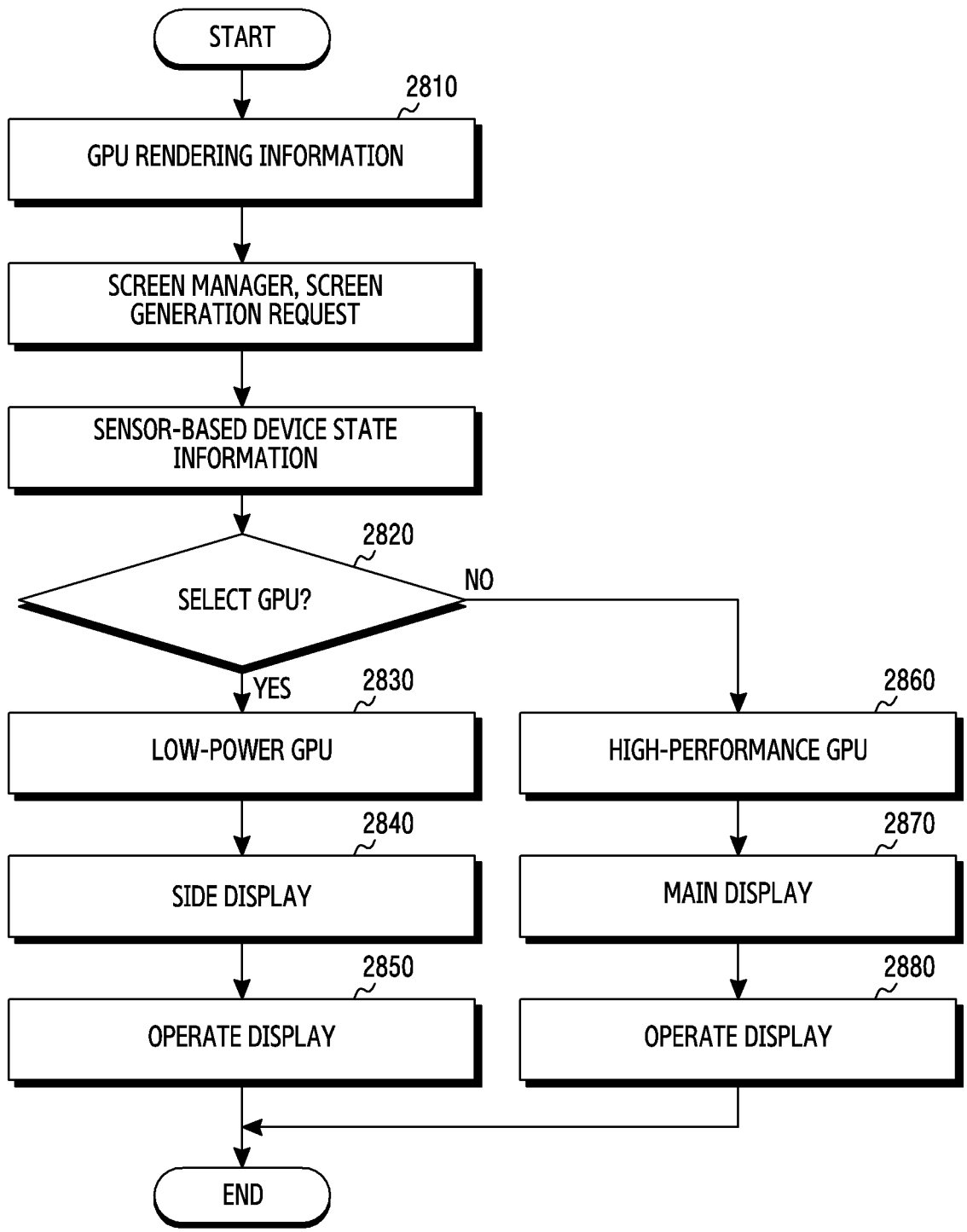
FIG. 28 is a flowchart illustrating a procedure of selecting a high-performance GPU by the device using multiple displays according to an embodiment of the present disclosure.

FIG. 28 is a flowchart illustrating a procedure of selecting a high-performance GPU by a device using multiple displays according to an embodiment of the present disclosure. In the present embodiment, it is assumed that the device is a smartphone, and a front cover of the smartphone is open. In other words, it is assumed that a GPU to be used for a front surface display of the smartphone is selected.

In step 2810, the device uses GPU rendering information in order to select a GPU. And then, the device uses screen generation manager information and sensor-based device state information. However, the information may be used in different orders, and each piece of information may be concurrently used. Further, in order to select a GPU, the device may additionally use, for example, information on the amount of battery use and GPU temperature information according to the use of the GPU.

In step 2820, the device selects a GPU to be used for the front surface display of the smartphone. The device may select a GPU by using, for example, weight values reflecting GPU rendering information, screen generation manager information, and sensor-based device state information, respectively.

Step 2860 shows selection of a high-performance GPU. In other words, the selection shows that it is desirable to use a high-performance GPU to support front surface display of the smartphone. The high-performance GPU supports display on the front surface of the smartphone in step 2870, and the display may be operated in step 2880.

Step 2830 shows selection of a low-performance GPU. For example, when the front cover of the smartphone is closed, it may be desirable to use a low-performance GPU in order to display a content on the front cover or to perform displaying on a side surface of the smartphone. The low-performance GPU supports front cover display or side surface display of the smartphone in step 2840, and the display may be operated in step 2850.

The present embodiment shows procedures of selecting a GPU depending on whether a front cover of a smartphone is open or not. However, a situation in which a GPU is selected may vary. For example, a different GPU may be selected depending on a situation, such as whether a camera is used, whether a display is folded or a degree of display folding, a degree of power consumption, a degree of temperature change, a case of using a side surface display in a state where a cover is closed, a case of using a rear surface display, and whether a user uses VR. In addition, when selecting a GPU, not only one of a low-power GPU and a high-performance GPU may be selected, and but also both thereof may be selected to support display. For example, when multiple GPUs are used for VR, each GPU may separately generate each of divided screens, or the screens generated by respective GPUs may be combined.

As still another embodiment for managing a system resource, the present disclosure provides a method and an apparatus capable of reducing power consumption of a mobile device without affecting a performance perceived by a user, by appropriately distributing resources in accordance with an application operated in the mobile device.

The mobile device may reduce power consumption via resource control. For example, the mobile device may be able to enter a low-power mode manually, and manually controlling power of the mobile device implies a forced performance constraint of hardware resources. In the manual low-power mode, the priority between performance and energy depends entirely on a user's choice. If the user values energy and thus enables the mobile device to enter the low-power mode, hardware resources, such as a display, a network module, a CPU, etc., allow forced performance degradation throughout the system via screen brightness, a network awake cycle, a CPU frequency drop, and the like.

Low power may be achieved by utilizing software resource control as well as hardware resource control. Achieving low power via controlling software resources and achieving low power via controlling hardware resource are in common in that both relate to manual low-power mode entry, but resource objects to be controlled are different. Software resource control may include blocking operations that are running in the background of the mobile device, for example, application refresh, mail and data update, automatic download, notification lock, some application-related services, and some visual graphical elements. Software resource control is not a fundamental solution for energy optimization. However, since software resource control enables, as hardware resource control, low-power mode entry according to user selection, it may be a low power method that may be utilized as needed.

Achieving low power via hardware resource control or software resource control may cause a forced performance constraint of hardware or software, and may affect a performance perceived by a user. When the mobile device enters the low-power mode via hardware resource control, the mobile device may obtain gain in terms of energy consumption, but a limitation in performance may occur in each hardware module due to the hardware resource control, and the limitation in performance may directly affect a user's visual and sensory elements. Further, when the mobile device enters the low-power mode via software resource control, an operation processed in the background may be blocked due to the software resource control so as to affect user convenience, and an application may be executed in a way different from an application developer's intention.

Therefore, it is required to achieve energy consumption optimization without affecting a performance perceived by a user, via distributing resources reflecting an operation state and a characteristic of an application.

The present disclosure provides a method and an apparatus for distributing resources by reflecting a state and a characteristic of a process in a mobile device.

The present disclosure provides the method and the apparatus for distributing an upper level resource to a process that affects a perceived performance, and distributing a lower level resource to a process that does not affect a perceived performance, based on weight values reflecting a state and a characteristic of a process.

Figure 29:
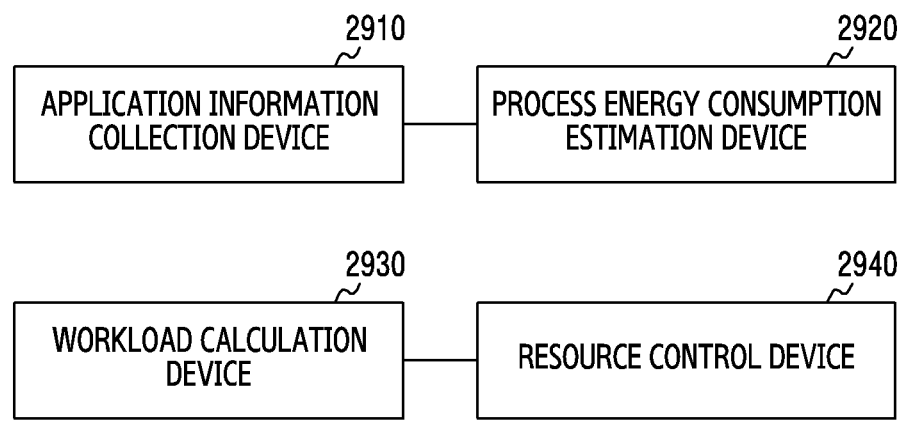
FIG. 29 illustrates a configuration of a device for resource allocation to each process according to the present disclosure.

FIG. 29 illustrates a configuration of a device for resource allocation to each process according to the present disclosure. A detailed function for each element will be described in detail in FIG. 31.

Figure 30:
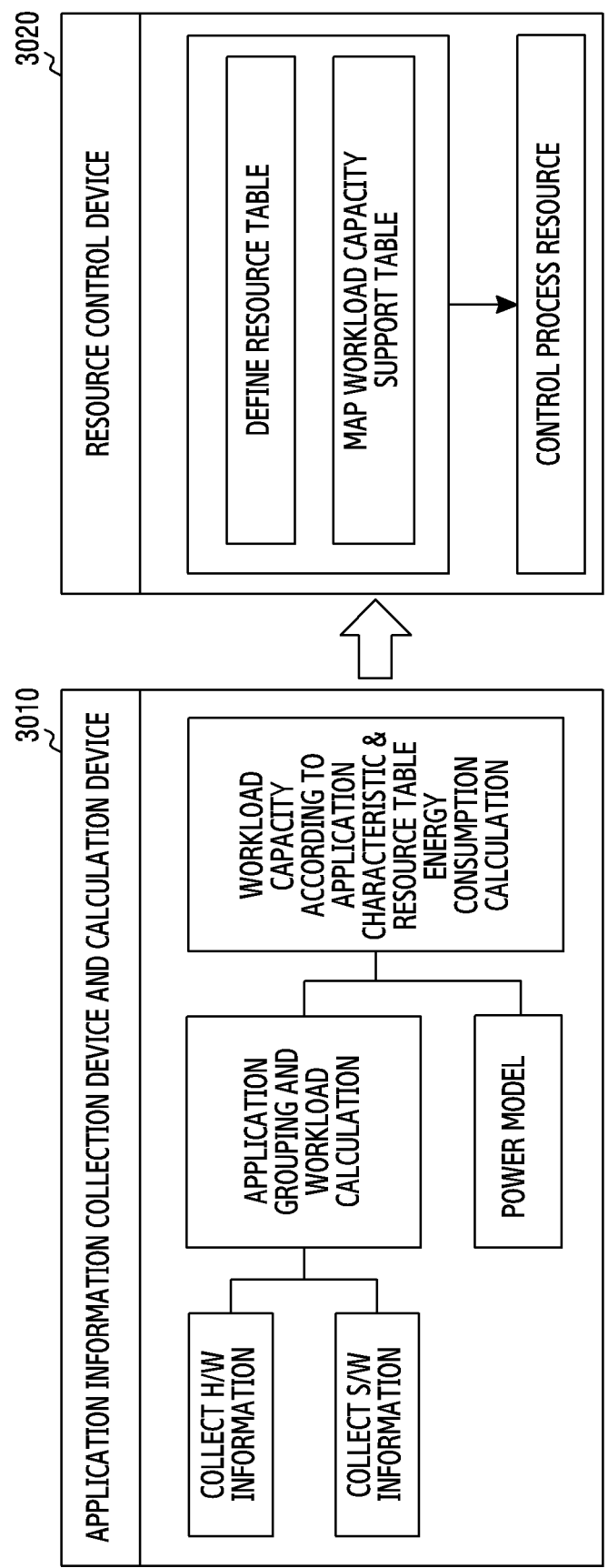
FIG. 30 schematically illustrates a procedure of controlling a resource in the device for resource allocation to each process according to the present disclosure.

FIG. 30 schematically illustrates a procedure of controlling a resource in the device for resource allocation to each process according to the present disclosure.

Block 3010 shows procedures performed in an application information collection device 2910, a process energy consumption estimation device 2920, and a workload calculation device 2930. The application information collection device 2910 collects hardware and software information. The application information collection device 2910 may obtain a list of processes for collecting hardware parameters and software parameters, by using process system basic information of a process running in the mobile device, and may collect the hardware parameters and the software parameters, through which operation characteristics and states of processes registered in the list of processes can be distinguished, via tracing in a kernel and a framework layer. Based on collected information, the application information collection device 2910 may group processes running in the mobile device. For example, the application information collection device 2910 may divide the running processes into a foreground group and a background group according to a degree of interaction with a user, and processes within the foreground group may be subdivided into a top activity and a subsequent activity according to priorities. Further, processes within the background group may be also subdivided into processes relevant to a top activity and processes irrelevant to a top activity, by using process relation information. After completion of process grouping by the application information collection device 2910 (steps 3140 and 3145), the workload calculation device 2930 calculates a process workload in step 3150 by applying a weight factor defined for each group.

Block 3020 shows procedures performed in a resource control device 2940. The resource control device 2940 may define a resource table and may calculate the workload capacity and an estimated energy consumption value by mapping of a workload result value calculated by the workload calculation device 2930. When calculating the workload capacity and the estimated energy consumption value, the resource control device 2940 may use a power model. The resource control device 2940 may control hardware resources based on the workload capacity and the estimated energy consumption value according to the hardware resources, which are obtained by mapping.

Figure 31:
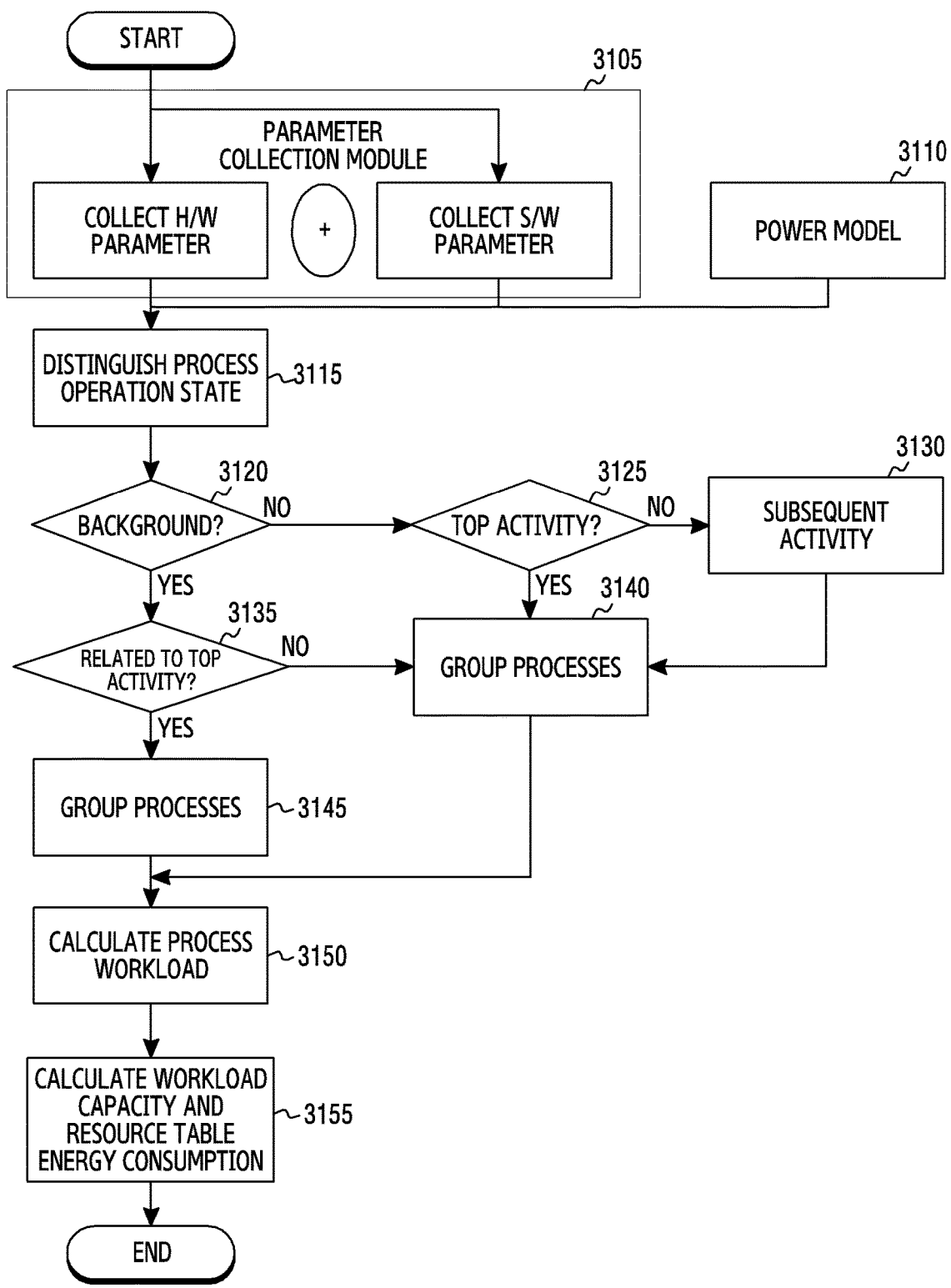
FIG. 31 illustrates a flowchart of controlling resource allocation to each process in a mobile device according to the present disclosure.

FIG. 31 illustrates a flowchart of controlling resource allocation to each process in a mobile device according to the present disclosure.

In step 3105, the application information collection device 2910 may obtain a list of processes for collecting hardware parameters and software parameters, by using process system basic information of a process running in the mobile device and may collect the hardware parameters and the software parameters, through which operation characteristics and states of processes registered in the list of processes can be distinguished, via tracing in a kernel and a framework layer. The hardware parameters may indicate information such as a CPU core, the amount of frequency use, etc. The software parameters may indicate information such as application-related activity information, a process identifier, service information, an operation environment in a state where a process occupies a CPU, a process relation, and the like.

In step 3115, the application information collection device 2910 may group processes based on the collected parameters. For example, the application information collection device 2910 may classify, in step 3120, the processes running in the mobile device into a foreground group and a background group, by using operation environment information in a state where processes occupy the CPU. The processes in the foreground group are processes highly interactive with a user and refer to processes that are displayed in the user's mobile device or directly controllable. The processes in the background group are processes in which interaction with the user is low and refer to processes which use a CPU but are neither displayed in the mobile device nor directly controlled by the user. Low-level weight factors are applied to the background processes compared with the foreground processes, and the background processes may be thus used for workload calculation.

In step 3125, the application information collection device 2910 may subdivide the processes belonging to the foreground group into a top activity and other activities or a subsequent activity by using application-related activity information. The top activity is present in the uppermost level of an activity stack and refers to an activity having a highest interaction with a user. Low weight factors are applied to the subsequent activity processes compared with the top activity processes, and the subsequent activity processes may be thus used for workload calculation, in step 3130.

In step 3135, the application interface collection device 2910 may subdivide the processes belonging to the background group into processes relevant to the top activity and processes irrelevant to the top activity. Whether a target process is relevant to the top activity may be determined according to whether a system ID of the target process is the same as that of the top activity process. For example, when the system ID of the target process is the same as that of the top activity process, the target process is determined to be a process relevant to the top activity, and when the system ID of the target process is different from that of the top activity process, the target process is determined to be a process irrelevant to the top activity.

After completion of process grouping by the application information collection device 2910 (steps 3140 and 3145), the workload calculation device 2930 calculates a process workload in step 3150 by applying a weight factor defined for each group. The process workload may be calculated according to the following equation.

$$WW = \Sigma(\alpha * \beta * \gamma = *(\text{process worldoad})) \qquad \text{EQUATION 5}$$

$\alpha$ is a weight factor according to foreground or background operation states, $\beta$ is a weight factor according to whether a process corresponds to a top activity, and $\gamma$ refers to a weight value according to whether a process is related to a top activity. $\alpha$, $\beta$, and $\gamma$ may vary depending on what operation characteristic a process has.

For example, it is assumed that process A having 15% of CPU use and process B having 5% of CPU use are running in different cores at the same time, wherein process A is a process that a user directly controls on the screen in the mobile device, and process B is a process updating data in the background regardless of process A. Process A is a process directly controlled by a user in a foreground operation state, in other words, a process corresponding to a top activity having the highest interaction with the user and is thus defined as $\alpha=\beta=1$, wherein a workload of process A corresponds to 15*1*1=15. In other words, a workload value matches the initial amount of CPU use. On the other hand, since process B operates in the background and is not related to the top activity, when process B is defined as, for example, $\beta=0.7$, $\gamma=0.8$, a workload corresponds to 0.7*0.8*5=2.8. Therefore, a total workload decreases from an initial workload of 15+5=20 to 15+2.8=17.8, and energy consumption may be reduced via resource control by the decreased total workload capacity.

In step 3155, the resource control device 2940 may control hardware resources by using a workload result value calculated by the workload calculation device 2930. The resource control device 2940 may map the calculation result value to a table format, in which an estimated energy consumption value and a workload capacity according to hardware resources are recorded, in order to efficiently control the hardware resources. The workload capacity according to the hardware resources refers to resource level-specific capacity derived from frequency use and a CPU core that is a hardware resource. The resource control device 2940 may control hardware resources based on the workload capacity and the estimated energy consumption value according to the hardware resources, which are obtained by mapping. If a high CPU state continues for a predetermined time or longer in a state where resources are allocated through mapping, the resource control device 2940 performs mapping to a table that is one level higher. The number of table values is obtained by multiplying the number of core types of heterogeneous cores and the number of frequency levels. If the mobile device has a heterogeneous core CPU, although cores provide different performances from each other, workload capacities may be the same depending on a frequency level. In this case, the resource control device 2940 may map a calculation result value to a resource table having less energy consumption.

Figure 32:
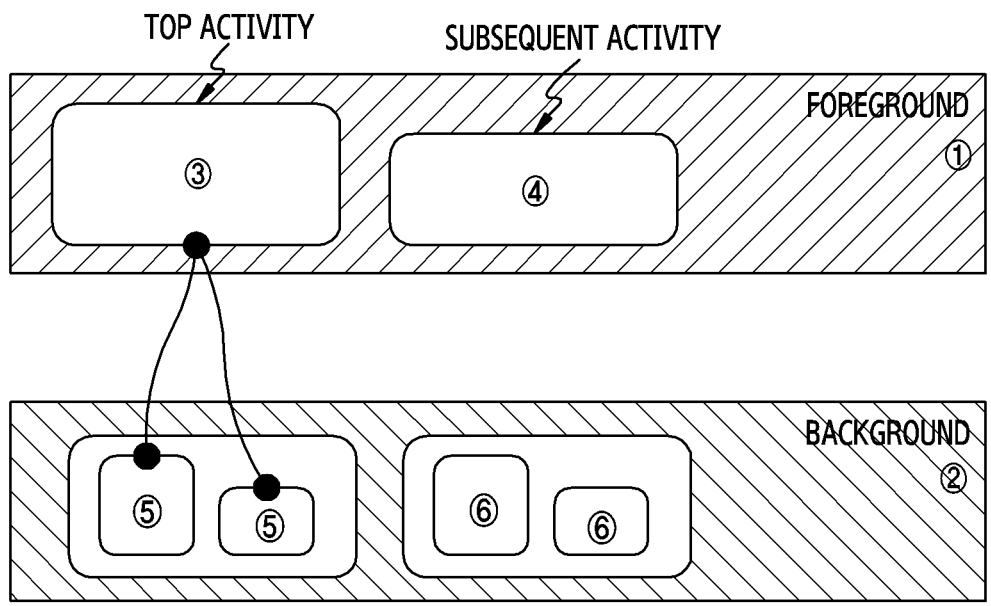
FIG. 32 illustrates grouping of processes in order to allocate a resource to each process according to the present disclosure.
Figure 32:
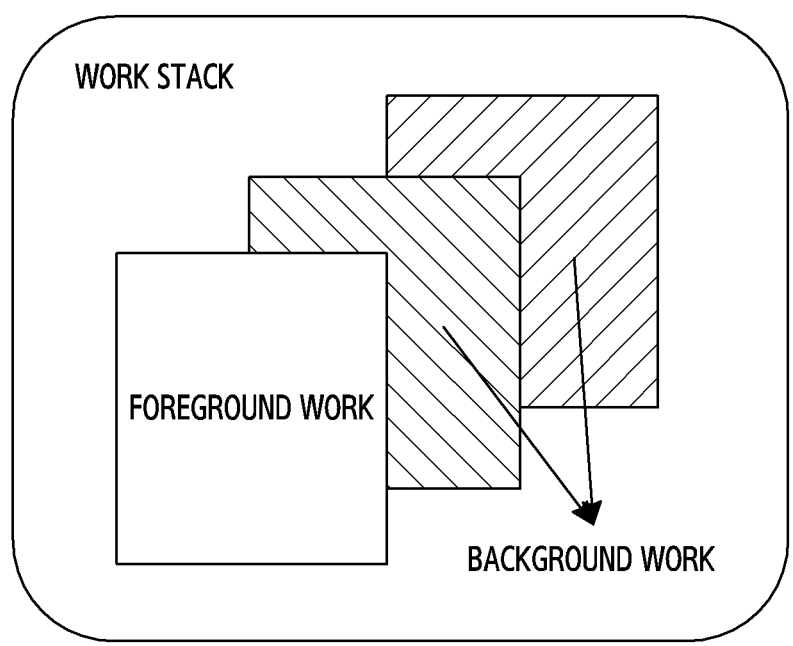

FIG. 32 illustrates grouping of processes in order to allocate a resource to each process according to the present disclosure.

Reference numeral 3210 shows that processes running in a mobile device are classified into a foreground group and a background group. The processes in the foreground group are processes highly interactive with a user and refer to processes that are displayed in the user's mobile device or directly controllable. The processes in the background group are processes in which interaction with the user is low and refer to processes which use a CPU but are neither displayed in the mobile device nor directly controlled by the user.

The foreground group is subdivided into a top activity work and a subsequent activity work. A top activity is present in the uppermost level of an activity stack and refers to an activity having a highest interaction with a user. A low weight factor is applied to a subsequent activity process compared with a top activity process, and the subsequent activity process may be thus used for workload calculation.

The background group may be subdivided into a process relevant to the top activity and a process irrelevant to the top activity. Whether a target process is relevant to the top activity may be determined according to whether a system ID of the target process is the same as that of the top activity process. For example, when the system ID of the target process is the same as that of the top activity process, the target process is determined to be a process relevant to the top activity, and when the system ID of the target process is different from that of the top activity process, the target process is determined to be a process irrelevant to the top activity.

Reference numeral 3230 illustrates a foreground work and a background work on a work stack. The foreground work is located at the upper level of the work stack and refers to an activity that is highly interactive with a user. The background work is located at the lower level of the work stack and refers to an activity that is less likely interactive with the user compared with the foreground work.

Figure 33:
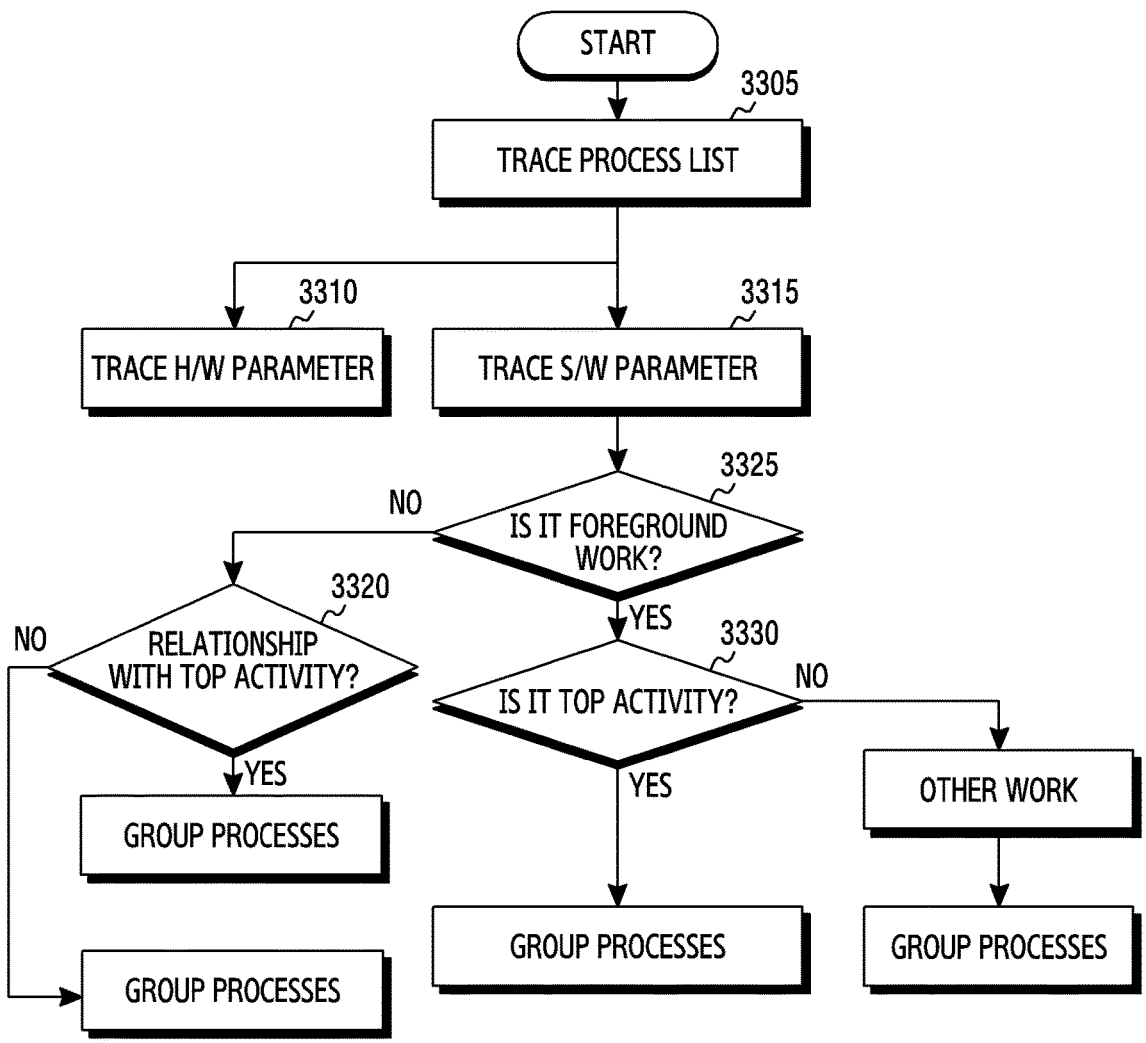
FIG. 33 illustrates a flowchart of grouping processes in order to allocate a resource to each process according to the present disclosure.

FIG. 33 illustrates a flowchart of grouping processes in order to allocate a resource to each process according to the present disclosure.

In step 3305, the application information collection device 2910 traces a process list. The application information collection device 2910 may obtain a list of processes for collecting hardware parameters and software parameters, by using process system basic information of a process running in the mobile device.

In step 3310 and step 3315, the application information collection device 2910 traces hardware and software parameters. The application information collection device 2910 may collect the hardware parameters and the software parameters, through which operation characteristics and states of processes registered in the list of processes may be distinguished, via tracing in a kernel and a framework layer.

In step 3325, the application information collection device 2910 determines whether processes running in the mobile device belong to a foreground.

For the processes that are classified as the foreground group in step 3325, the application information collection device 2910 determines in step 3330 whether the processes belong to a top activity.

For the processes that are not classified as the foreground group, in other words, the processes classified as the background group in step 3320, it is determines in step 3320 whether the processes are relevant to the top activity.

Figure 34:
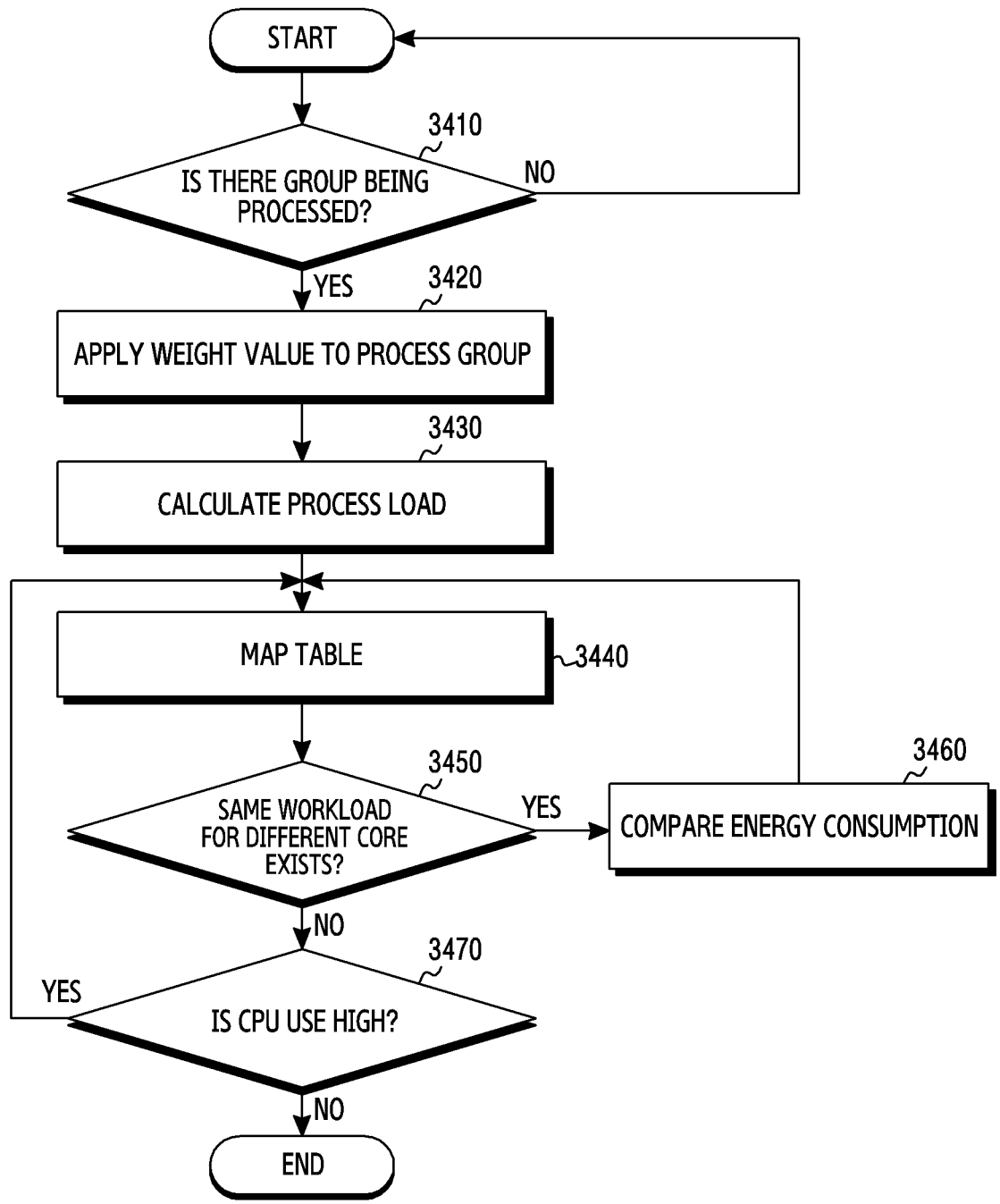
FIG. 34 illustrates a flowchart of grouping processes and then controlling a resource according to the present disclosure.

FIG. 34 illustrates a flowchart of grouping processes and then controlling a resource according to the present disclosure.

In step 3410, a device for allocating a resource to each process determines whether there is a group to be processed.

The device may be one of the application information collection device 2910, the process energy consumption estimation device 2920, the workload calculation device 2930, and the resource control device 2940. In other words, the device determines whether process grouping has completed in order to calculate a process workload by applying a weight factor defined for each group.

In step 3420, the device applies a weight value to each process group. In other words, the device defines weight factors to be used to calculate a workload for each process group, according to an operation characteristic of the process and a state of the process.

In step 3430, the device calculates a process workload. For example, the process workload may be calculated by multiplying the amount of CPU use of a target process and the weight factors defined in step 3420.

In step 3440, the device maps the process workload calculated in step 3430 to a table. In other words, in order to efficiently control hardware resources, the device may map a calculation result value to a table in which a workload capacity and an estimated energy consumption value according to the hardware resources are recorded.

In step 3450, the device determines whether heterogeneous cores having the same workload are present.

In step 3460, when heterogeneous cores having the same workload are present, the device compares energy consumption of the heterogeneous cores, and maps the process workload calculated in step 3430 to a resource table having less energy consumption.

In step 3470, when heterogeneous cores having the same workload are not present, it is determined whether the amount of CPU use in the mobile device is high. If a high CPU state continues for a predetermined time or longer in a state where resources are allocated through mapping, the resource control device 2940 maps, for example, the calculated process workload to a table that is one level higher. If the high CPU state continues for the predetermined time or longer in the state where resources are allocated through mapping, the present algorithm is terminated.

Figure 35:
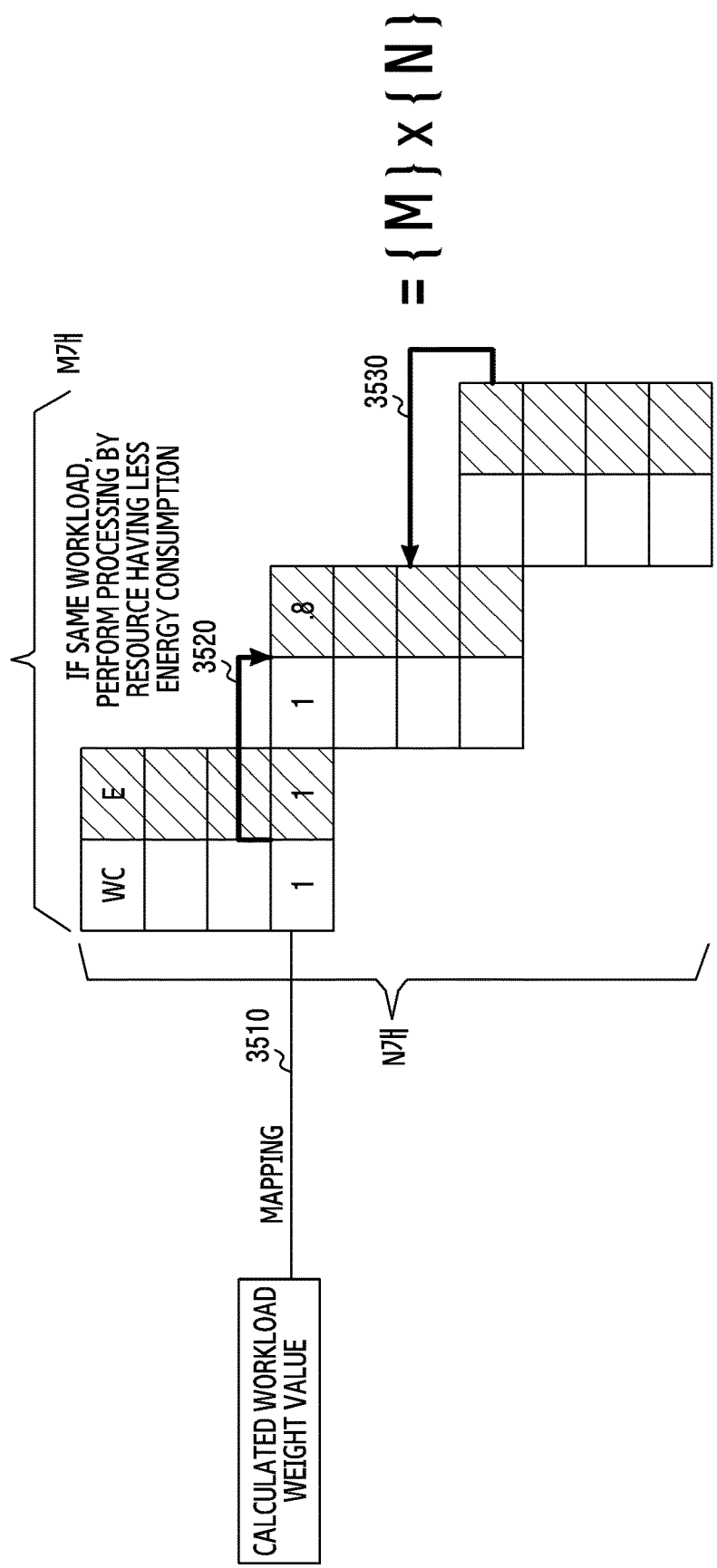
FIG. 35 illustrates mapping of a workload calculation value to a table according to an embodiment of the present disclosure.

FIG. 35 illustrates mapping of a workload calculation value to a table according to an embodiment of the present disclosure. The number of table values may be MxN, wherein the number of core types of heterogeneous cores is M and the number of frequency levels is N.

The device for allocating a resource to each process may map a workload calculation result value to a table format in which a workload capacity and an estimated energy consumption value according to the hardware resources are recorded, in order to efficiently control hardware resources. Based on the workload capacity and the estimated energy consumption value according to the hardware resources, which are obtained via mapping, the resource control device 2940 may control the hardware resources.

Reference numeral 3520 shows that when heterogeneous cores having the same workload are present in the mobile device, the device for allocating a resource compares energy consumption of the heterogeneous cores and maps the workload calculation value to a resource table having less energy consumption. In other words, the device causes a target process to be processed in a heterogeneous core having less energy consumption from among heterogeneous cores.

Reference numeral 3530 shows that when a high CPU state continues for the predetermined time or longer in the state where resources are allocated through mapping, the resource control device maps the workload calculation value to a table that is one level higher. For example, the resource control device may cause the target process to be processed at a high CPU frequency.

In the present disclosure, a mobile device may achieve low power consumption thereof without affecting a performance perceived by a user, by controlling resources while reflecting a characteristic and an operation state of an application running in the mobile device.

As another embodiment for managing a system resource, the present disclosure provides a method and an apparatus wherein an electronic device displays electrical energy converted from mechanical energy corresponding to a user's activity on a screen unit of the electronic device.

Various technologies have been progressed in an environmentally friendly manner. Environmentally friendly technologies include obtaining energy by alternative energy sources instead of conventional energy sources in order to reduce carbon emissions. Environmentally friendly technologies may be applied to electronic devices, such as mobile devices, user terminals, smartphones, and the like.

Electronic devices may obtain energy primarily through batteries. There may be two main methods to charge batteries: one method may be electrically charging batteries; and the other method may be harvesting by a mechanical element of the electronic device.

Further, the use of a variety of electronic devices, such as a mobile phone, may indirectly produce a large amount of carbon emissions. In the case where a half of the world's population uses mobile phones, the total carbon emissions may be very high. Depending on works performed on the mobile phones, the amount of carbon emissions may vary. For example, talking on the mobile phone for one minute generates about 40,000 times more carbon emissions than transmission of a single text message.

The present disclosure provides the method and the apparatus for mapping energy harvested in an electronic device to the use of the electronic device, such as a short message service (SMS), a social network service (SNS), phone calls, etc.

The present disclosure provides the method and the apparatus for showing benefits of energy harvested in the electronic device to a user.

The present disclosure provides the method and the apparatus for displaying a carbon footprint generated by the electronic device in order to reduce the carbon footprint generated by the electronic device.

Figure 36:
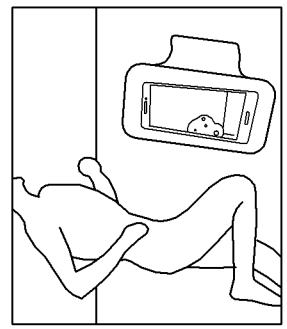
FIG. 36 illustrates harvesting of mechanical energy as electrical energy in an electronic device according to an embodiment of the present disclosure.
Figure 36:
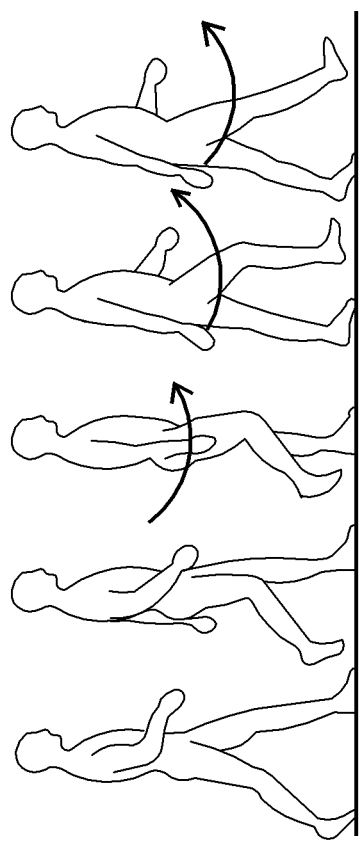

FIG. 36 illustrates harvesting of mechanical energy as electrical energy in an electronic device according to an embodiment of the present disclosure.

In order to convert mechanical energy into electrical energy in an electronic device, a small module may be added to the electronic device. For example, the small module may sense a user's activity, such as arm or leg motion, while walking or running so as to convert mechanical energy into electrical energy. The energy converted from the user's activity may be used, for example, to charge a battery of the electronic device. In the present document, energy obtained via a user's activity by using an additional method other than an electrical charging method is defined as "green energy", and a battery including green energy is defined as a "green battery".

Figure 37:
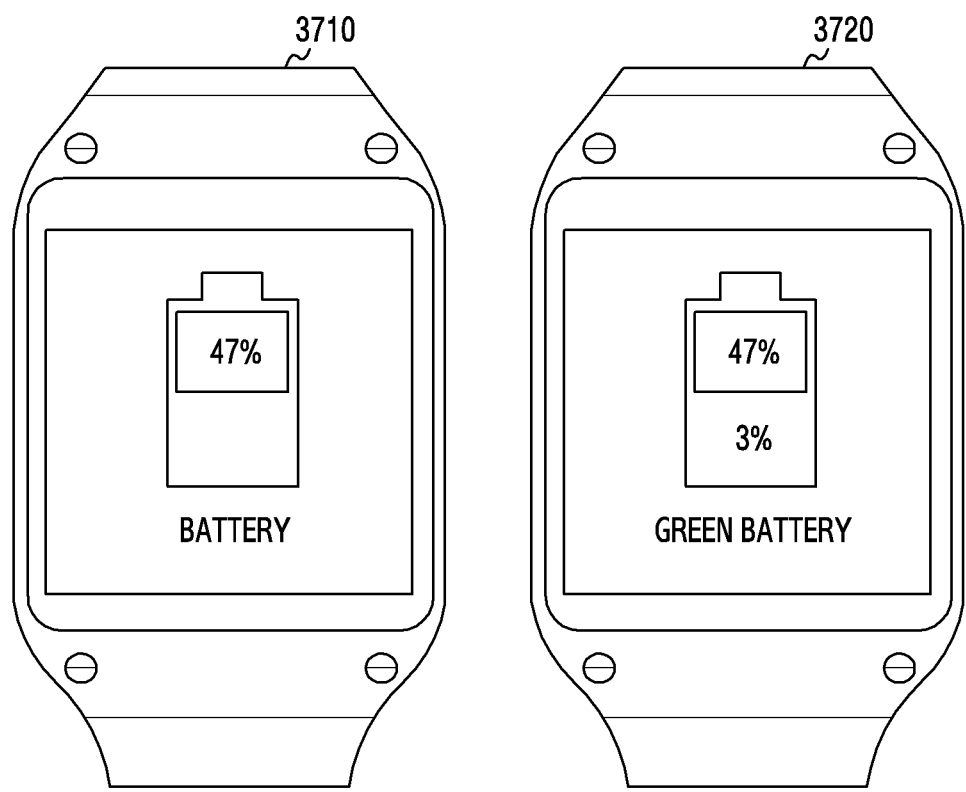
FIG. 37 illustrates displaying of a green battery in the electronic device according to an embodiment of the present disclosure.

FIG. 37 illustrates displaying of a green battery in the electronic device according to an embodiment of the present disclosure.

In reference numeral 3710, a screen unit of the electronic device displays that the usable amount of a battery charged by electrical energy is 47%.

In reference numeral 3720, the screen unit of the electronic device displays that the usable amount of the battery harvested by a mechanical element of the electronic device, in other words, the usable amount of a green battery is 3%, in addition to the usable amount of a battery charged by electrical energy. In other words, reference numeral 3720 shows that there is additional 3% of green energy compared with reference numeral 3710. When there is green energy, the electronic device may display that there is green energy. For example, a usable battery amount display unit of the electronic device may distinguish and display additional 3% of green energy, or although the usable battery amount display unit of the electronic device does not distinguish and display additional green energy, a color of the usable battery amount display unit may be changed, for example, to green to indicate green energy. Alternatively, the electronic device may display the usable battery amount display unit in a different color together with distinguishing and displaying the additional green energy.

Figure 38:
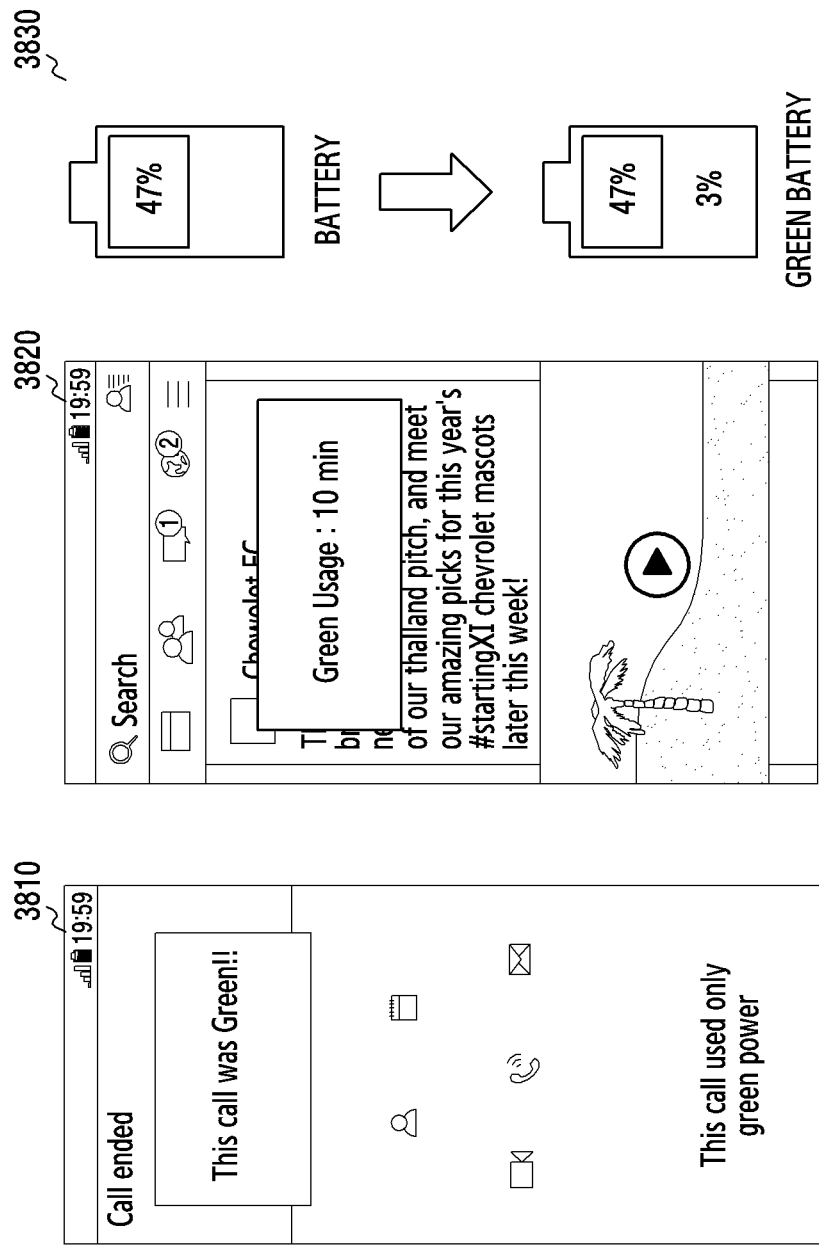
FIG. 38 illustrates embodiments of displaying a state related to the green battery in the electronic device according to the present disclosure.

FIG. 38 illustrates embodiments of displaying a state related to the green battery in the electronic device according to the present disclosure.

Reference numeral 3810 shows that when a call is made to the electronic device, the screen unit of the electronic device displays that green battery is in use. In other words, it shows that calls in the electronic device are performed using green battery. In reference numeral 3810, the screen unit of the electronic device displays a message indicating "this call was green". However, a variety of messages may be used to indicate to a user that green battery is used to perform calls.

Reference numeral 3820 shows that the screen unit of the electronic device displays time which the electronic device can perform an application using the green battery. Before and after execution of the application, the screen unit may display an approximate amount of the remaining green battery, in other words, the amount of green usage may be displayed. For example, in reference numeral 3820, the message "green usage: 10 min" displayed in the electronic device means that the remaining time to perform the application by using the green battery is approximately 10 minutes.

Reference numeral 3830 shows that the electronic device displays the usable remaining amount of the battery when there is green energy. For example, the usable battery amount display unit of the electronic device may distinguish and display additional 3% of green energy, or although the usable battery amount display unit of the electronic device does not distinguish and display additional green energy, a color of the usable battery amount display unit may be changed, for example, to green to indicate green energy. Alternatively, the electronic device may display the usable battery amount display unit in a different color together with distinguishing and displaying the additional green energy.

Figure 39:
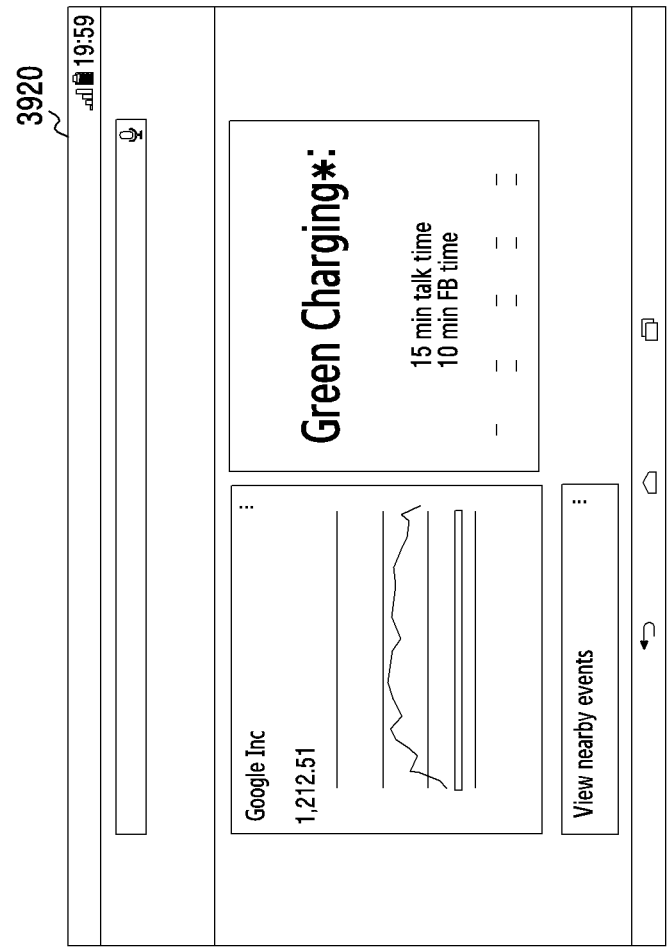
FIG. 39 illustrates other embodiments of displaying a state related to the green battery in the electronic device according to the present disclosure.
Figure 39:
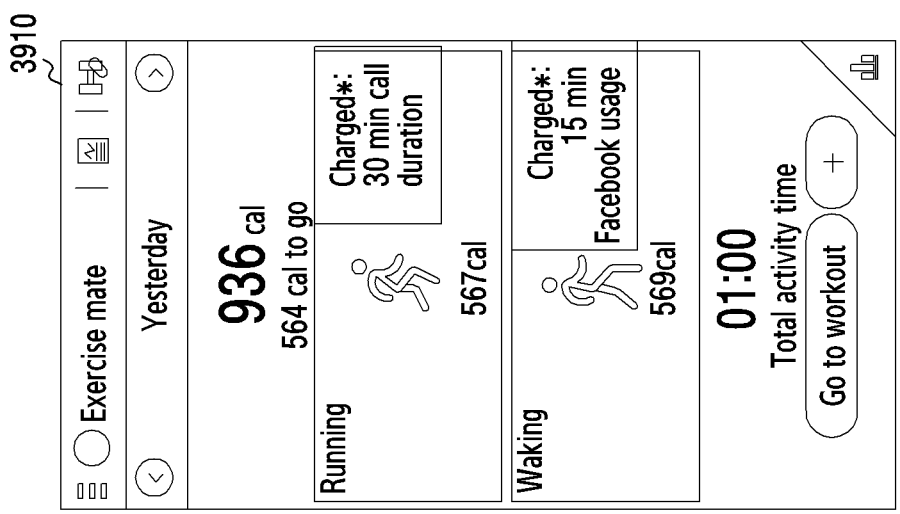

FIG. 39 illustrates other embodiments of displaying a state related to the green battery in the electronic device according to the present disclosure.

Reference numeral 3910 shows displaying, in the device, of mechanical energy generated by a user's activity, for example, walking or running, and a specific activity available duration in which an activity may be performed using green energy corresponding to the mechanical energy. For example, the device may display that a mechanical energy generated by a user's running is 567 kcal, and an available duration for a phone conversation that can be performed using green energy is 30 minutes. Further, the device may display that a mechanical energy generated by a user's walking is 369 kcal, and an available duration for SNS that may be executed using green energy is 15 minutes. Further, the device may display not only activities that may be performed using green energy corresponding to already generated mechanical energy, but also the amount of mechanical energy required to be generated by the user in order for a specific activity to be performed using the green battery.

In reference numeral 3920, a graph shows mechanical energy generated by a user's activity over time, and the green battery is being charged by the user's activity. Further, a specific activity available duration, in which an activity may be performed using the generated green energy, is indicated.

Figure 40:
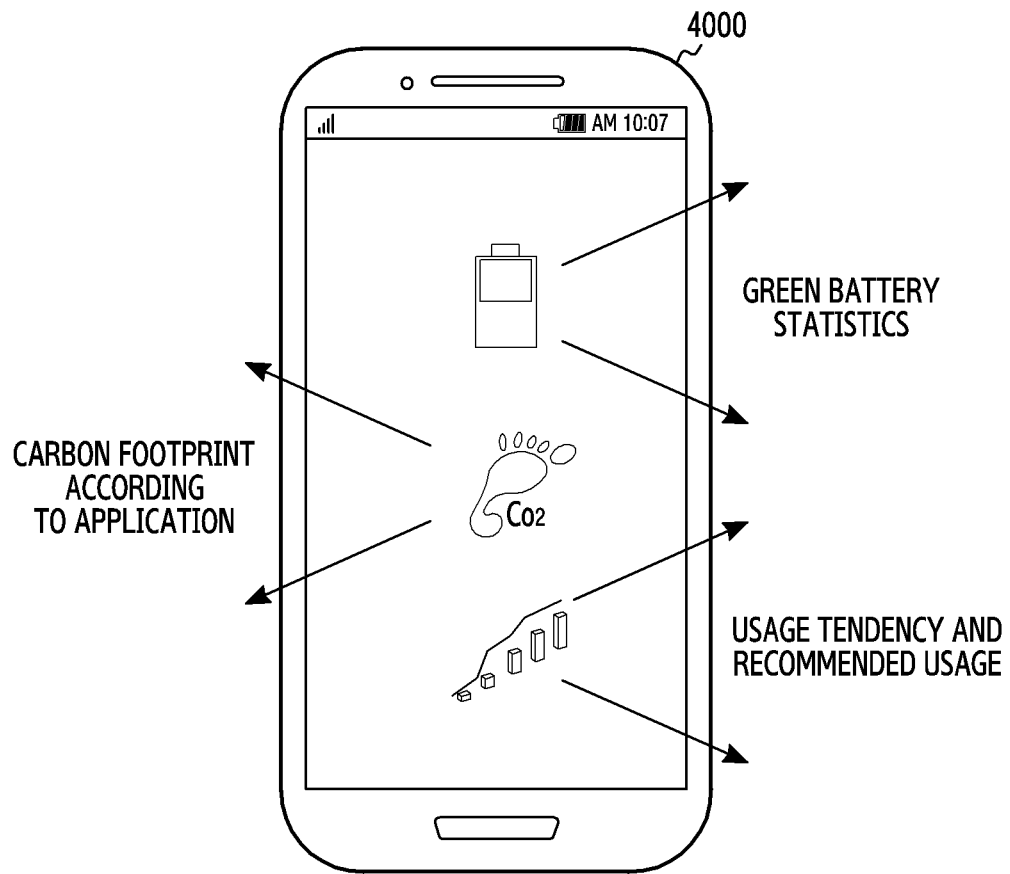
FIG. 40 illustrates displaying of information related to a carbon footprint in the electronic device according to the present disclosure.

FIG. 40 illustrates displaying of information related to a carbon footprint in the electronic device according to the present disclosure. In the present document, a carbon footprint includes not only a direct carbon footprint generated by the electronic device, but also an indirect carbon footprint.

Reference numeral 4000 shows that information related to the carbon footprint is displayed via a specific application. In the present disclosure, the application is specified as a "green hub". The green hub may enable a user to check a carbon footprint generated by use of the electronic device and green battery use statistics. Since a user's active behavior is required to reduce the carbon footprint generated by use of the electronic device, the user may be encouraged to reduce the carbon footprint by checking the carbon footprint and the green battery use statistics via the green hub. FIG. 40 provides an example of items included in the green hub for displaying information related to carbon footprint, which are green battery statistics, an application-specific carbon footprint, a user's electronic device usage tendency, and recommended usage. The items for displaying information related to carbon footprint are not limited to those described above, and information related to carbon footprint may be displayed by various items.

Figure 41:
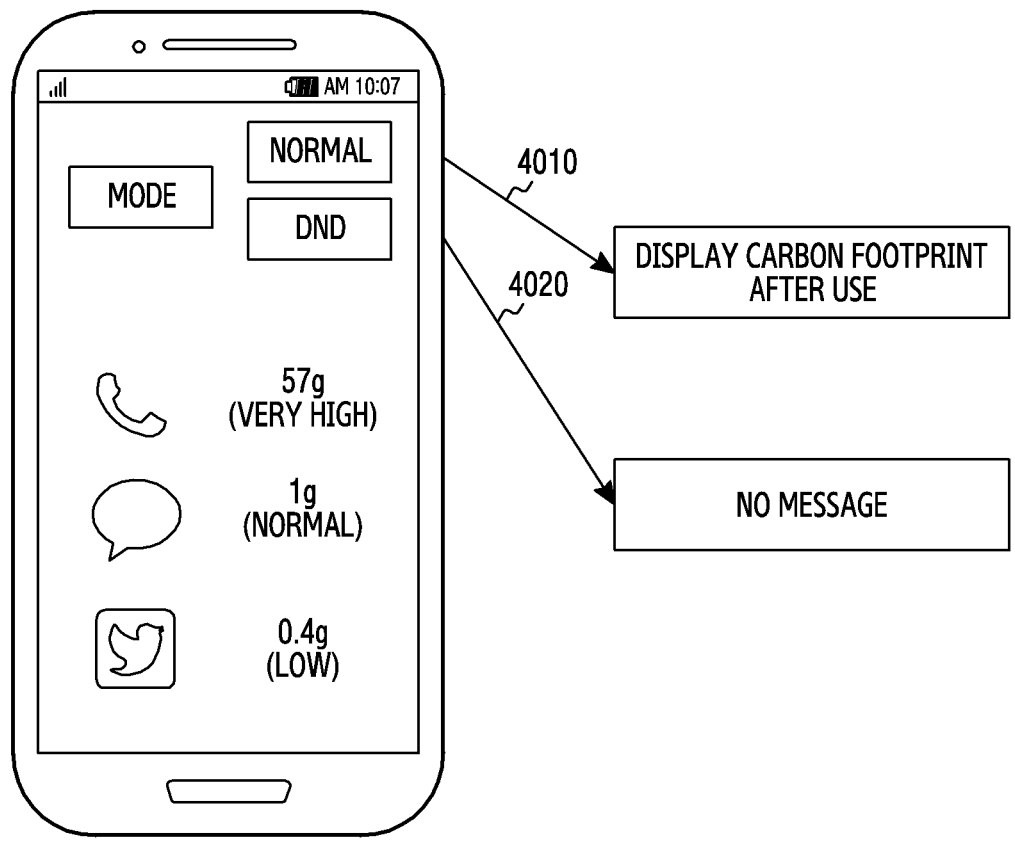
FIG. 41 illustrates displaying two modes that can be set based on a user's preference in a green hub according to an embodiment of the present disclosure.

FIG. 41 illustrates displaying two modes that can be set based on a user's preference in the green hub according to an embodiment of the present disclosure.

A first mode 4010 is a mode to display a carbon footprint specific to a work performed in an electronic device by a user, so as to notify of the carbon footprint to the user. For example, in the mode, it may be displayed that 57 g of carbon has been generated by the user's phone call, 1g of carbon has been generated by transmission of a text message, and 10 g of carbon has been generated by the use of SNS.

A second mode 4020 is a mode that does not display carbon footprint-related information. The first mode 4010 or the second mode 4020 may be selected differently according to the user's preference.

Figure 42:
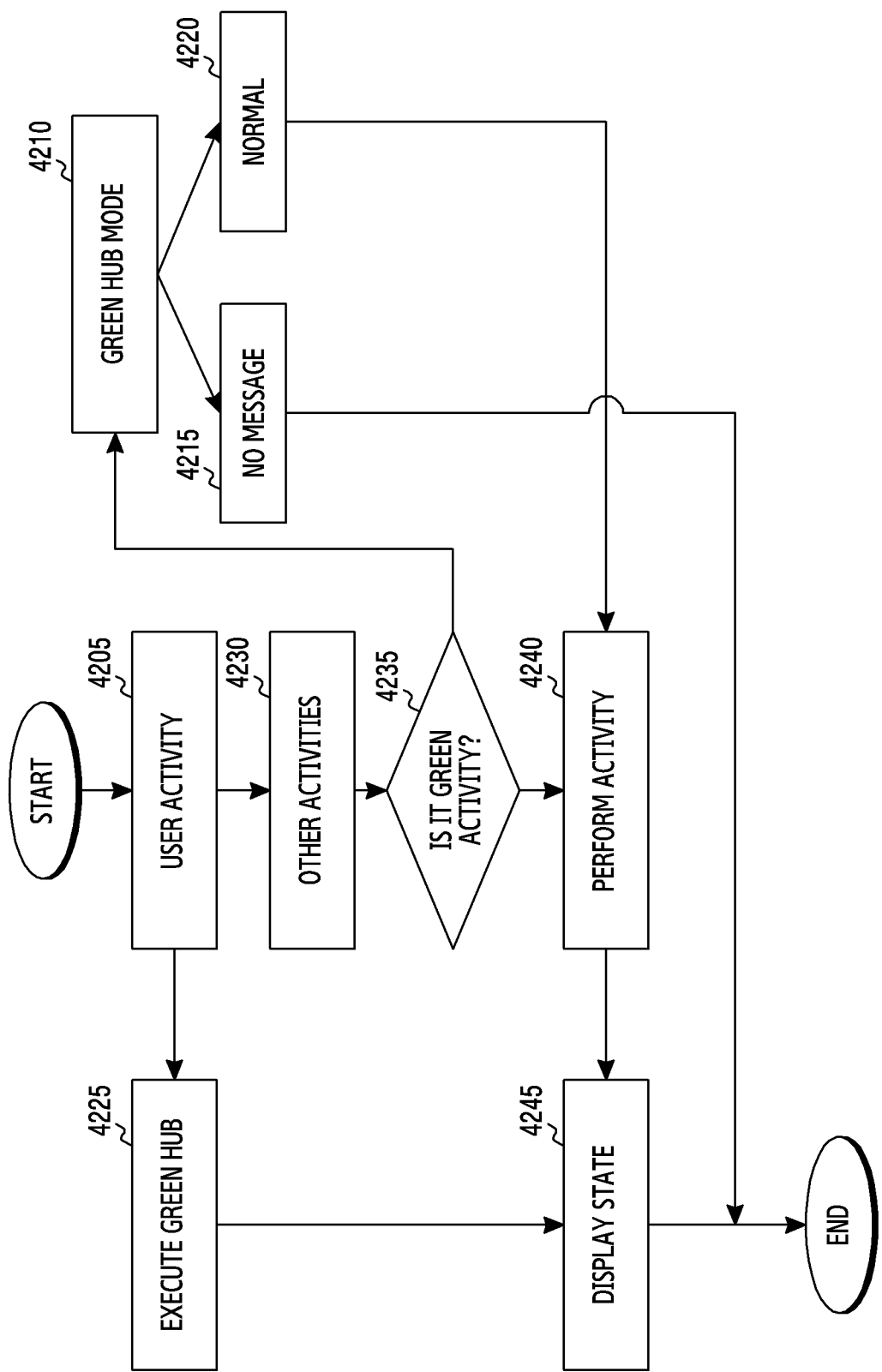
FIG. 42 is a flowchart illustrating a procedure of displaying current use of the green battery and carbon footprint in an electronic device according to an embodiment of the present disclosure.

FIG. 42 is a flowchart illustrating a procedure of displaying current use of the green battery and carbon footprint in the electronic device according to an embodiment of the present disclosure.

In step 4205, the electronic device evaluates a user's activity. According to the user's activity, a procedure moves to step 4225 to execute the green hub or moves to step 4230 to enable the user to perform a variety of works by using the electronic device.

When the green hub is executed in step 4225, the procedure moves to step 4245 and the electronic device displays current use of the green battery and carbon footprint. For example, the electronic device may display information relating to green battery use statistics, application-specific carbon footprint, a user's electronic device usage tendency, and recommended usage.

After a variety of works are performed in step 4230, the procedure moves to step 4235, and the electronic device evaluates whether the performed works are green activities or not. A green activity may include, for example, a work of generating a green battery by the user's walking or running.

When a target activity is determined to be the green activity in step 4235, the target activity is performed in step 4240. Subsequently, the procedure moves to step 4245, and the electronic device displays current green battery use and carbon footprint. And then, the present algorithm is terminated.

If it is determined in step 4235 that the target activity is not the green activity, the procedure moves to step 4210 to determine a green hub mode. The green hub mode is divided into a first mode and a second mode according to the user's preference. The first mode is a mode to display a carbon footprint specific to a work performed in the electronic device by a user, so as to notify of the carbon footprint to the user, and the second mode is a mode that does not display carbon footprint-related information.

When the green hub mode is set to the first mode, the procedure moves to step 4220, and the electronic device may display the carbon footprint specific to a work performed in the electronic device by the user. Then, the procedure moves to step 4240, and the user may perform a green activity.

When the green hub is set to the second mode, the procedure moves to step 4125 in which carbon footprint-related information is not displayed, and the present algorithm is terminated.

The invention according to the present disclosure is advantageous in that a user is encouraged to use an electronic device in a way to reduce carbon footprint by displaying, in an electronic device, information on the current use of electrical energy converted from mechanical energy generated by the user's activity and information on the carbon footprint generated by use of the electronic device.

As still another embodiment for managing a system resource, the present disclosure provides a method and an apparatus for reducing memory requirements and improving a processing speed when an electronic device performs padding for a specific calculation on data.

Figure 43:
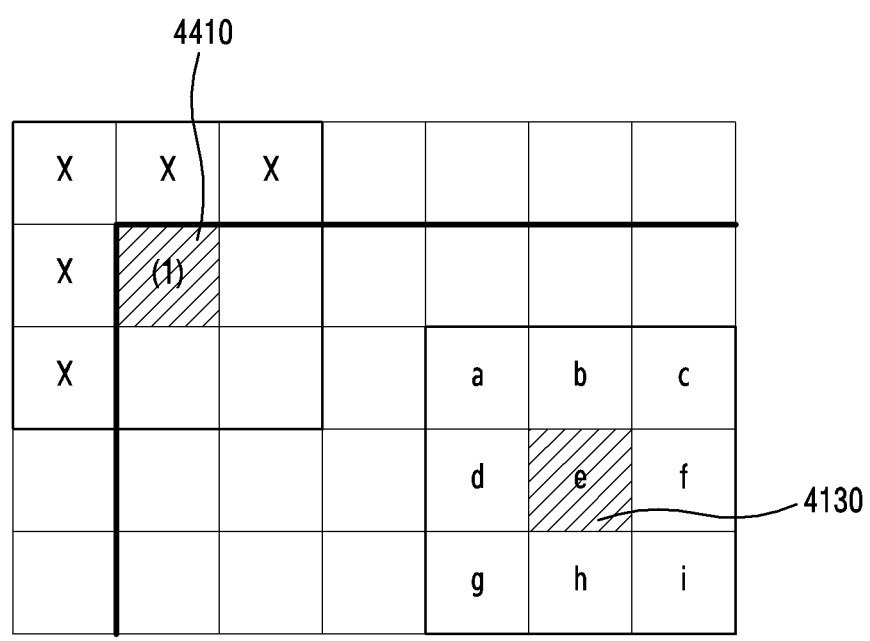
FIG. 43 is a diagram illustrating a procedure of calculating a Gaussian filter result value for any image pixel according to the present disclosure.

FIG. 43 is a diagram illustrating a procedure of calculating a Gaussian filter result value for any image pixel according to the present disclosure.

In order to process computer vision, videos, images, etc., it is necessary to perform calculation on a two-dimensional image. For example, in order to provide an effect of blurring an image (blur effect), calculation using a Gaussian filter may be performed on an image file. The Gaussian filter is a filter based on a Gaussian distribution, wherein a large weight value is applied to pixels located in the center of the filter, and a small weight value is applied to neighboring pixels located at a long distance, so as to replace a value of the pixels located in the center with a pixel value reflecting the weight value. FIG. 43 illustrates a case of calculating a result value by using a 3×3 Gaussian filter for an image file. However, the 3×3 Gaussian filter is merely an example, and a Gaussian filter used for image calculation is not limited to the 3×3 Gaussian filter. For example, a 5×5 Gaussian filter or other-degree Gaussian filters may be used. Reference numeral 4310 indicates pixel values for calculation, and reference numeral 4330 indicates Gaussian filter coefficients. When a Gaussian filter is applied to pixel value e located in the center of reference numeral 4310, a result value may be calculated by multiplying and then adding each of Gaussian filter values located in locations corresponding to neighboring pixel values. For example, for pixel value e located in the center of reference numeral 4310, when a result value obtained by applying the Gaussian filter of reference numeral 4330 is referred to as $e_r$, $e_r$ may be determined according to the following equation.

$$S_s = a*1 + b*1 + q*1 + 1d*1 + e*2 + f*1 + g*1 + h*1 + 1*1 \quad \text{EQUATION 6}$$

Here, alphabetic lowercase letters a to i represent pixel values. Gaussian filter performs calculation of multiplying pixel value e located at the center of the filter by a filter coefficient of a high weight value, multiplying neighboring pixel values by filter coefficients of a low weight value, and adding the multiplied values. The following equation represents a case where Gaussian filter calculation is performed on an arbitrary image pixel.

$$\text{result}(w,y) = \Sigma_{(1|=1\beta+1)} \Sigma_{0|=1,\beta+1)} \text{pixel}(n+1,y+1) * \text{filter}(i,j) \quad \text{EQUATION 7}$$

Here, result(x, y) represents a result value in which Gaussian filter calculation is applied to a pixel value corresponding to (x, y), and pixel(x+1, y+1) represents a pixel value corresponding to (x, y) and neighboring pixel values. Further, filter(i, j) represents filter values.

Hereinafter, a pixel value may be used in the same meaning as "pixel" or a "value of pixel"

FIG. 44 illustrates an example of applying a Gaussian filter to an image border and to the inside of an image according to the present disclosure.

As described above, in order to apply a Gaussian filter to a particular pixel value, other pixel values neighboring the target pixel value are required. For example, when a Gaussian filter is applied to the pixel value 4430 inside the image, since all neighboring pixel values a, b, c, d, f, g, h, and i exist, Gaussian filter calculation may be performed without any problem.

However, when a Gaussian filter is applied to a pixel value located at an image border, for example, a pixel value corresponding to reference numeral 4410, pixel values located in the upper, lower, and diagonal directions of the pixel value corresponding to reference numeral 4410 do not exist, a problem may occur when calculation is performed by applying the Gaussian filter. Therefore, filling an outer border with necessary neighboring pixel values, in other words, pixel padding on outer border (PPoOB) or, in short, padding may be required to perform calculation using a Gaussian filter, etc. for pixel values belonging to an image border.

FIG. 44 shows that, when a 3×3 Gaussian filter is applied to a pixel value located at an image border, one pixel is further required outside the border. In other words, FIG. 44 shows that one more pixel is required in each of the upward direction, the horizontal direction, and the diagonal direction. However, the number of required pixels may vary depending on a filter type. For example, when a 5×5 Gaussian filter is applied, since calculation needs to be performed to correspond to the pixel value located at the image border, two more pixels may be required in each direction, and when a 7×7 Gaussian filter is applied, three more pixels may be required in each direction.

Various embodiments provide a method and an apparatus for filling the outer border with necessary neighboring pixel values, in other words, performing PPoOB, in order to perform calculation using a Gaussian filter, etc. for pixel values belonging to an image border. However, PPoOB may be extended to any application that requires PPoOB, as well as filling the outer border with necessary neighboring pixel values. For example, as a decoder of high efficiency video coding (HEVC) standard or H.264, when calculation is performed on arbitrary data, in the case where a value existing in a part other than an address range of the data is needed, an arbitrary value for calculation, for example, a padding value may be generated in a data outer border.

Figure 45:
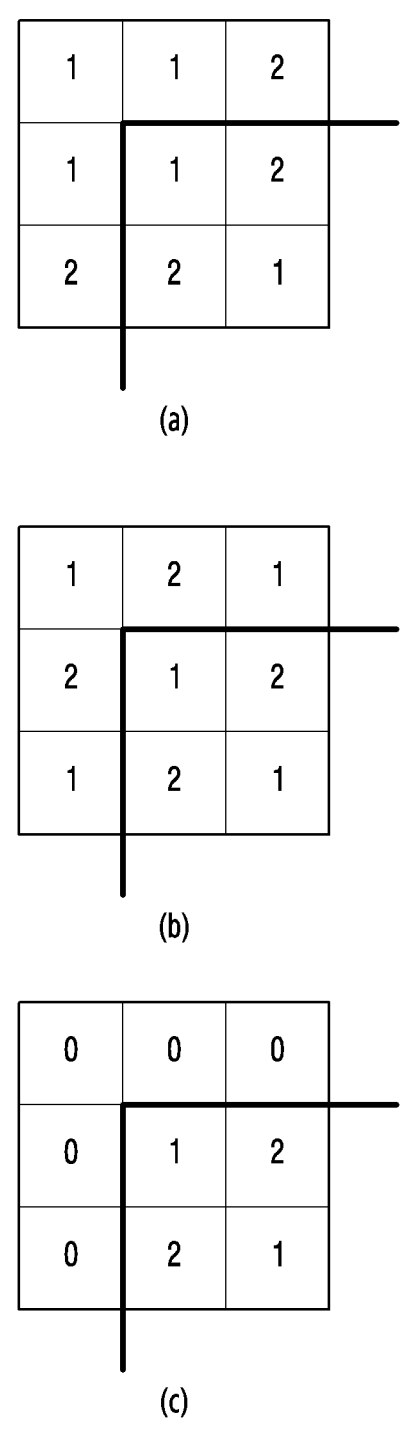

FIG. 45 illustrates examples of various methods for PPoOB according to the present disclosure.

As described above, PPoOB may be required, the PPoOB for filling the outer border with necessary neighboring pixel values in order to perform calculation using a Gaussian filter, etc. for pixel values belonging to an image border. The method of PPoOB, in other words, a pixel padding mode may include replication, mirroring, zero-based methods, and the like.

Replication means copying a pixel value at the image border and making the same a value necessary for the outer border. Referring to (a) of FIG. 45, the pixel value located at the image border has the same value as a virtual value existing in the adjacent outer border. A pixel value located at the corner of the image border has the same value as a virtual pixel value at a diagonally adjacent location.

Mirroring means copying, as a mirror image, a pixel value at the image border and making the same a value necessary for the outer border. Referring to (b) of FIG. 45, a virtual pixel value in the outer border of the image has a symmetrically corresponding value thereof when the image border is considered to function as a mirror.

The zero-based method means that all pixel values in the outer border of the image, which are necessary for calculation, are set to zero. Referring to (c) of FIG. 45, virtual values in the outer border of the image are all set to zero.

In FIG. 45, replication, mirroring, and zero-padding are provided as a method for filling pixel values in the outer border of the image. However, the method of filling pixel values in the outer border of the image is not limited to the above-mentioned methods, and a combination of various methods may be used. Further, FIG. 45 illustrates a method for performing PPoOB in the case of applying a 3×3 Gaussian filter, but PPoOB may be performed in the same manner even when a Gaussian filter of another degree is applied. A virtual value created by PPoOB is defined as a padded pixel.

In an embodiment, a method of performing PPoOB for calculation on an image file includes creating a padding pixel in the outer border of an image in advance via preprocessing of an image file, and then applying calculation, such as a Gaussian filter, to the image including the padding pixel. In other words, before performing of calculation, an image including a padding pixel is created and stored in a memory in advance. A function to create a padding pixel in advance may be implemented by hardware or software. However, this method requires a preprocessing time for an image file, and a memory for storing an image including a padding pixel is required. Further, in the case of implementing the function of creating a padding pixel in advance using software, an exception handling for a border may be required, the implementation may be complicated, and therefore performance may be deteriorated. Therefore, there is a need for a method of performing PPoOB for calculation in addition to a method of storing an image including a padding pixel via preprocessing of the image.

Figure 46:
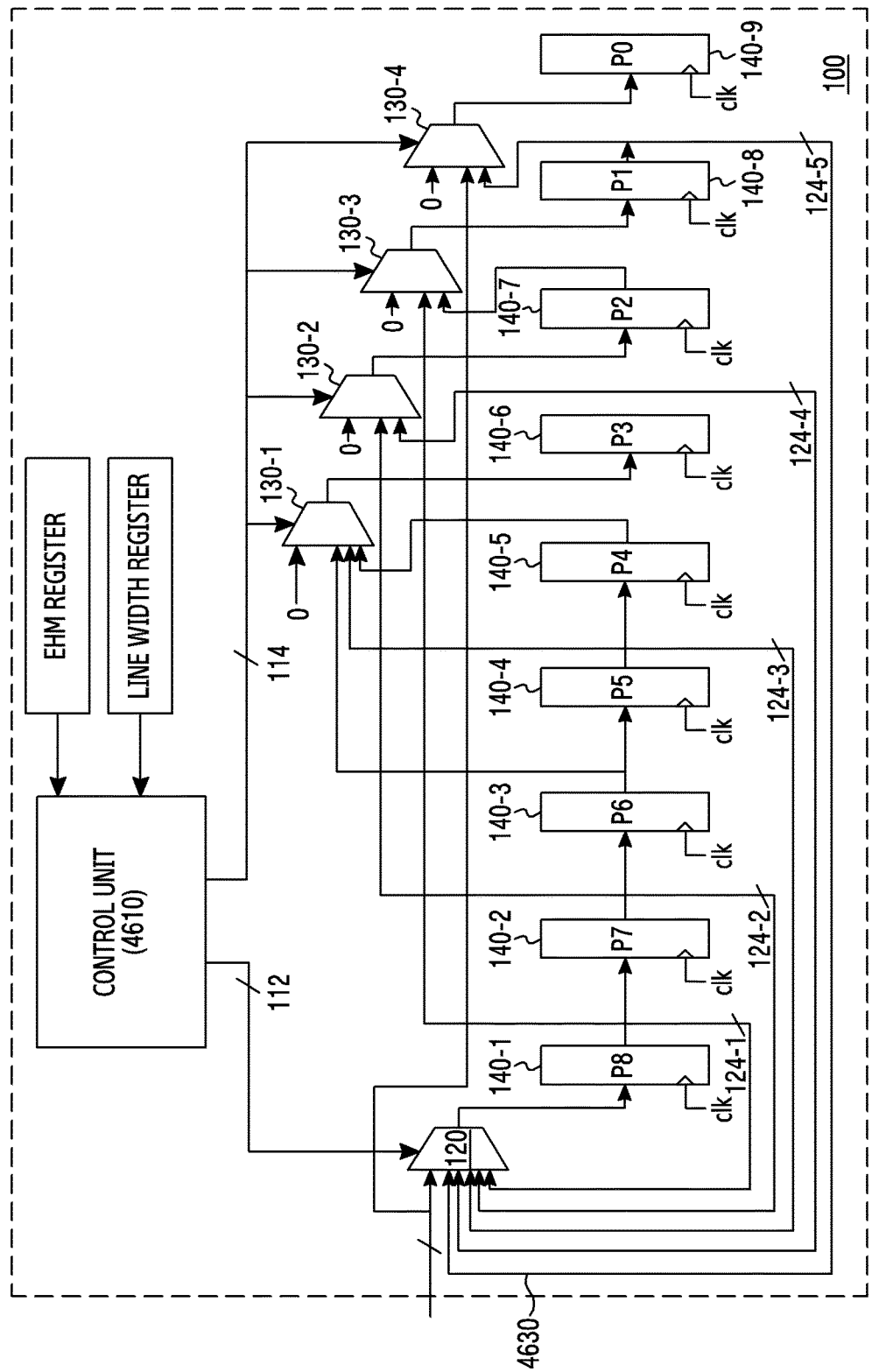
FIG. 46 illustrates a device configuration diagram for padding a pixel in an on-the-fly scheme according to the present disclosure.

FIG. 46 illustrates a device configuration diagram for padding a pixel in an on-the-fly scheme according to the present disclosure.

The on-the-fly scheme is a scheme in which a padding pixel value is created when a padding pixel is needed in the middle of performing a specific calculation on an image, instead of creating the padding pixel in advance via preprocessing the image. Since it takes a lot of time to implement the on-the-fly scheme when implemented by software, it is preferable to implement the on-the-fly scheme using hardware. In other words, a padding pixel is created in an on-the-fly scheme using hardware that has the same configuration as that shown in FIG. 46 and calculation on an image is performed.

FIG. 46 illustrates a hardware device configuration for implementing the on-the-fly scheme in the case of using nine tab filters, in other words, using a 3×3 Gaussian filter. Since nine tab filters are used, the hardware includes a total of nine input pixel registers P0 to P8. In other words, when the number of tabs is changed, the hardware for the on-the-fly scheme may be configured differently.

A control unit 4610 is controlled by an EHM register and a line width register. The EHM resister is a register that specifies a padding mode, in other words, replication, mirroring, and zero-based methods, and the line width register is a register that indicates one line of an image, that is, a horizontal width or a vertical width. The control unit 4610 receives these two pieces of information and generates a control signal necessary for a logic gate.

The control unit 4610 generates a control signal to cause logic gates to perform different operations depending on a padding mode value stored in the EHM resister. For example, 0 is selected at a logic gate in the case of the zero-based method, and a pixel that is the same as an input pixel is selected in the case of replication.

An input pixel value is entered through reference numeral 4630. The control unit 4610 checks whether an input pixel is present at the outer border based on information of the line width register and stores the input pixel in appropriate input pixel registers P4 to P8. For example, an input pixel may be stored starting from in P8, a successively input pixel value may be stored in P8 after moving the input pixel value stored in P8 to input pixel register P7 on the right. According to a padding mode specified in the EHM register, the value stored in the input pixel register is stored in registers P0 to P3.

As described above, since the on-the-fly scheme includes creating a padding pixel value to perform calculation when a padding pixel is needed in the middle of performing a specific calculation on an image, no preprocessing time is required for creating the padding pixel of the image, and no memory is needed to store the padding pixel. However, the on-the-fly scheme requires to create hardware fixed for only a specific calculation, and the flexibility of implementation may be thus relatively low. FIG. 46 illustrates the configuration of a hardware device for implementing the on-the-fly scheme in the case of using nine tab filters, but the configuration of the hardware device for the on-the-fly scheme may vary when the number of tabs is changed. Further, there may be additional hardware resource consumption for hardware fixed only for a specific calculation.

Figure 47:
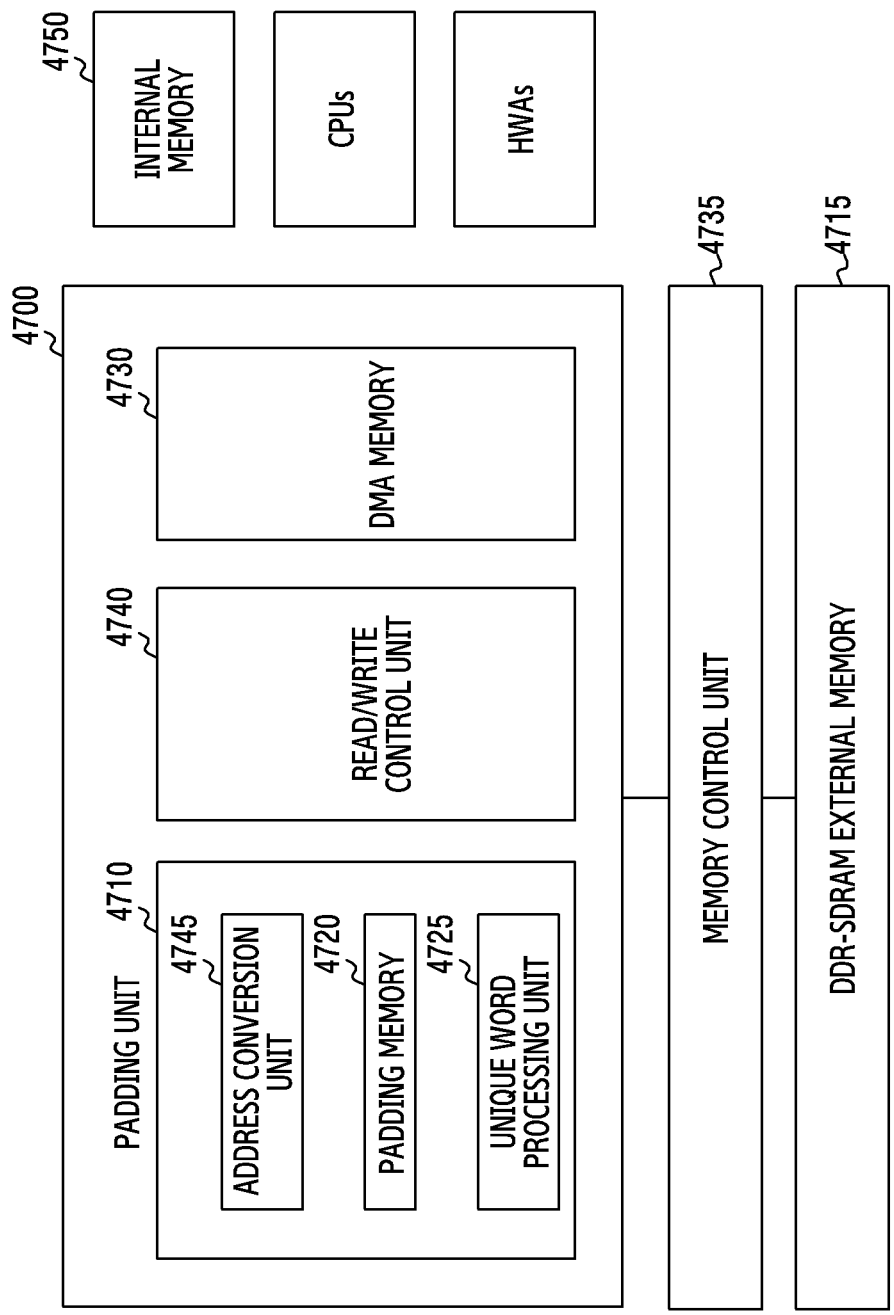
FIG. 47 illustrates a device configuration diagram for padding a pixel in direct memory access (DMA) scheme according to the present disclosure.

FIG. 47 illustrates a device configuration diagram for padding a pixel in direct memory access (DMA) scheme according to the present disclosure.

DMA means that a memory may be accessed independently of a central processing unit (CPU). Since the DMA may independently access the memory, there is an advantage that data to be subsequently calculated may be fetched from an external memory 4715 to an internal memory 4750 during calculation in the central processing unit. The external memory is a memory device indirectly called by the central processing unit and has a large memory capacity. In other words, information stored in the external memory may not be called directly by the central processing unit but is called by a separate input/output device. The internal memory is a device that performs processing or calculation and refers to, for example, a memory device directly called by the central processing unit without user intervention. In the present disclosure, the external memory and the internal memory are terms indicating a memory device that performs the above-described functions and do not refer to a memory existing outside or inside a specific device. Padding a pixel by using a DMA scheme includes performing PPoOB while performing DMA, by a DMA engine 4700. In the present patent document, the expression "do DMA" or "perform DMA" refers to moving data from the external memory to the internal memory through the DMA engine 4700. Since a calculation speed is fast when the CPU or HWA uses the internal memory, data is transferred from the external memory to the internal memory through DMA and then calculation is performed. The result of the calculation may be transferred from the internal memory to the external memory through DMA.

In order to pad a pixel for the DMA scheme, a previously input image moves from the external memory 4715 to a padding memory 4720 inside a padding unit 4710. Subsequently, a unique word processing unit 4725 creates a padding area, in other words, an area at the outer border of an input image, in which padding pixels may enter, the input image stored in the padding memory 4720. After the padding area is created, the padding area is filled with padding pixels by extrapolating pixels existing at the border. Extrapolation includes, for example, replication, mirroring, or zero-based modes. When a work of filling the padding area with padding pixels is completed, the padding unit 4710 notifies the DMA engine 4700 of the completion of the work and transfers an address range of the input image including the padding pixels to the DMA engine 4700. The DMA engine 4700 copies the input image including the padding pixels into the DMA memory 4730. A read/write control unit 4740 receives a request for an address of the input image and transfers a request for an address of the padding pixels to an address conversion unit 4745. The address conversion unit 4745 receives the request for the address of the padding pixels and transfers an appropriate address of the padding pixels to the DMA engine 4700. The DMA engine 4700 copies the input image including the padding pixels from the DMA memory 4730 into the internal memory 4750 by using the transferred appropriate address of the padding pixels.

Figure 48:
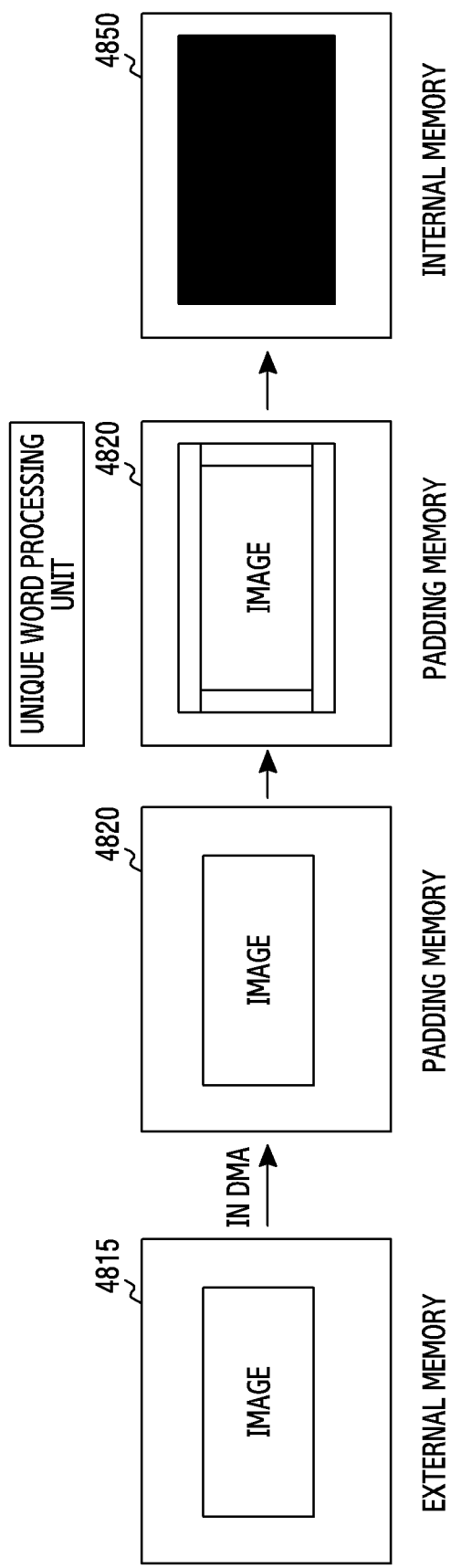
FIG. 48 illustrates an example of a procedure of padding a pixel by using the direct memory access (DMA) scheme according to the present disclosure.

FIG. 48 illustrates an example of a procedure of padding a pixel by using the direct memory access (DMA) scheme according to the present disclosure.

An input image is copied from an external memory 4815 into a padding memory 4820 inside the DMA engine. In other words, the DMA engine may need, inside thereof, the padding memory 4820 capable of receiving the data size of the input image. With respect to the input image having been copied into the padding memory 4820, the unique word processing unit creates a padding area, in other words, an area at the outer border of the input image, in which padding pixels may enter. After the padding area is created, the padding area is filled with padding pixels by extrapolating pixels existing at the border. Extrapolation includes, for example, replication, mirroring, or zero-based mode. The input image including the padding pixels is copied into the internal memory 4850.

As described above, since PPoOB using the DMA scheme creates a padding pixel in the middle of performing DMA, it does not require processing of creating a padding pixel before and after DMA. In other words, a preprocessing time may be reduced. In addition, since there is no need to handle exceptions for pixels at the border, implementation may be greatly simplified.

However, PPoOB using DMA, as described above, uses a large amount of memory. In other words, for PPoOB, a padding memory of the same size as that of the internal memory is required at the maximum. This is because, for PPoOB, input image data needs to be copied from the external memory into the padding memory, and then a work of filling with padding pixels needs to be performed in the padding memory. In addition, since an input image value is copied from the external memory into the padding memory to perform PPoOB, and then the input image including padding pixels is copied into the internal memory via the DMA memory, it may take a lot of time for the internal memory to receive first data.

Therefore, the present disclosure provides a method and an apparatus for PPoOB that does not use an extra memory, such as a padding memory, and does not require preprocessing of an image, while increasing implementation flexibility. In particular, the method and the apparatus for concurrently performing DMA and PPoOB on an input image.

Figure 49:
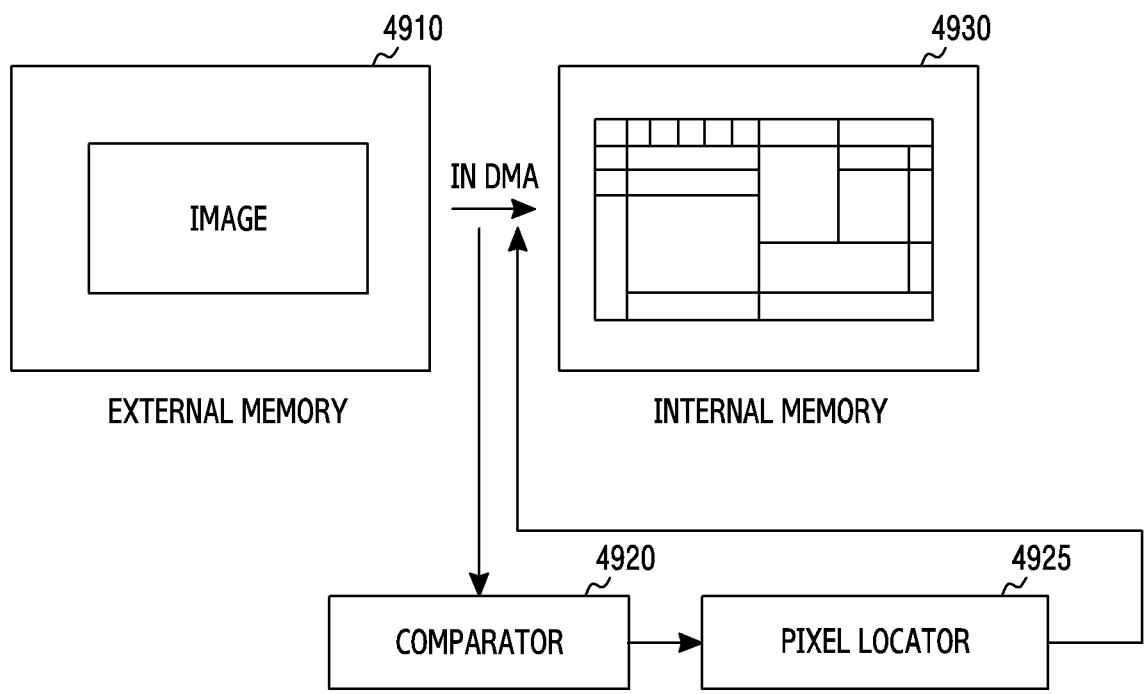
FIG. 49 illustrates another example of a procedure of padding a pixel by using the direct memory access (DMA) scheme according to the present disclosure.

FIG. 49 illustrates another example of a procedure of padding a pixel by using the DMA scheme according to the present disclosure.

An input image stored in an external memory 4910 is transferred to an internal memory 4930 by a datagram. The datagram is a unit of data transferred from the external memory 4910 to the internal memory 4930. A datagram may include a part of input image data, and the size of the datagram is determined by the bus width. For example, the size of the datagram may be proportional to the bus width. In other words, the input image data is segmented into a plurality of data having the size of the datagram, and each piece of segmented data is transferred to the internal memory 4930 by the datagram. When the datagram is transferred from the external memory 4910 to the internal memory 4930, the datagram is transferred via the DMA engine. In the DMA engine, for each byte existing in the datagram, a comparator 4920 determines whether each byte belongs to a border area of the image. The border area is an area where a padding is required to apply a filter to at least one byte in the area. The filter may be a Gaussian filter. That is, the border area is determined based on a filter dimension of the filter. A byte includes image data and may be a minimum information unit that constitutes certain data. When it is determined that a certain byte belongs to the border area of the image, the comparator 4920 transfers an address and a size of the byte to a pixel locator 4925. The pixel locator 4925 generates an address and a size of a location at the outer border of the image, for which PPoOB needs to be formed, based on the address and size of the byte received from the comparator 4920. With a pixel value corresponding to the byte, a padding pixel value based on the address and size generated by the pixel locator 4925 is written in the internal memory 4930.

Figure 50:
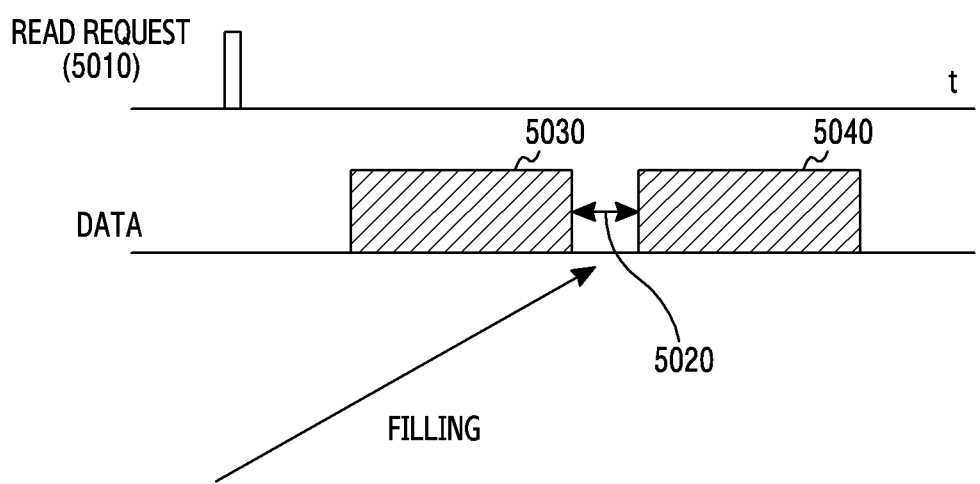
FIG. 50 illustrates movement of input image data from an external memory to an internal memory over time according to the present disclosure.

FIG. 50 illustrates movement of input image data from the external memory to the internal memory over time according to the present disclosure.

When the external memory receives, for example, a read request 5010 from the DMA engine, input image data of the external memory moves the internal memory via the DMA engine. The input image data may move in datagram units. A datagram is a part of the input image data and may include a plurality of bytes. In addition, the width of data 5030 and the width of data 5040 indicate time that a corresponding datagram is used in the internal memory. A time interval 5020 indicates a time interval in which consecutive datagrams are written in the internal memory when the input image data moves from the memory to the internal memory in datagram units via the DMA engine. While the datagram is passing through the DMA engine, the comparator inside the DMA engine checks whether each byte of the datagram belongs to the border area of the image data. Also, while the datagram remains in the DMA engine, when it is determined by the comparator that the byte belongs to the border area of the image data, the pixel locator generates an address and a size of a location to be padded at the outer border of the image, based on the address and size of the byte. Subsequently, along with a value corresponding to the byte, a padding value, in other words, a value based on the address and size generated by the pixel locator is written in the internal memory. When the comparator determines that the byte does not belong to the border area of the image data, the value corresponding to the byte is written in the internal memory without processing by the pixel locator. After the byte value and the padding value are written in the internal memory, a subsequent datagram moves to the DMA engine, and the procedure described above is repeated.

According to the embodiment of the present disclosure described in FIG. 50, between reference numeral 5030, which is a duration when a first datagram from the external memory is written to the internal memory, and reference numeral 5040, which is a duration when a second datagram is written in the internal memory, an address and a location necessary for PPoOB may be generated in the DMA engine, and a padding value corresponding to the address and location may be written in the internal memory. In other words, since a surplus time occurring between datagrams during movement of the input image data from the external memory to the internal memory may be filled with the time used for performing PPoOB, the time used for performing PPoOB for the input image data may be effectively managed. In other words, an operation of determining and writing a padding value may be performed between movements of datagrams, so that padding values may be written in the internal memory without additional calculation time.

Figure 51:
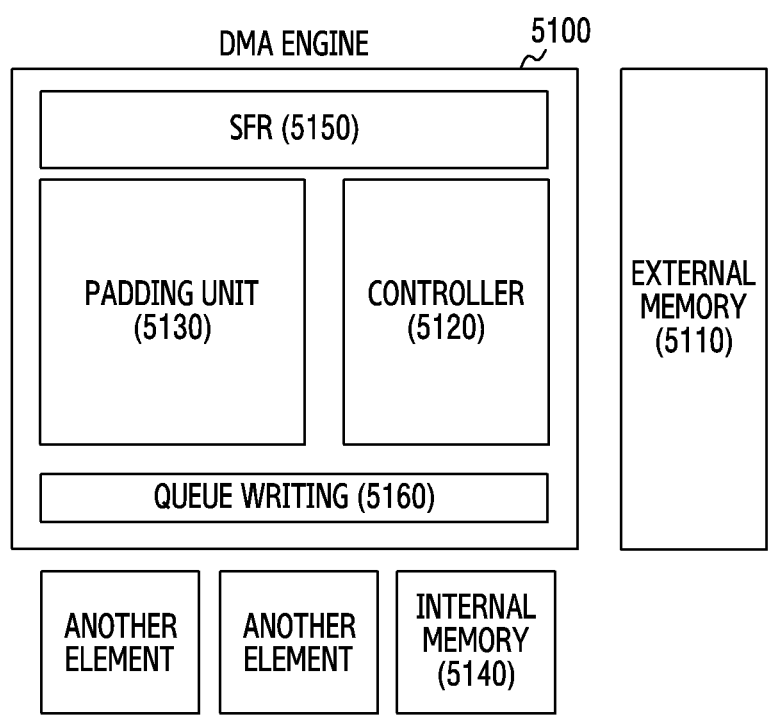
FIG. 51 illustrates another example of a device configuration diagram for performing PPoOB by using the direct memory access (DMA) scheme according to the present disclosure.

FIG. 51 illustrates another example of a device configuration diagram for performing PPoOB by using the direct memory access (DMA) scheme according to the present disclosure.

An external memory 5110 may store an input image or data, such as an input image. The external memory 5110 may include a dynamic random access memory (DRAM). A controller (fetcher) 5120 may control a DMA engine 5100 to fetch data from the external memory 5110 or record data in the external memory 5110. The controller 5120 may interpret requests received from an external module, for example, a CPU, a hardware accelerator (HWA), a data processing system (DPS), and may move data from the external memory 5110 or an internal memory 5140 to the DMA engine 5100. The internal memory 5140 may include a tightly coupled memory (TCM) and a shared memory. The TCM may be classified as a scratch pad memory. Unlike a cache, since a user may designate an address to store data, the TCM signifies a memory capable of fast calculation. In addition, the TCM is a memory accessible by a CPU or a hardware accelerator (HWA), and an access rate of the TCM may be faster than an external memory. When the DMA engine 5100 fetches data from the external memory 5110 or transfers data to the external memory 5110, a datagram may be used. When arbitrary data is divided into multiple data, a datagram may include each piece of the divided data. The size of the datagram is proportional to a bus width. The datagram is transferred from the external memory 5110 to a padding unit 5130. The padding unit may be the same as a processing unit in terms of usage. The datagram is transferred from the internal memory 5140 to the external memory 5110.

The padding unit 5130 may receive data from the controller 5120 and may perform necessary processing on the data. The necessary processing may include, for example, transpose for switching rows and columns of input image data, rotation, saturation on a pixel value, trimming, and the like. Processing for PPoOB may be performed after all necessary processing is completed. The function of the padding unit 5130 is not limited to performing necessary processing or PPoOB, and the padding unit 5130 may also perform other functions. Performing PPoOB by the padding unit 5130 will be described in detail hereinafter.

Although not illustrated, the padding unit 5130 may include multiple comparators and multiple pixel locators. The padding unit 5130 transfers, to the multiple comparators, an address and a size of each byte of a datagram. In other words, when the datagram includes a plurality of bytes, each of the plurality of bytes is transferred to the multiple comparators. The multiple comparators may determine which byte belongs to each of a top left corner, a top end, a top right corner, a left side, a right side, a bottom left corner, a bottom end, and a bottom right corner. However, the multiple comparators are not limited to the eight types described above and may be configured by an appropriate number thereof for determining whether a byte corresponds to the border. The multiple comparators may concurrently determine whether the byte belongs to the border of the image, based on the address and size of the byte. Criteria for determining whether the byte belongs to the border of the image may be preset by a user. In other words, each comparator may compare the address and size of each byte of the datagram with the address of the border area that is set by a user, so as to check whether each byte belongs to the border area.

When a certain byte is determined to belong to the border of the image, the comparator transfers an address and a size of the byte determined to belong to the border of the image to the pixel locator. The pixel locator generates an address and a size of a location, which PPoOB needs at the outer border based on the address and size of the byte determined to belong to the border of the image. With a pixel value corresponding to the byte, a padding pixel value based on the address and size generated by the pixel locator is written in the internal memory 5140. In other words, writing the data, which is received from the external memory, in the internal memory may concurrently happen with writing the padding pixel, which is created by the padding unit 5130, in the internal memory. For the certain byte determined to belong to the border of the image, the pixel locator may need to perform PPoOB for multiple bytes. For example, in the case where the certain byte is located at the border of the upper left corner, if PPoOB is performed in the replication mode, there may be a plurality of locations at the outer border, which the pixel locator is required to create addresses and sizes thereof. In this case, the pixel locator may write a padding pixel value in the internal memory 5140 over multiple cycles even for one byte in order to create multiple addresses and sizes of the byte.

A comparator and a pixel locator may be replaced by other terms. For example, the comparator may be replaced by the term "border checker", and the pixel locator may be replaced by the term "pixel generator".

A special function register (SFR) 5150 refers to a register mapped to a memory having a special function. The SFR 5150 controls an operation of the DMA engine 5100 and may control, for example, the padding unit 5130 inside the DMA engine 5100. In the SFR 5150, before PPoOB is performed, information for performing PPoOB is provided to the padding unit 5130 or the DMA engine in advance. The information provided for PPoOB in advance may include a padding mode, such as replication, mirroring, zero-based modes, an address value of input data, an address value of output data, and the length of PPoOB occurring in up, down, right and left directions. Further, the information may include information on the address range of a pixel to be used for PPoOB within the image border and information on the size of an area at the outer border of the image, in which PPoOB is to occur. The information may be transferred using the SFR 5150 to the DMA engine 5100 by a user.

Instead of providing information for PPoOB in advance by the SFR 5150, the information may be obtained using a software stack. The software stack is a specially provided memory space for controlling a program and refers to a software layer that may adequately abstract hardware, such as the SFR 5150, due to difficulty in directly controlling hardware, such as the SFR 5150. For example, in the case where it has been determined whether calculation applied to data is a 3×3 Gaussian filter or a 5×5 Gaussian filter, the address range of a pixel inside the internal memory, which is to be used for PPoOB, may be directly calculated and the size of an area at the outer border of the image, in which PPoOB is to occur, may be directly calculated in an additional software layer.

A write-queue 5160 refers to a temporary buffer that is stored in transaction units in order to enable synchronized transactions to be stored in the internal memory 5140, the synchronized transactions obtained by synchronizing transactions of input image data transferred via the DMA engine 5100 and transactions of data generated by PPoOB.

The hardware elements shown in FIG. 51 may be replaced by other terms. For example, since the DMA engine 5100 includes other hardware elements to perform a variety of processes, the DMA engine 5100 may be replaced by the term "a processing unit" or "a processor".

Figure 52:
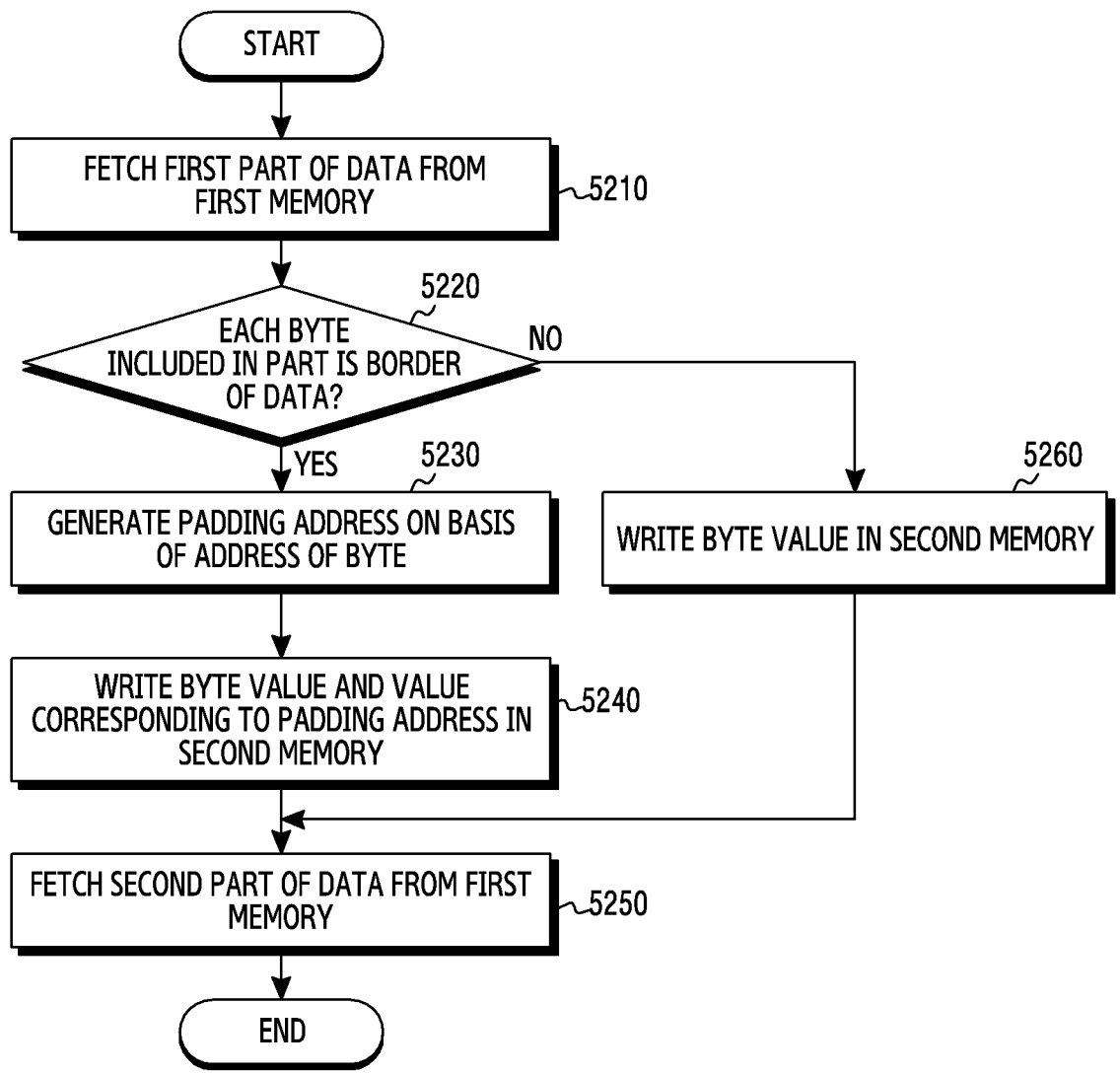
FIG. 52 is a flowchart illustrating a procedure of performing PPoOB concurrently with DMA according to the present disclosure.

FIG. 52 is a flowchart illustrating a procedure of performing PPoOB concurrently with DMA according to the present disclosure.

In step 5210, an electronic device fetches a first part of data from a first memory. The electronic device includes a DMA engine, and the first memory may be an external memory. Further, the data is data requiring PPoOB and includes image data. The first part may be a datagram when the data moves from the external memory to the electronic device on a datagram basis. The datagram may include a plurality of bytes that is an information unit constituting the data.

In step 5220, it is determined whether a part of the data, i.e., each byte included in the datagram, belongs to a border area of the data. The determination on whether the byte belongs to the border area of the data may be made by the comparator based on an address of the byte.

In step 5220, when it is determined that the byte belongs to the border area of the data, a padding address, i.e., an address of a location at the outer border of the data, at which PPoOB is to occur, may be generated based on the address of the byte. A procedure of generating the address may be performed by the pixel locator of FIG. 51. At this time, for example, a plurality of padding addresses may have to be generated in the outer border area in a way similar to one byte being located at the border corresponding to the upper left corner. In this case, a padding address of one byte may be generated over multiple cycles in order to generate a plurality of padding addresses.

In step 5230, when a padding address at which PPoOB is to occur is generated at the outer border of the data, a byte value and a value corresponding to the padding address are written in a second memory. The second memory may be an internal memory.

If it is determined that a certain byte included in a part of the data is not included in the border area of the data, the electronic device writes the byte value to the second memory.

After step 5240 or step 5235, a procedure moves to step 5250 to fetch a second part of the data from a first memory. The second part may be a datagram including some of the bytes, in the data, remaining after excluding the first part. The algorithm may be repeated until the entire data is moved from the first memory to the second memory.

Figure 53:
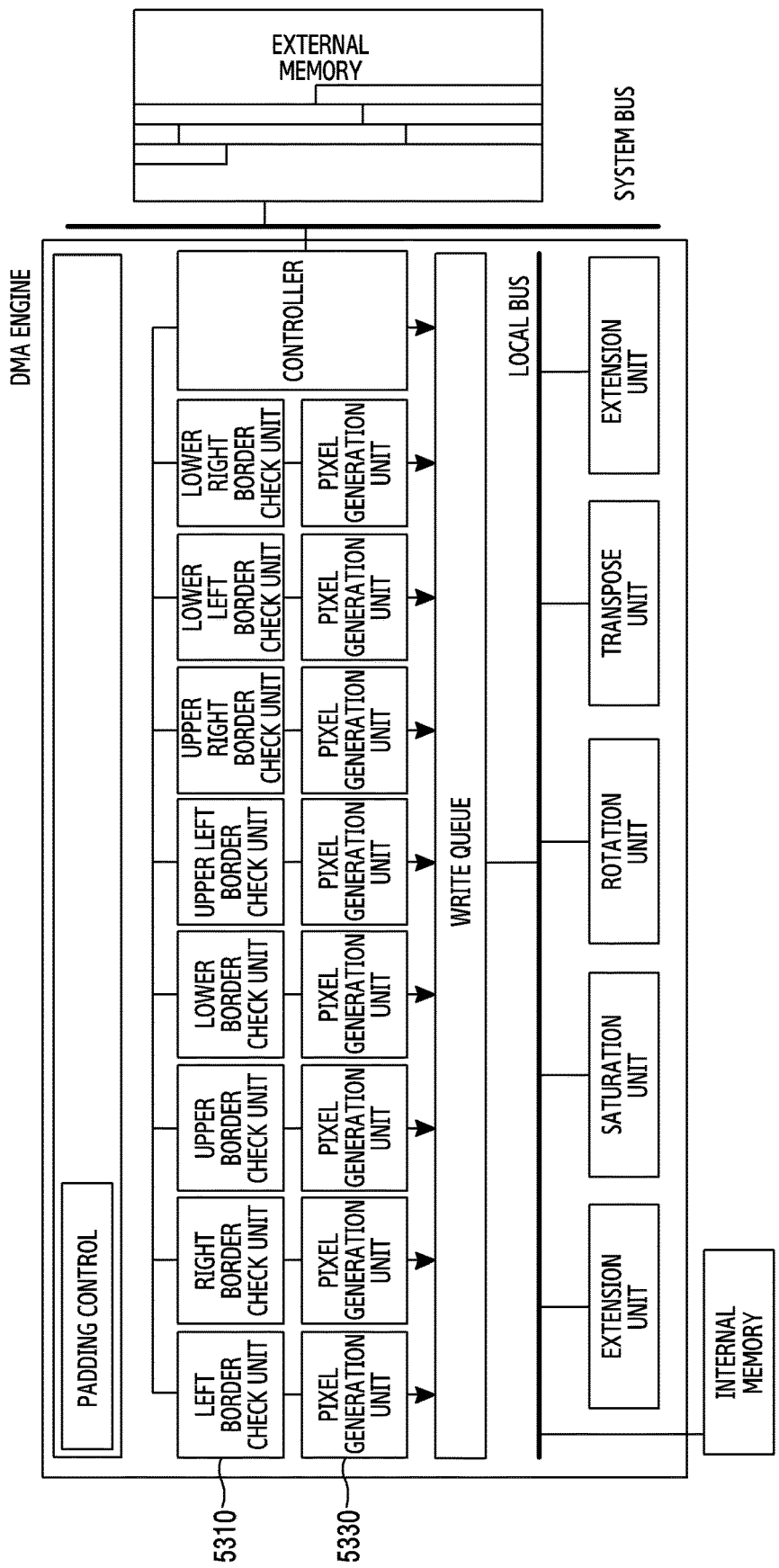
FIG. 53 illustrates a detailed configuration of a padding unit inside a DMA engine according to the present disclosure.

FIG. 53 illustrates a detailed configuration of a padding unit inside a DMA engine according to the present disclosure.

As described in FIG. 51, a padding unit may include a plurality of border checking units 5310 (or comparators), and a plurality of pixel generation units 5330 (or pixel locators) serially connected to the plurality of comparators, respectively. For a datagram transferred from the external memory to the padding unit, the padding unit transfers an address and a size of each byte of the datagram to the plurality of border checking units 5310. In other words, when the datagram includes multiple bytes, each of the multiple bytes is transferred to the plurality of border checking units 5310. The plurality of border checking units 5310 may be configured in parallel so as to concurrently determine which byte belongs to each of a top left corner, a top end, a top right corner, a left side, a right side, a bottom left corner, a bottom end, and a bottom right corner. However, the plurality of border checking units 5310 are not limited to the eight types described above and may be configured by an appropriate number thereof for determining whether a byte corresponds to the border. Criteria, by which each of the plurality of border checking units 5310 determines whether a byte belongs to the border, may be preset by a user. In other words, each of the border checking units 5310 may compare the address and size of each byte of the datagram with the address of the border area set by the user, so as to determine whether each byte belongs to the border area. For example, the user may previously provide a special function register (SFR) with a padding mode, such as replication, mirroring, zero-based modes, an address value of input data, an address value of output data, the length of PPoOB occurring in up, down, right and left directions, information on the address range of a pixel to be used for PPoOB within the image border, and information on the size of an area at the outer border of the image, in which PPoOB is to occur. In the padding unit, based on the information, for example, it may be determined whether a byte belongs to the border area so as to write a padding pixel value in the internal memory according to the padding mode.

When the border checking units 5310 determine that a certain byte belongs to the border area of the image, the pixel generation unit 5330 receives an address and a size of the byte from the border checking units 5310 and generates an address and a size of a location at the outer border area, which requires PPoOB, based on the received address and size. Subsequently, the pixel generation unit 5330 generates the address and size of the location at the outer border area, which requires PPoOB, based on the address and size of the byte determined to belong to the border of the image. With a pixel value corresponding to the byte, a padding pixel value based on the address and size generated by the pixel locator is written in the internal memory 5140. In other words, writing pixels of each byte of the datagram, which are received from the external memory, in the internal memory may concurrently happen with writing the padding pixel, which is created by the padding unit 5130, in the internal memory. For a byte, if the pixel generation unit 5330 is required to perform PPoOB for multiple bytes, for example, when PPoOB is performed in the replication mode, in the case where the byte is located in the border area corresponding to the upper left corner, the pixel generation unit may write a padding pixel value in the internal memory over multiple cycles even for one byte in order to create multiple addresses and sizes of the byte.

Figure 54:
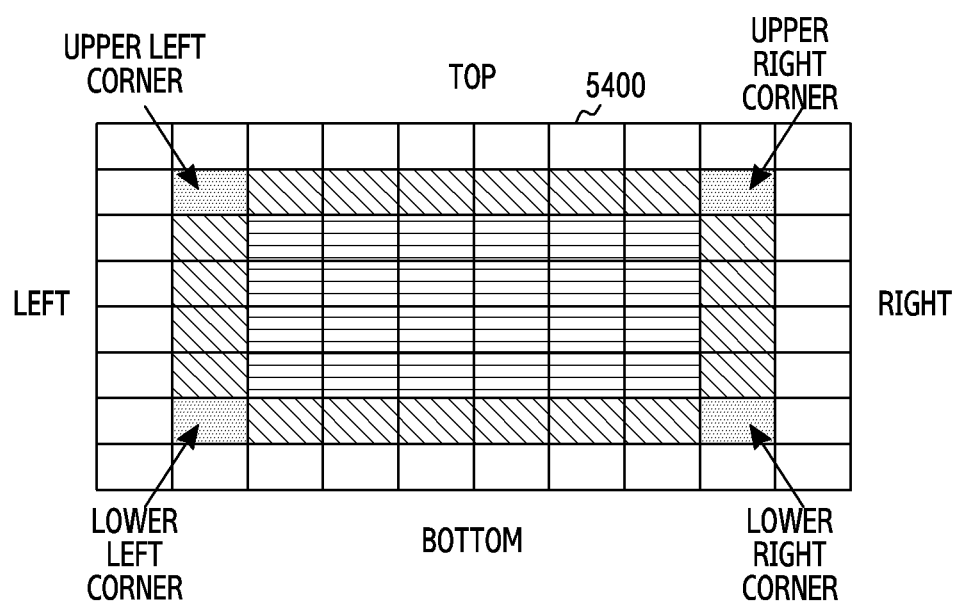
FIG. 54 illustrates an area segmented at the border of an input image for PPoOB according to the present disclosure.

FIG. 54 illustrates an area segmented at the border of an input image for PPoOB.

In FIG. 54, one part segmented into a rectangular shape in an input image 5400 refers to one pixel or one byte. A byte may be a minimum information unit that constitutes input image data or arbitrary data. In FIG. 54, parts hatched by oblique lines and parts indicated by a plurality of arrows refers to a byte of the border in which PPoOB is required in a calculation procedure. Bytes existing within bytes of the border have neighboring byte values for calculation, and thus refer to bytes that do not require PPoOB. Bytes existing outside the byte of the outer border refer to bytes for which PPoOB is required to be performed, in other words, bytes for which values for calculation are required to be generated. FIG. 54 shows that when calculation to which a 3×3 Gaussian filter is applied is to be performed, one more byte is required at the outer border. In other words, FIG. 54 shows that one more byte is required in each of a horizontal direction, an upward direction, and a diagonal direction based on the bytes located at the border. However, the number of required bytes may vary depending on a type of calculation to be applied. For example, when a 5×5 Gaussian filter is applied, two more bytes may be required in each direction. Also, although calculation is performed for the bytes existing inside the bytes of the border, PPoOB may be required for calculation. For example, when a 5×5 Gaussian filter is applied, since the bytes that exists inside the border and are adjacent to the bytes of the border need two more bytes for calculation in each of top, bottom, right, and left directions, PPoOB may be required in spite of existing neighboring byte values.

The border of the input image may be divided into a plurality of areas. For example, the border of the input image may be divided into eight areas including a top left corner, a top end, a top right corner, a left side, a right side, a bottom left corner, a bottom end, and a bottom right corner according to the address range of the border, which uses the same scheme in order to make a padding address. The border area is divided into the plurality of areas based on a number of padding addresses required to apply filter to at least one byte in each of the plurality of areas. For example, if 3×3 Gaussian filter is used, the plurality areas can be divided in to a top left corner, a top right corner, a bottom left corner, and a bottom right corner which require 5 padding addresses to apply the filter, and a top end, a left side, a right side, and a bottom end which require 3 padding addresses to apply the filter. Generating an address of a location, for which PPoOB is required to be performed, based on a byte belonging to each border area in the plurality of areas may be performed in the same manner. However, the border of the input image is not limited to the eight areas described above. For example, in the case where PPoOB is performed for calculation on data that may be considered to have three-dimensional data structure instead of an input image, or in the case where generation of an address of a location at which PPoOB is required to be performed is performed in a different manner, the border of the input image may be more or less than eight areas.

Figure 55:
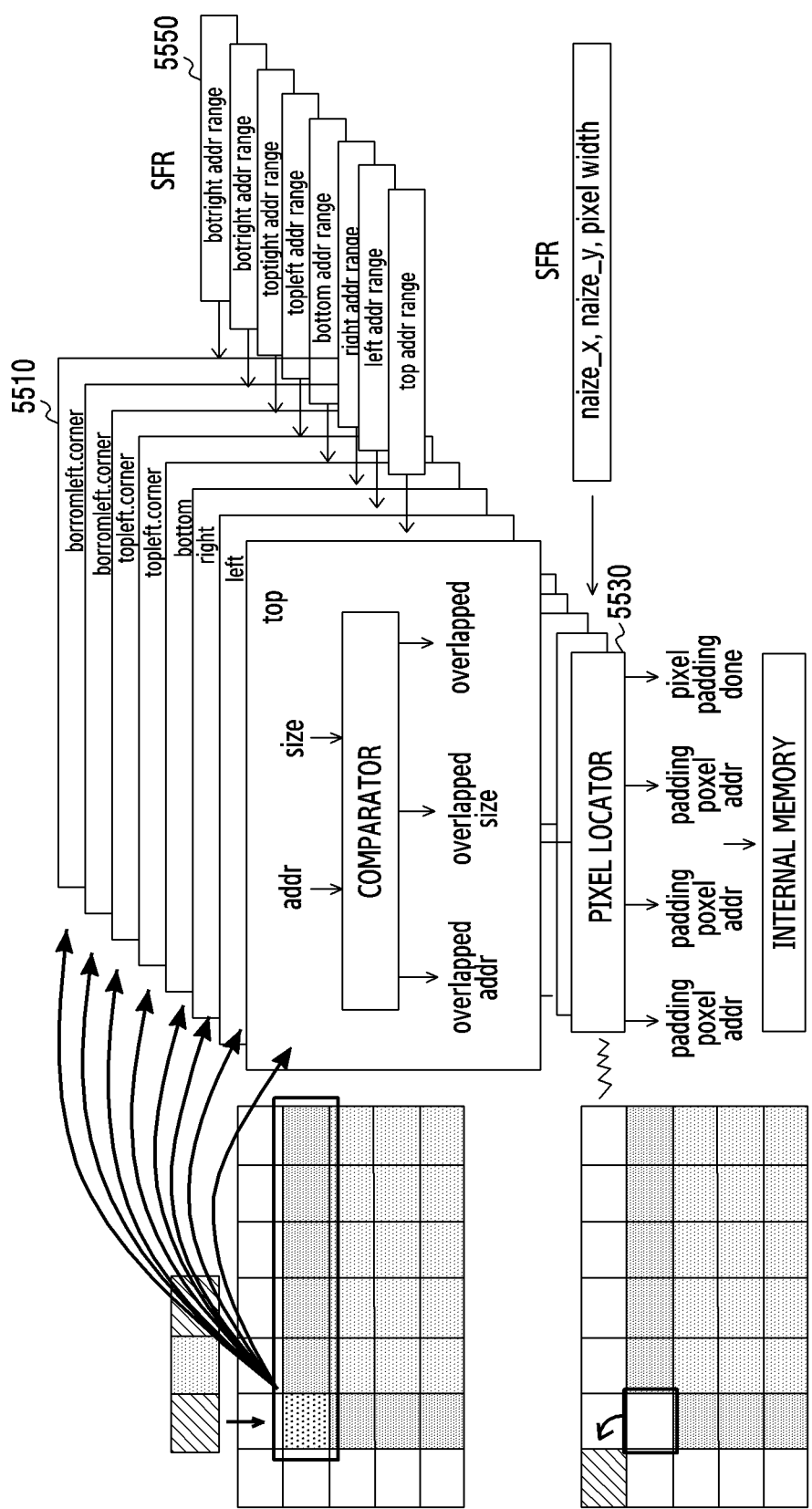
FIG. 55 schematically illustrates a detailed procedure of concurrently performing DMA and PPoOB according to the present disclosure.

FIG. 55 schematically illustrates a detailed procedure of concurrently performing DMA and PPoOB according to the present disclosure.

The DMA engine reads data stored in an external memory in datagram units. A datagram may include bytes that are a part of the data. Each byte of the datagram is transferred to multiple comparators 5510 within a padding unit. Each of the multiple comparators 5510 determines based on an address and a size of the byte which border of the data the byte belongs to. The multiple comparators 5510 may be configured in parallel so as to concurrently determine whether the byte belongs to the border. Specifically, the multiple comparators 5510 may concurrently determine whether the byte belongs to each of a top left corner, a top end, a top right corner, a left side, a right side, a bottom left corner, a bottom end, and a bottom right corner. However, the multiple comparators 5510 are not limited to the eight types described above and may be configured by an appropriate number thereof for determining whether the byte corresponds to the border.

Each of the multiple comparators 5510 may determine whether a byte belongs to an image border based on information provided in a special function register (SFR) 5550. The SFR 5550 refers to a register mapped to a memory having a special function. The SFR 5550 may be provided with information necessary for PPoOB, for example, a padding mode, such as replication, mirroring, zero-based modes, an address value of input data, an address value of output data, the length of PPoOB occurring in up, down, right and left directions, etc., in advance by a user. Each comparator may compare the address and size of the byte with an address and a size of the border area, which are set by the user, so as to determine whether the byte belongs to the border area. For example, a comparator that determines which byte belongs to the upper left corner may determine whether a byte belongs to the upper left corner, based on information on the address and size of the byte corresponding to the upper left corner, which has been previously provided by a user.

The address and size of the byte that is determined by the comparator to belong to the image border is transferred to a pixel locator 5530 connected in series to the comparator. The pixel locator 5530 generates an address and a size of a location at the outer border at which PPoOB is required to be performed, based on the address and size of the byte, which are received from the comparator. At this time, the pixel locator may generate the address and size of the location at which PPoOB is required to be performed, based on information provided from the SFR. The pixel locator 5530 may write, together with a byte value, a padding value corresponding to the address and size of the location, at which PPoOB is required to be performed, in the internal memory. As the case of a byte located at the border corresponding to the upper left corner, when there are a plurality of locations in the outer border area, for which addresses and sizes thereof are required to be created, a padding value for one byte may be written in the internal memory over multiple cycles.

Methods according to embodiments stated in claims and/or specifications of the present disclosure may be implemented in hardware, software, or a combination of hardware and software.

The software may be stored in a computer-readable storage medium. The computer-readable storage medium stores at least one program (software module) including instructions that causes, when executed by at least one processor in the electronic device, the electronic device to perform the method of the present disclosure.

The software may be stored in the form of a volatile or a non-volatile storage device such as a Read Only Memory (ROM), a memory such as a Random Access Memory (RAM), memory chips, devices or integrated circuits, or an optical or magnetic readable medium such as a Compact Disc-ROM (CD-ROM), Digital Versatile Discs (DVDs), a magnetic disk, or a magnetic tape.

A storage device and a storage medium corresponds to embodiments of a program including instructions for performing embodiments or a machine-readable storage means suitable for storing programs when executed. Embodiments provide a program including a code for implementing the device or the method claimed in one of the claims of the specification and a machine-readable storage medium for storing the program. Further, the programs may be electrically transferred to a medium, such as a communication signal transferred through a wired or a wireless connection, and embodiments properly include the equivalents.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to specific embodiments thereof in the description of the present disclosure, it will be apparent that various changes and modifications may be made thereto without departing from the spirit and scope of the present disclosure. Therefore, the scope of the present disclosure should not be defined as being limited to the embodiments, but should be defined by the appended claims and equivalents thereof.

The invention claimed is:

1. A method for operating an electronic device, the method comprising:
   reading a first part of data from a first memory;
   determining a first padding address based on an address of at least one byte in a border area of the data from among a plurality of bytes included in the first part;
   writing, in a second memory, values of the plurality of bytes and at least one value corresponding to the first padding address; and
   reading a second part of the data from the first memory.

2. The method of claim 1, further comprising:
   determining a second padding address based on an address of at least one byte in the border area of the data from among a plurality of bytes included in the second part; and writing, in the second memory, values of the plurality of bytes included in the second part and at least one value corresponding to the second padding address.

3. The method of claim 1, wherein the border area of the data comprises a plurality of areas, further comprising:
determining whether each byte of the plurality of bytes included in the first part is included in a first area of the plurality of areas during a determination of whether the each byte is included in a second area of the plurality of areas.

4. The method of claim 3, wherein the border area is divided into the plurality of areas based on a number of padding addresses required to apply a filter to at least one byte in each of the plurality of areas.

5. The method of claim 1, wherein the border area of the data and the at least one value corresponding to the first padding address are determined based on at least one of a predetermined padding mode, an address range of the at least one byte in the border area of the data, and length information where padding is performed in each direction outside a border of the data.

6. The method of claim 5, wherein the address range of the at least one byte in the border area of the data and the length information where padding is performed in each direction outside the border of the data are determined by a software stack.

7. The method of claim 5, wherein the padding mode is at least one of replication, mirroring, and zero-based mode.

8. The method of claim 1, further comprising:
applying, to the first part of the data, at least one of:
a transpose for mutually switching rows and columns of the data,
a rotation,
a saturation on values of the bytes, and
a trimming.

9. The method of claim 1, wherein the first memory is an external memory and the second memory is an internal memory.

10. The method of claim 1, wherein the border area is determined based on whether a padding is required to apply a filter to at least one byte in the border area.

11. An electronic device comprising:
a first memory;
a second memory; and
at least one processor, wherein the at least one processor is configured to:
read a first part of data from the first memory,
determine a first padding address based on an address of at least one byte in a border area of the data from among a plurality of bytes included in the first part,
write, in the second memory, values of the plurality of bytes and a at least one value corresponding to the first padding address, and
read a second part of the data from the first memory.

12. The device of claim 11, wherein the at least one processor is further configured to:
determine a second padding address based on an address of a byte in the border area of the data from among a plurality of bytes included in the second part, and
write, in the second memory, values of the plurality of bytes included in the second part and at least one value corresponding to the second padding address.

13. The device of claim 11, wherein the border area of the data comprises a plurality of areas, and the at least one processor is further configured to:
determine whether each byte of the plurality of bytes included in the first part is included in a first area of the plurality of areas during a determination of whether the each byte is included in a second area of the plurality of areas.

14. The device of claim 13, wherein the border area is divided into the plurality of areas based on a number of padding addresses required to apply filter to at least one byte in each of the plurality of areas.

15. The device of claim 11, wherein the border area of the data and the at least one value corresponding to the first padding address are determined based on at least one of a predetermined padding mode, an address range of the at least one byte in the border area of the data, and length information where padding is performed in each direction outside the border of the data.

16. The device of claim 15, wherein the padding mode is at least one of replication, mirroring, and zero-based mode.

17. The device of claim 15, wherein the address range of the at least one byte in the border area of the data and the length information where padding is performed in each direction outside the border of the data are determined by a software stack.

18. The device of claim 11, wherein the at least one processor is further configured to apply, to the first part of the data, at least one of:
a transpose for mutually switching rows and columns of the data,
a rotation,
a saturation on values of the bytes, and
a trimming.

19. The device of claim 11, wherein the first memory is an external memory and the second memory is an internal memory.

20. The device of claim 11, wherein the border area is determined based on whether a padding is required to apply a filter to at least one byte in the border area.

* * * * *